United States Patent
Tuteja et al.

(10) Patent No.: US 10,472,769 B2
(45) Date of Patent: Nov. 12, 2019

(54) SILANE BASED SURFACES WITH EXTREME WETTABILITIES

(71) Applicant: THE REGENTS OF THE UNIVERSITY OF MICHIGAN, Ann Arbor, MI (US)

(72) Inventors: Anish Tuteja, Ann Arbor, MI (US); Chao Li, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 306 days.

(21) Appl. No.: 15/027,995

(22) PCT Filed: Oct. 10, 2014

(86) PCT No.: PCT/US2014/060162
§ 371 (c)(1),
(2) Date: Apr. 7, 2016

(87) PCT Pub. No.: WO2015/054652
PCT Pub. Date: Apr. 16, 2015

(65) Prior Publication Data
US 2016/0251803 A1    Sep. 1, 2016

Related U.S. Application Data

(60) Provisional application No. 61/889,165, filed on Oct. 10, 2013.

(51) Int. Cl.
*D21H 19/10* (2006.01)
*D21H 17/11* (2006.01)
(Continued)

(52) U.S. Cl.
CPC .............. *D21H 19/10* (2013.01); *C09D 5/00* (2013.01); *D21H 17/11* (2013.01); *D21H 17/13* (2013.01); *D21H 21/16* (2013.01)

(58) Field of Classification Search
CPC ........ D21H 19/10; D21H 21/16; D21H 17/13; C09D 5/00
See application file for complete search history.

(56) References Cited

U.S. PATENT DOCUMENTS 3,891,496 A    6/1975 Erwin
3,922,403 A    11/1975 Sample, Jr. et al.
(Continued)

FOREIGN PATENT DOCUMENTS

EP    2118189 A1    11/2009
EP    2449001 A1    5/2012
(Continued)

OTHER PUBLICATIONS

Extended European Search Report in corresponding European Application No. EP 14 85 1477, dated Apr. 26, 2017.
(Continued)

*Primary Examiner* — Hai Vo
(74) *Attorney, Agent, or Firm* — Harness, Dickey & Pierce, P.L.C.

(57) ABSTRACT

In various aspects, the present disclosure provides porous materials having extreme wettability to polar or non-polar fluids, such as water and oil. The porous material has a coated surface comprising a low surface energy fluoroalkyl silane that is treated to exhibit at least one type of extreme wettability. In certain aspects, the disclosure provides a porous material comprising a coated surface that is both superhydrophobic and oleophilic, or superhydrophobic and superoleophobic, or superhydrophilic and oleophobic, by way of example. Methods of forming a porous surface having a predetermined wettability are also provided. Other embodiments include fluidic devices that incorporate porous materials having extreme wettabilities, such as microfluidic devices and separators.

11 Claims, 34 Drawing Sheets

(51) Int. Cl.
*D21H 17/13* (2006.01)
*D21H 21/16* (2006.01)
*C09D 5/00* (2006.01)

(56) References Cited

U.S. PATENT DOCUMENTS

| | | |
|---|---|---|
| 4,026,874 A | 5/1977 | Sample, Jr. et al. |
| 4,119,485 A | 10/1978 | Erwin |
| 4,127,164 A | 11/1978 | Erwin |
| 4,201,664 A | 5/1980 | Hekal |
| 4,556,623 A | 12/1985 | Tamura et al. |
| 5,096,380 A | 3/1992 | Byrnes et al. |
| 5,199,486 A | 4/1993 | Balmer et al. |
| 5,266,222 A | 11/1993 | Willis et al. |
| 5,269,935 A | 12/1993 | Clough et al. |
| 5,385,175 A | 1/1995 | Rivero et al. |
| 5,518,610 A | 5/1996 | Pierpoline |
| 6,716,919 B2 | 4/2004 | Lichtenhan et al. |
| 7,157,117 B2 | 1/2007 | Mikhael et al. |
| 7,193,015 B1 | 3/2007 | Mabry et al. |
| 7,217,683 B1 | 5/2007 | Blanski et al. |
| 7,695,629 B2 | 4/2010 | Salamitou et al. |
| 7,868,112 B2 | 1/2011 | Oikawa et al. |
| 7,897,667 B2 | 3/2011 | Mabry et al. |
| 8,177,985 B2 | 5/2012 | Akay et al. |
| 8,227,381 B2 | 7/2012 | Rodrigues et al. |
| 8,562,839 B2 | 10/2013 | Cho |
| 9,186,631 B2 | 11/2015 | Tuteja et al. |
| 9,394,408 B2 | 7/2016 | Ramirez et al. |
| 9,650,518 B2 | 5/2017 | Meuler et al. |
| 9,765,255 B2 | 9/2017 | Guenthner et al. |
| 9,834,459 B2 | 12/2017 | Tuteja et al. |
| 9,868,911 B2 | 1/2018 | Reams et al. |
| 10,202,711 B2 | 2/2019 | Tuteja et al. |
| 10,220,351 B2 | 3/2019 | Tuteja et al. |
| 2001/0044030 A1 | 11/2001 | Veerasamy et al. |
| 2002/0164443 A1 | 11/2002 | Oles et al. |
| 2004/0067339 A1 | 4/2004 | Gandon et al. |
| 2004/0068075 A1 | 4/2004 | Lichtenhan et al. |
| 2004/0209139 A1 | 10/2004 | Extrand |
| 2006/0286555 A1 | 12/2006 | Van Beuningen et al. |
| 2007/0066078 A1 | 3/2007 | Kugler et al. |
| 2007/0224391 A1 | 9/2007 | Krupenkin et al. |
| 2007/0237947 A1 | 10/2007 | Gleason et al. |
| 2008/0015298 A1 | 1/2008 | Xiong et al. |
| 2008/0146734 A1 | 6/2008 | Youngblood et al. |
| 2008/0199805 A1 | 8/2008 | Rushkin et al. |
| 2008/0221262 A1 | 9/2008 | Mabry et al. |
| 2008/0240479 A1 | 10/2008 | Linford et al. |
| 2008/0241512 A1 | 10/2008 | Boris et al. |
| 2008/0314820 A1 | 12/2008 | Prulhiere et al. |
| 2009/0011222 A1 | 1/2009 | Xiu et al. |
| 2010/0035070 A1 | 2/2010 | Moorlag et al. |
| 2010/0050871 A1 | 3/2010 | Moy et al. |
| 2010/0316842 A1 | 12/2010 | Tuteja et al. |
| 2011/0084421 A1 | 4/2011 | Soane et al. |
| 2011/0229706 A1 | 9/2011 | Epstein et al. |
| 2011/0281121 A1 | 11/2011 | He et al. |
| 2011/0283778 A1 | 11/2011 | Angelescu et al. |
| 2012/0000853 A1 | 1/2012 | Tuteja et al. |
| 2012/0160362 A1 | 6/2012 | Smith et al. |
| 2012/0223011 A1 | 9/2012 | Moon et al. |
| 2013/0072609 A1 | 3/2013 | Haddad et al. |
| 2013/0081812 A1 | 4/2013 | Green et al. |
| 2013/0122225 A1 | 5/2013 | Azimi et al. |
| 2013/0178568 A1 | 7/2013 | Meuler et al. |
| 2013/0264287 A1 | 10/2013 | Zhang et al. |
| 2014/0178641 A1 | 6/2014 | Leblanc et al. |
| 2014/0290699 A1 | 10/2014 | Bengaluru Subramanyam et al. |
| 2015/0065674 A1 | 3/2015 | Ramirez et al. |
| 2015/0109313 A1 | 4/2015 | Heggelund et al. |
| 2015/0136606 A1 | 5/2015 | Tuteja et al. |
| 2015/0353813 A1 | 12/2015 | Guenthner et al. |
| 2015/0368824 A1* | 12/2015 | Lim ............. C25D 11/04 205/50 |
| 2016/0129400 A1* | 5/2016 | Tuteja ............. B01D 69/02 210/650 |
| 2016/0251803 A1 | 9/2016 | Tuteja et al. |
| 2019/0031883 A1 | 1/2019 | Meuler et al. |

FOREIGN PATENT DOCUMENTS

| | | |
|---|---|---|
| KR | 1020130097487 A | 9/2013 |
| WO | 2005068399 A1 | 7/2005 |
| WO | 2009009185 A2 | 1/2009 |
| WO | 2010028752 A1 | 3/2010 |
| WO | 2010042191 A1 | 4/2010 |
| WO | 2011159699 A2 | 12/2011 |
| WO | 2012008970 A1 | 1/2012 |
| WO | 2012115986 A1 | 8/2012 |
| WO | 2013173722 A2 | 11/2013 |

OTHER PUBLICATIONS

Extended European Search Report in corresponding European Application No. EP 14 85 1477, dated Apr. 17, 2017.

Basu, Bharathibai J. et al. Surface studies on superhydrophobic and oleophobic polydimethylsiloxane-silica nanocomposite coating system. Applied Surface SCIENCE. vol. 261. pp. 807-814 (2012).

Zhou, Hua et al. Robust, Self-Healing Superamphiphobic Fabrics Prepared by Two-Step Coating of Fluoro-Containing Polymer, Fluoroalkyl Silane, and Modified Silica Nanoparticles. Advanced Functional Materials. vol. 23. Issue 13. pp. 1664-1670 (2013).

Matinlinna, Jukka P et al. Characterization of novel silane coatings on titanium implant surfaces. Clinical Oral Implants Research. vol. 24. Issue 26. pp. 688-697(2012).

Zhou, Hua, et al. Fluoroalkyl Silane Modified Silicone Rubber/Nanoparticle Composite: A Super Durable, Robust Superhydrophobic Fabric Coating. Advanced Materials vol. 24. Issue 18. pp. 2409-2412 (2012).

Mabry, Joseph M., et al. Fluorinated Polyhedral Oligomeric Silsesquioxanes (F-POSS), Angewandte Chemie International Edition 47. pp. 4137-4140 (2008).

International Search Report and Written Opinion for PCT/US2014/060162, dated Apr. 6, 2015; ISA/KR.

Boban, Mathew et al., "Smooth, All-Solid, Low-Hysteresis, Omniphobic Surfaces with Enhanced Mechanical Durability," ACS Appl. Mater. Interfaces 2018, 10, pp. 11406-11413 (Published Mar. 19, 2018); DOI: 10.1021/acsami.8b00521.

Adams, Richard. Technology Commercialization Opportunity Polyhedral Oligomeric Silsesquioxanes (POSS): A New Generation of Lighter Weight, Higher Performance Polymeric Materials.pp. 1-3 (Available online Jun. 9, 2010).

Chimuka, Luke, et al., "Why liquid membrane extraction is an attractive alternative in sample preparation," Pure Appl.Chem., vol. 76, No. 4, pp. 707-722 (2004).

Ehrenberg, Rachel, "Filter unmixes oil and water: Combination of chemistry and gravity could help clean spills," Science News, vol. 182, No. 7, p. 17.

Feng, Xinjian, et al., "Design and Creation of Superwetting/Antiwetting Surfaces," Advanced Materials, vol. 18, pp. 3063-3078 (2006).

Kota, Arun K., et al., "Hygro-responsive membranes for effective oil-water separation," Nature Communications, vol. 3, No. 1025, pp. 1-8 (Aug. 28, 2012).

Kota, Arun K., et al., "Superomniphobic surfaces: Design and durability," MRS Bulletin, vol. 38, pp. 383-390 (May 2013).

Kota, Arun K., et al., "The design and applications of superomniphobic surfaces," NPG Asia Materials, vol. 6, No. e109, pp. 1-16 (2014).

Kwon, Gibum et al. On-Demand Separation of Oil-Water Mixtures. Advanced Materials. vol. 24. Issue 27. pp. 3666-3671 (2012).

Mabry, Joseph M., et al., "Fluorinated Polyhedral Oligomeric Silsesquioxanes (F-POSS)," Angewandte Chemie Int. Ed., vol. 47, pp. 4137-4140 (2008) (available online Apr. 24, 2008).

Sigma-Alrdrich Fine Chemicals. Silsesquioxanes Bridging the Gap between Polymers & Ceramics. ChemFiles. vol. 1. No. 6. pp. 1-14 (2001).

(56) References Cited

OTHER PUBLICATIONS

The International Search Report and Written Opinion of the International Searching Authority dated Mar. 5, 2015 for PCT International Application No. PCT/US2014/059727.*
The International Search Report and Written Opinion of the International Searching Authority dated Dec. 2, 2013 for PCT International Application No. PCT/US2013/041604 (Pub. No. WO 2013/73722).
Tuteja, Anish, et al., "Designing Superoleophobic Surfaces," Science, vol. 318, pp. 1618-1622 (Dec. 7, 2007).
Non-Final Office Action regarding U.S. Appl. No. 14/732,652, dated Sep. 7, 2016.
Non-Final Office Action regarding U.S. Appl. No. 13/734,446, dated Jun. 10, 2016.
Non-Final Office Action regarding U.S. Appl. No. 12/599,465, dated Aug. 19, 2016.
Non-Final Office Action regarding U.S. Appl. No. 12/599,465, dated Sep. 11, 2012.
Final Office Action regarding U.S. Appl. No. 12/599,465, dated Jan. 16, 2013.
Non-Final Office Action regarding U.S. Appl. No. 12/599,465, dated May 15, 2014.
Final Office Action regarding U.S. Appl. No. 12/599,465, dated Oct. 16, 2014.
Non-Final Office Action regarding U.S. Appl. No. 12/599,465, dated Sep. 16, 2015.
Final Office Action regarding U.S. Appl. No. 12/599,465, dated Jan. 29, 2016.
Non-Final Office Action regarding U.S. Appl. No. 13/734,446, dated May 1, 2015.
Final Office Action regarding U.S. Appl. No. 13/734,446, dated Nov. 23, 2015.
Tuteja, Anish, et al., "Design Parameters for Superhydrophobicity and Superoleophobicity." MRS Bulletin, vol. 33, pp. 752-758 (Aug. 2008).
Tuteja, Anish, et al., "Robust Omniphobic Surfaces." PNAS, vol. 105. No. 14, pp. 18200-18205 (Nov. 25, 2008).
Choi, Wonjae, et al., "Fabrics with Tunable Oleophobicity." Advanced Materials, vol. 21., pp. 1-6. (2009).
Chhatre, Shreerang S., et al., "Scale Dependence of Omniphobic Mesh Surfaces," Langmuir Article, vol. 26, No. 6, pp. 4027-4035 (2010).

Young, Thomas, "An Essay to the Cohesion of Fluids," Philosophical Transactions of the Royal Society of London, vol. 5, pp. 65-87. (1805).
Shirtcliffe, Neil J. et al., "Porous Materials show Superhydrophobic to Superhydrophilic Switching," Chemical Communication, pp. 3135-3137. (2005).
Choi, Wonjae et al., "A Modified Cassie-Baxter Relationship to Explain Contact Angle Hysteresis and Anisotrophy on Non-wetting Textured Surfaces," Journal of Colloid and Interface Science, vol. 339. pp. 208-216. (2009).
Howarter, John A. et al., "Amphiphile grafted Membranes for the Separation of Oil-in-Water Dispersions," Journal of Colloid and Interface Science, vol. 329. pp. 127-132. (2009).
Final Office Action regarding U.S. Appl. No. 14/013,600, dated Feb. 4, 2016.
Kwon, Gibum et al., 'On-demand separation of oil-water mixtures', Advanced Materials, Jun. 12, 2012, vol. 24, Issue 27, pp. 3666-3671.
The International Search Report and Written Opinion of the International Searching Authority dated Feb. 28, 2012 for PCT International Application No. PCT/US2011/40353 (Pub. No. WO 2011/15699).
Nishi, K. et al. "Potential of Rapeseed Oil as Diesel Engine Fuel," SAE Technical Paper. (2004) (Abstract Only).
Extended European Search Report issued in corresponding European application No. 14851492.0.
Canadian Examiner's Report issued in Canadian Application No. CA2802859 dated Jun. 29, 2017.
Non-Final Office Action issued in cross-referenced U.S. Appl. No. 12/599,465, dated Dec. 12, 2017.
Owen, Michael J., and Hideki Kobayashi. "Surface active fluorosilicone polymers." Macromolecular Symposia. vol. 82. No. 1. Hüthig & Wepf Verlag, 1994.
Canadian Office Action dated Feb. 22, 2018 in corresponding Canadian Application No. 2,802,859.
The International Preliminary Report on Patentability dated Apr. 12, 2016 for PCT International Application No. PCT/US2014/059727 (Pub. No. WO 20151054406).
Mueler, Adam J. et al., "Examination of wettability and surface energy in fluorodecyl POSS/polymer blends," Soft Matter, 2011, 7, pp. 10122-10134.

\* cited by examiner

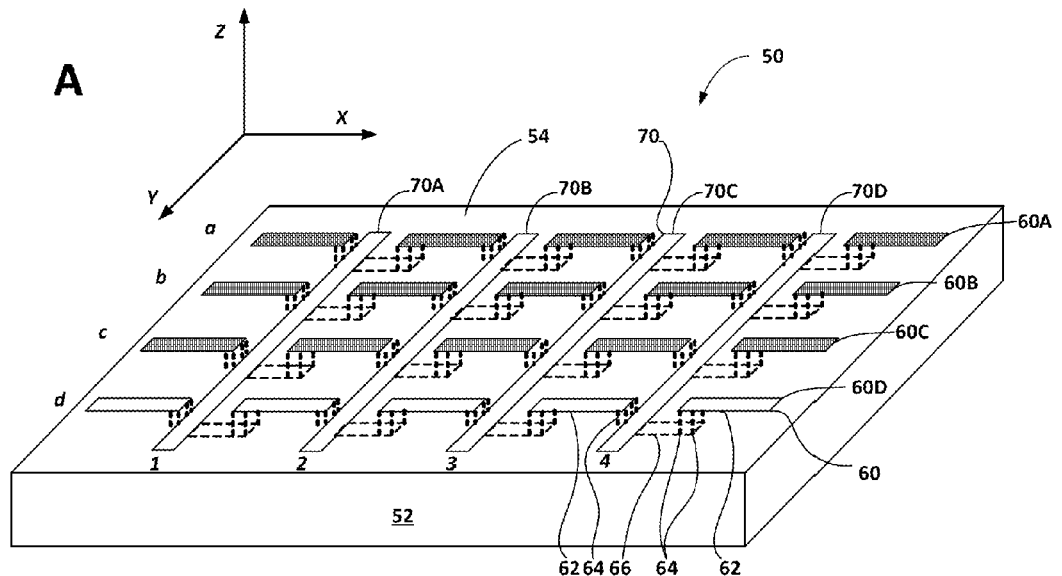
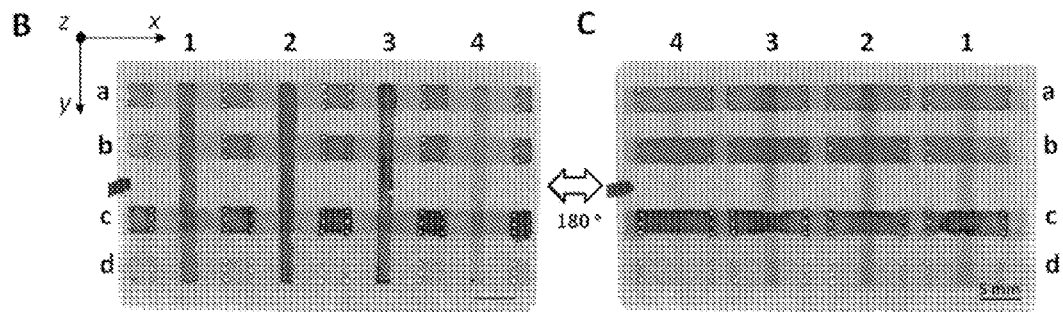
FIGS. 12A-12C

A-1

A-2

A-3

B-1

SILANE BASED SURFACES WITH EXTREME WETTABILITIES

CROSS-REFERENCE TO RELATED APPLICATIONS

This application is a 371 National Phase of PCT/US2014/060162 filed Oct. 10, 2014, which claims the benefit of U.S. Provisional Application No. 61/889,165, filed on Oct. 10, 2013. The entire disclosures of the above applications are incorporated herein by reference.

FIELD

The present disclosure relates to porous substrate materials having extreme wettabilities and more specifically to silane-based surfaces having predetermined extreme wettabilities, devices incorporating such silane-based surfaces having extreme wettabilities, and methods for making such silane-based surfaces having extreme wettabilities.

BACKGROUND

This section provides background information related to the present disclosure which is not necessarily prior art.

Surfaces and materials with extreme repellency or attraction to liquids are of significant interest for a wide variety of military, commercial, and specialty applications. By way of non-limiting example, extreme repellency surfaces include those that are self-cleaning and non-fouling, including stain-free clothing and spill-resistant protective wear. Such extreme repellency surfaces may also be used for drag reduction, microfluidics, locomotion of micro-robots on aqueous and chemical environments, and for providing icephobicity. The primary measure of wetting of a liquid on a non-textured (or smooth) surface is the equilibrium contact angle $\theta$ (given by Young's relation). Non-textured surfaces that display contact angles $\theta$ greater than 90° with water are considered hydrophobic, while non-textured surfaces that display contact angles $\theta$ less than 90° with water are considered hydrophilic. Typically, surfaces with high surface energy tend to be hydrophilic, whereas those with low surface energy tend to be hydrophobic.

Relatively recently, a newer classification has emerged, known as a "superhydrophobic." Superhydrophobic surfaces display contact angles $\theta$ greater than 150° along with a low contact angle hysteresis (the difference between the advancing and the receding contact angles) for water. Water droplets can easily roll-off from and bounce on such surfaces. Known superhydrophobic surfaces are textured (or rough), as the maximum water contact angle $\theta$ measured to date on a smooth surface is believed to be only about 130°. Superhydrophobic surfaces are pervasive in nature with various plant leaves, legs of the water strider, gecko's feet, troughs on the elytra of desert beetles, and insect wings displaying extreme water-repellency. Some synthetic or artificial engineered superhydrophobic surfaces have also been developed. These superhydrophobic surfaces tend to be quite difficult to reliably create, require complex processing and customized materials, and therefore have been quite expensive.

Surfaces that repel low surface tension liquids such as different oils are called superoleophobic. Most superoleophobic surfaces are also superhydrophobic, because surfaces that can repel low surface tension liquids (such as oils and alcohols) can much more easily repel water, which possesses a higher surface tension. However, there are a few superoleophobic surfaces that are at least partially wet by polar liquids such as water and alcohols. In view of such counter-intuitive surfaces, surfaces that can display both superhydrophobicity and superoleophobicity (e.g., as "omniphobic" surfaces) would be highly desirable. Similarly, an ability to create surfaces that exhibit other extreme wettabilities, such as surfaces that are both superhydrophilic (e.g., displaying contact angles $\theta$ of less than 5° for water) and superoleophobic or superhydrophobic and superoleophilic (e.g., displaying contact angles $\theta$ of less than 5° for oil) would also be highly desirable. There remains a need for improved, streamlined, cost-effective processes for forming surfaces having such extreme wettabilities, which can be used in a vast array of different technological fields and applications.

SUMMARY

This section provides a general summary of the disclosure, and is not a comprehensive disclosure of its full scope or all of its features.

In various aspects, the present disclosure provides porous materials having a coated surface comprising a low surface energy silane that exhibits extreme wettability. In certain variations, the disclosure provides a porous material comprising a coated surface that is both superhydrophobic, having a first apparent advancing dynamic contact angle of greater than or equal to about 150° for water and oleophilic, having a second apparent advancing dynamic contact angle of less than or equal to about 90° for a preselected oil.

In other variations, the disclosure provides a porous material having a coated surface that is both superhydrophobic, having a first apparent advancing dynamic contact angle of greater than or equal to about 150° for water and superoleophobic, having a second apparent advancing dynamic contact angle of greater than or equal to about 150° for a preselected oil. In certain variations, the coated surface consists essentially of a low surface energy fluoroalkyl silane having a surface tension of less than or equal to about 25 mN/m. The low surface energy fluoroalkyl silane can be reacted with hydroxyl groups present on the porous material.

In yet other aspects, the disclosure provides a porous material comprising a coated surface that is both superhydrophilic, having a first apparent advancing dynamic contact angle of less than or equal to about 5° for water and oleophobic, having a second apparent advancing dynamic contact angle of greater than or equal to about 90° for a preselected oil. In certain variations, the coated surface consists essentially of a low surface energy fluoroalkyl silane having a surface tension of less than or equal to about 35 mN/m. The low surface energy fluoroalkyl silane can be reacted with hydroxyl groups present on the porous material.

In yet other aspects, the present disclosure also provides a method for forming a surface having a predetermined wettability. The method comprises reacting a low surface energy fluoroalkyl silane having a surface tension of less than or equal to about 35 mN/m with hydroxyl groups present on a surface of a porous material. The reaction is conducted until greater than or equal to about 30% of the hydroxyl groups react with the low surface energy fluoroalkyl silane to form a coated surface having the predetermined wettability selected from:

(i) superhydrophobic, having a first apparent advancing dynamic contact angle of greater than or equal to about 150° for water and oleophilic, having a second apparent advancing dynamic contact angle of less than or equal to about 90° for a preselected oil;

(ii) superhydrophobic, having a first apparent advancing dynamic contact angle of greater than or equal to about 150° for water and superoleophilic, having a second apparent advancing dynamic contact angle of less than or equal to about 5° for a preselected oil;

(iii) superhydrophobic, having a first apparent advancing dynamic contact angle of greater than or equal to about 150° for water and superoleophobic, having a second apparent advancing dynamic contact angle of greater than or equal to about 150° for a preselected oil;

(iv) superhydrophilic, having a first apparent advancing dynamic contact angle of less than or equal to about 5° for water and oleophobic, having a second apparent advancing dynamic contact angle of greater than or equal to about 90° for a preselected oil; or (v) superhydrophilic, having a first apparent advancing dynamic contact angle of less than or equal to about 5° for water and superoleophobic, having a second apparent advancing dynamic contact angle of greater than or equal to about 150° for a preselected oil.

In certain variations, portions of the porous surface or coated surface may be further subjected to plasma treatment before or after the reacting.

In other variations, the disclosure provides a fluidic device that employs porous materials having a coated surface comprising a low surface energy silane that exhibits extreme wettability. In certain variations, the fluidic device may be a microfluidic device that comprises a porous material comprising a surface comprising:

(i) a first surface region that comprises a coating that is superhydrophobic, having a first apparent advancing dynamic contact angle of greater than or equal to about 150° for water and superoleophobic, having a second apparent advancing dynamic contact angle of greater than or equal to about 150° for a preselected oil; and (ii) a second surface region that is hydrophilic, having a first apparent advancing dynamic contact angle of less than or equal to about 90° for water and oleophilic, having a second apparent advancing dynamic contact angle of less than or equal to about 90° for a preselected oil, wherein the second surface region is capable of receiving, transferring, and/or storing a fluid.

The (i) first surface region and (ii) the second surface region together define at least one microscale fluidic pathway for the fluid on the surface of the porous material.

In other variations, the disclosure provides a fluidic device that comprises a porous substrate comprising a surface defining a first surface region that comprises a surface coating having a first wettability comprising a low surface energy fluoroalkyl silane. The porous substrate may optionally be a paper or a textile. The fluidic device also comprises a second surface region on the surface having a second wettability that is distinct from the first wettability. The second surface region is capable of receiving, transferring, and/or storing a fluid or other material. The first surface region and the second surface region together define at least one fluidic pathway for the fluid on the surface of the porous material.

In yet other aspects, the present disclosure provides a separator device for continuously separating a liquid-liquid mixture. The device comprises a porous separator membrane comprising a first surface region that comprises a surface coating having a first wettability comprising a low surface energy fluoroalkyl silane and a second surface region on the surface having a second wettability that is distinct from the first wettability. The second surface region is capable of receiving, transferring, and/or storing a first component from the liquid-liquid mixture. In the device, the liquid-liquid mixture is fed to the porous separator membrane to continuously separate the first component from the liquid-liquid mixture.

In other aspects, a device is provided for biological applications. The device may comprise a porous substrate comprising a surface comprising a first surface region that comprises a surface coating having a first wettability comprising a low surface energy fluoroalkyl silane. The device also has a second surface region on the surface having a second wettability that is distinct from the first wettability, where the second surface region on the surface is capable of interacting or binding with a biological material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figures 3A, 3B:
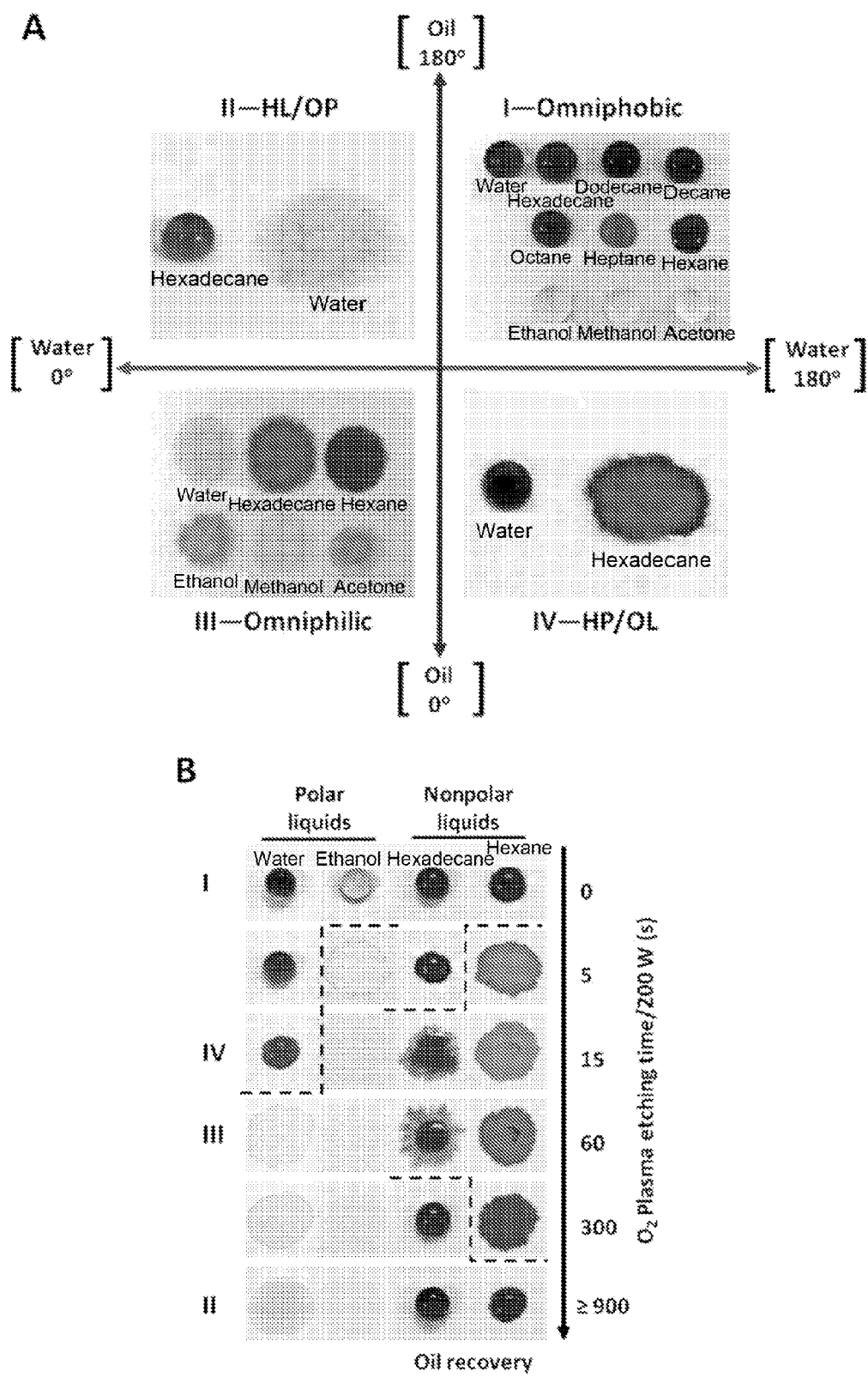
Figure 14:
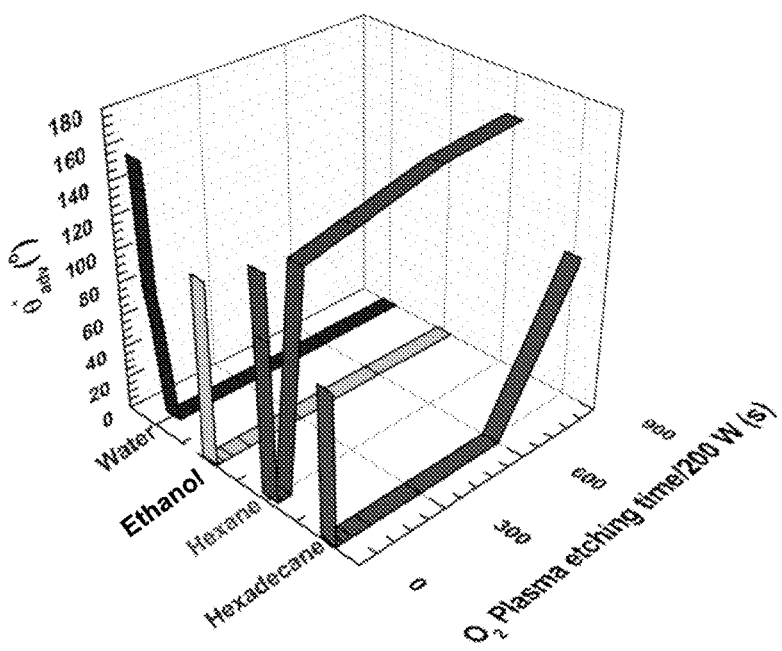

FIGS. 3A-3B show more examples of porous materials having surfaces coated with low energy fluoroalkyl silanes having extreme wettabilities prepared in accordance with certain aspects of the present teachings. FIG. 3A shows wettability quadrants with oil-water contact angle axes (from 0° to 180°). Quadrant I is an omniphobic surface (all-liquid nonwetting); Quadrant II is a hydrophilic and oleophobic surface (HL/OP, water wetting, but oil nonwetting) from deep-$O_2$-plasma-etched (200 W/900 seconds) porous materials having surfaces coated with low energy fluoroalkyl silanes prepared in accordance with certain aspects of the present teachings; Quadrant III, omniphilic (all-liquid wetting) from middle-$O_2$-plasma-etched (200 W/60 seconds) porous materials having surfaces coated with low energy fluoroalkyl silanes prepared in accordance with certain aspects of the present teachings; Quadrant IV (200 W/15 seconds) is a hydrophobic and oleophobic surface (HP/OL, water nonwetting, but oil wetting) formed from light-$O_2$-plasma-etched porous materials having surfaces coated with low energy fluoroalkyl silanes prepared in accordance with certain aspects of the present teachings. FIG. 3B shows continuous changes of surface wettability on porous materials having surfaces coated with low energy fluoroalkyl silanes prepared in accordance with certain aspects of the present teachings by use of 200 W $O_2$ plasma etching. From 0 seconds to 900 seconds and more, the four extreme wettabilities can be achieved in sequence (omniphobic, HP/OL, omniphilic and HL/OP). Water (blue), ethanol (green), hexane (red) and hexadecane (red) are used for testing, covering both polar and nonpolar liquids with surface tension ranging from 72.8 to 18.4 mN m$^{-1}$ (at 20° C.). "Oil recovery" in nonpolar liquids is observed as the contact angle of alkanes firstly going down and then recovering to the original value or even higher, with an increased $O_2$ plasma etching time as shown in FIG. 14.

Figures 4A, 4B:
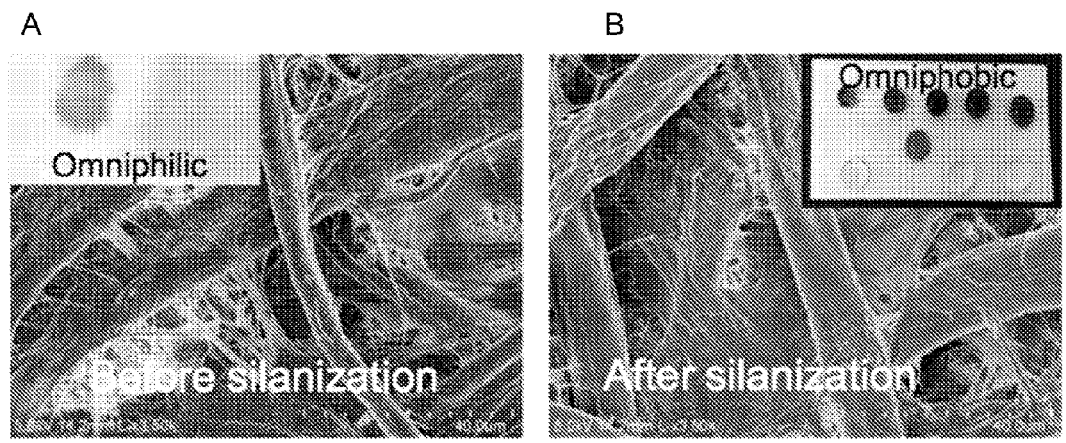

FIGS. 4A-4B shows micrographs reflecting morphology of a commercially available cellulose based filter paper, before (FIG. 4A) and after (FIG. 4B) silanization to form a superhydrophobic and superoleophobic surface in accordance with certain aspects of the present disclosure.

Figure 5:
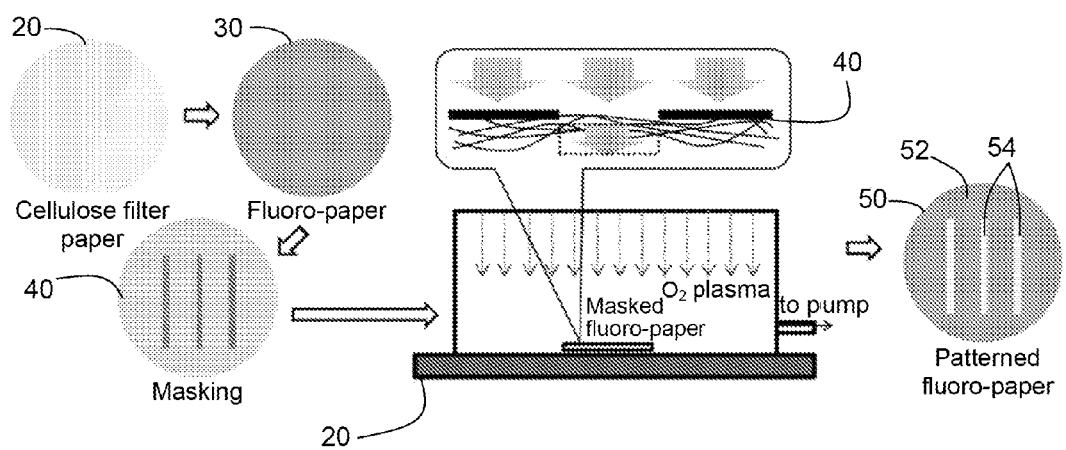

FIG. 5 shows a schematic of an exemplary process to fabricate omniphilic channels within an omniphobic background formed by surfaces coated with low energy fluoroalkyl silanes prepared in accordance with certain aspects of the present teachings.

Figure 6:
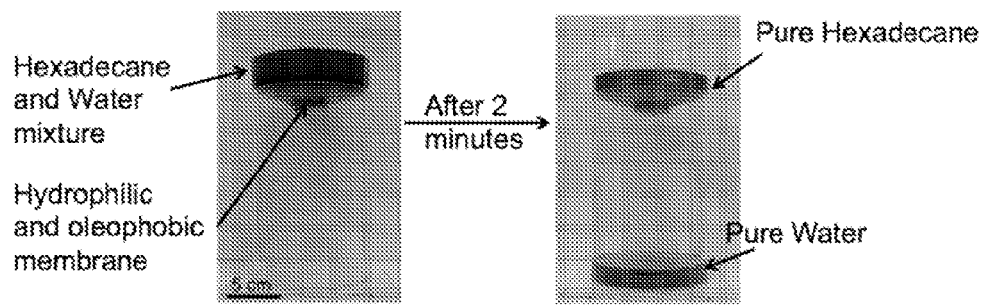

FIG. 6 shows photographs before and after separation of free oil and water by using a separator membrane having a hydrophilic and oleophobic surface coated with low energy fluoroalkyl silanes prepared in accordance with certain aspects of the present teachings.

Figure 7:
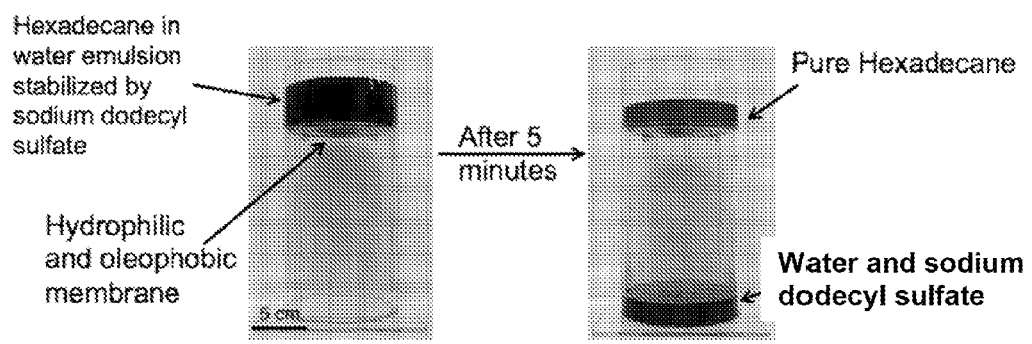

FIG. 7 shows photographs before and after separation of an emulsion of oil and water by using a separator membrane having a hydrophilic and oleophobic surface coated with low energy fluoroalkyl silanes prepared in accordance with certain aspects of the present teachings.

Figure 8:
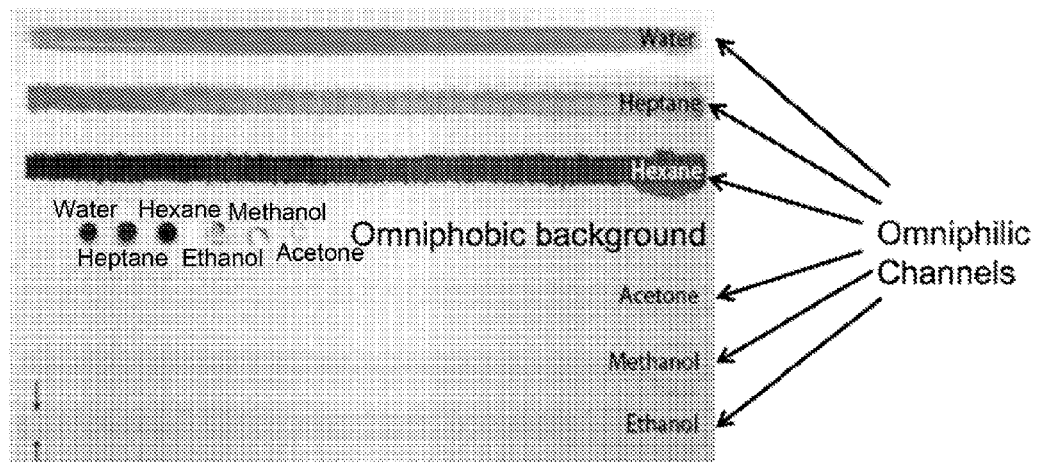

FIG. 8 shows a paper-based microfluidic device prepared by patterning a porous material having a surface coated with low energy fluoroalkyl silanes prepared in accordance with certain aspects of the present teachings. The fluid pathways are omniphilic (hydrophilic and oleophilic), while the background region is omniphobic (hydrophobic and oleophobic).

Figure 9:
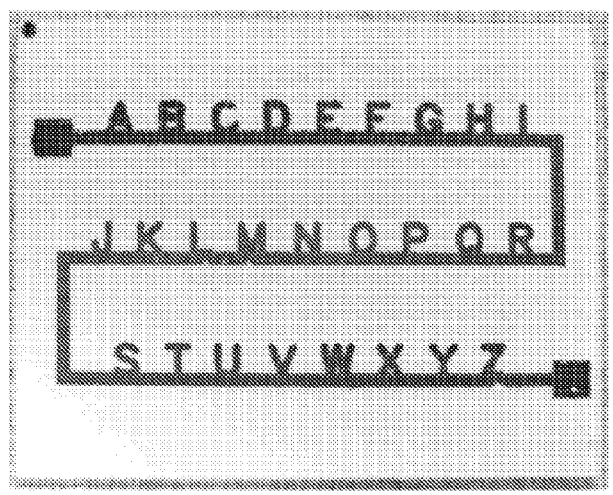

FIG. 9 shows various omniphilic shapes and sizes (including various letters) patterned within the omniphobic coated surface comprising low energy fluoroalkyl silanes prepared in accordance with certain aspects of the present teachings.

Figures 10A, 10B, 10C, 10D:
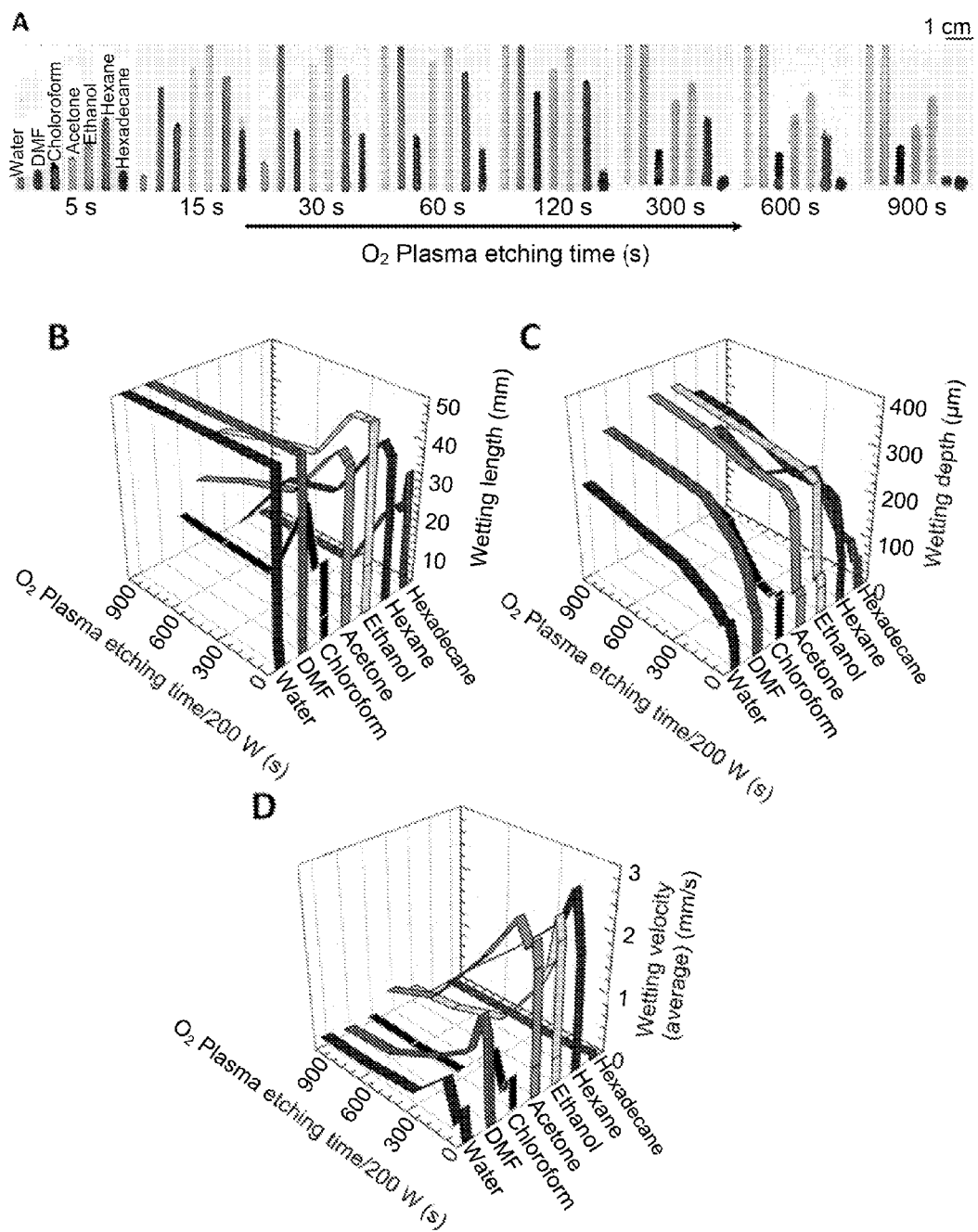
Figure 10E:
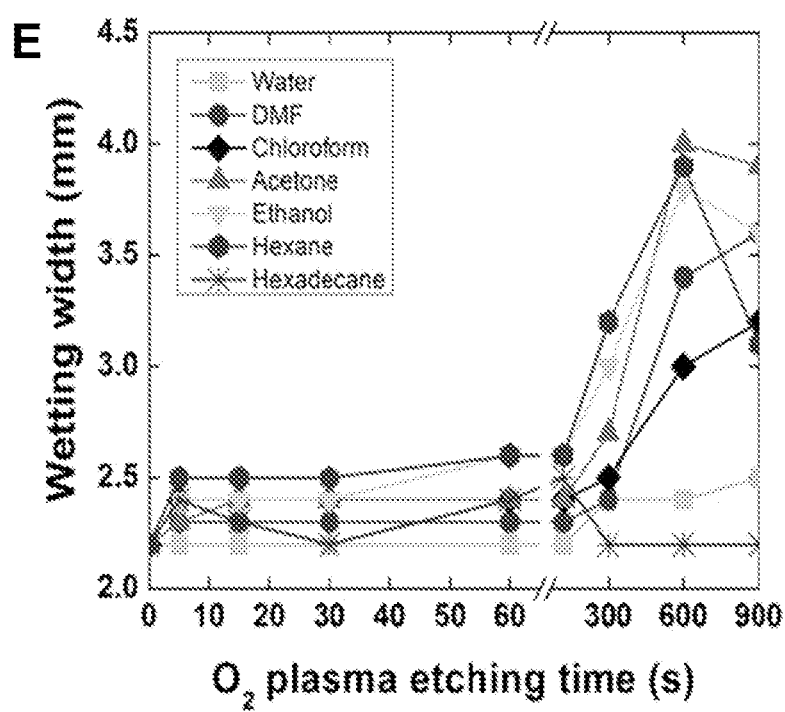

FIGS. 10A-10E show various aspects of fluid control on porous materials having patterns formed in surfaces coated with low energy fluoroalkyl silanes prepared in accordance with certain aspects of the present teachings. FIG. 10A is a patterned porous material having surfaces coated with low energy fluoroalkyl silanes prepared in accordance with certain aspects of the present teachings with straight fluidic channels formed therein (having dimensions of 50 mm in length and 2 mm width). The porous material is in the form of a chip and each has a surface coated with low energy fluoroalkyl silanes prepared in accordance with certain aspects of the present teachings. The chips are first masked, and then etched by $O_2$ plasma (200 W) at different time intervals. From left to right are 5 seconds, 15 seconds, 30 seconds, 60 seconds, 120 seconds, 300 seconds, 600 seconds and 900 seconds, respectively. Water (blue), dimethylformamide (DMF) (pink), chloroform (black), acetone (purplish gray), ethanol (light pink), hexane (wine) and hexadecane (dark red) are used for testing. Each channel is impregnated with 20 μL testing liquid and the chips are disposed horizontally on a bench. In FIG. 10B, wetting length, defined as the maximal horizontal distance that the impregnated liquid can reach, as a function of $O_2$ plasma etching time, is shown. FIG. 10C shows wetting depth, defined as the maximal vertical distance the impregnated liquid can reach (FIG. 16A), as a function of $O_2$ plasma etching time. The thickness of paper is 390 μm. FIG. 10D shows average wetting velocity, defined as wetting length over the time of impregnation, as a function of $O_2$ plasma etching time. FIG. 10E shows a wetting width, i.e. a lateral distance across each channel the impregnated liquid can reach. Each channel is designed to have a width of 2 mm.

Figures 11A, 11B, 11C, 11D, 11E:
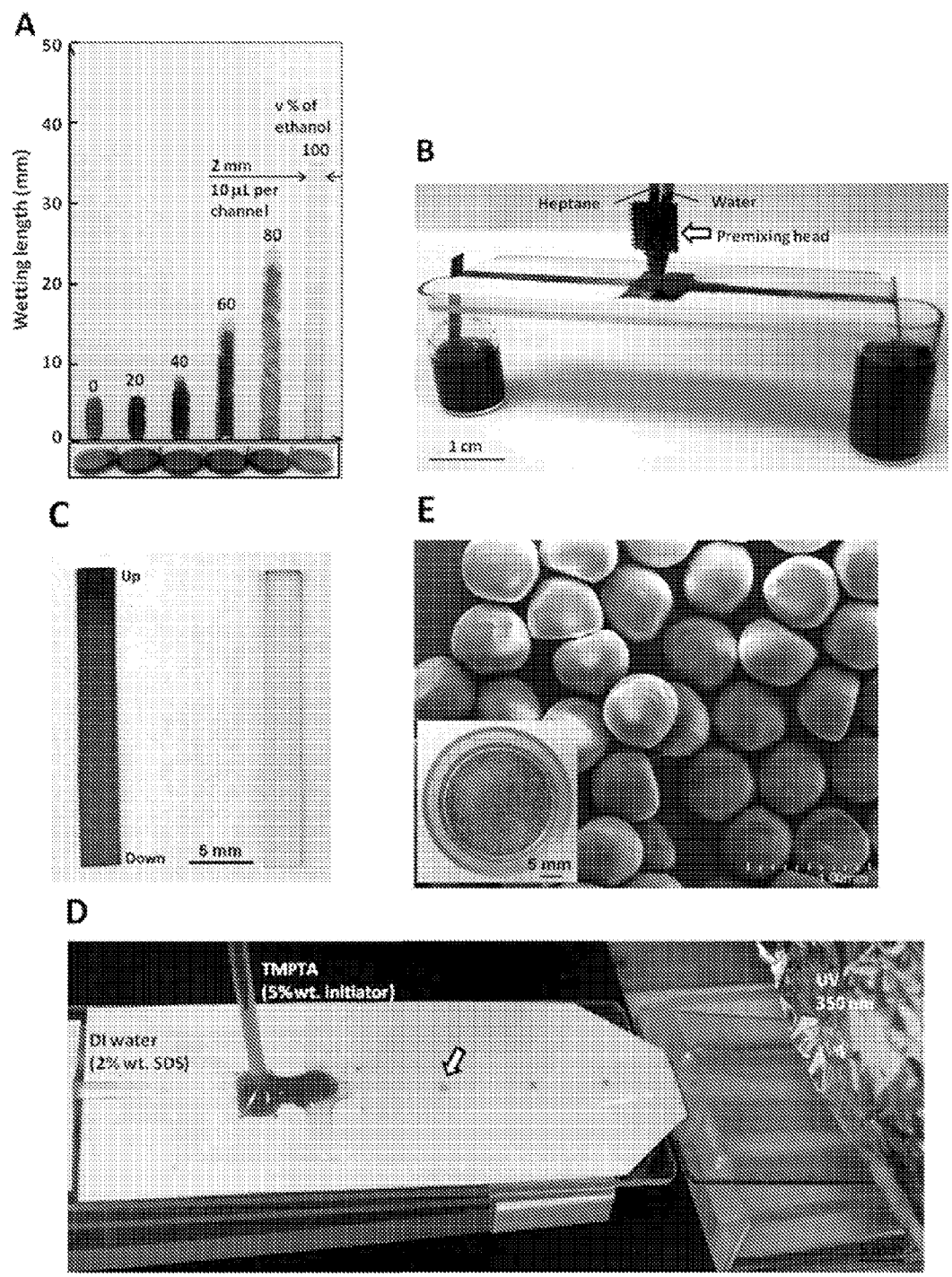
Figure 17:
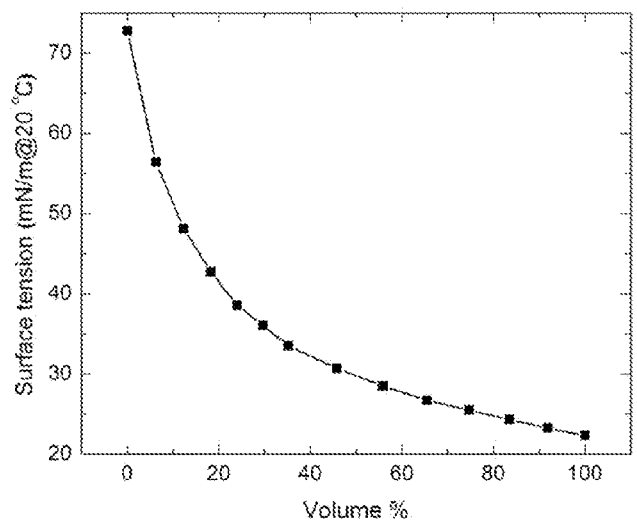

FIGS. 11A-11E show two-dimensional channels formed in porous material chips having surfaces coated with low energy fluoroalkyl silanes prepared in accordance with certain aspects of the present teachings, which have integrated extreme wettabilities. FIG. 11A shows a photographs of a paper substrate based alcoholmeter formed in accordance with certain aspects of the present disclosure. The alcoholmeter comprises a plurality of hydrophobic and oleophilic straight channels (50 mm long and 2 mm wide) prepared by $O_2$ plasma etching in 200 W/15 seconds. Each channel is filled with 10 μL water-ethanol mixture in a series of volume concentration of ethanol (from left to right, 0% (pure water dyed in blue), 20%, 40%, 60%, 80% and 100% (pure ethanol dyed in red)) (FIG. 17). The wetting length from each channel can be read out as 5.5 mm (0%), 5.8 mm (20%), 8.0 mm (40%), 15.2 mm (60%), 24.5 mm (80%) and 34.5 mm (100%), respectively. FIG. 11B shows an exemplary separation device for a continuous surface oil-water separation process. A hydrophobic and oleophilic (HP/OL) fluidic channel (left in image, $O_2$ plasma etching in 200 W/15 seconds) is integrated with a hydrophilic and oleophobic (HL/OP) channel (right in image, $O_2$ plasma etching in 200 W/900 seconds) as one oil-water separation unit on the surface of the porous material. A heptane-water mixture is channeled to the central reservoir through a premixing head, and pure heptane and water are collected at each end of the channel. Two pieces of untreated filter paper are used as guiding strips to link each channel and liquid collector. FIG. 11C is a purity check after separation from the guiding strips in FIG. 11B. The end marked "Up" was put upward in the liquid collector during separation. FIG. 11D shows a device for surface emulsification incorporating a porous material having surfaces coated with low energy fluoroalkyl silanes prepared in accordance with certain aspects of the present teachings. A flow focusing geometry is made on porous materials having surfaces coated with low energy fluoroalkyl silanes to control external (DI water with 2% wt. SDS) and inner (precursor—TMPTA with 5% wt. initiator) fluids (also shown in FIG. 18). The external water channel is HL/OP and prepared by $O_2$ plasma etching in 200 W/300 seconds, the internal precursor channel is HP/OL and prepared by $O_2$ plasma etching at 200 W/15 seconds. External fluid is first pumped to fill the water channel, followed by the impregnation of inner fluid in the inner precursor channel. The external channel flow rate (1500 μL min$^{-1}$) and inner channel flow rate (5 μL min$^{-1}$) are controlled by syringe pumps. A 350 nm UV lamp is mounted above the collector to crosslink the emulsion microdroplets. FIG. 11E shows an SEM image of the crosslinked polymeric microparticles. All of the particles are hemispheres with a diameter around 500 μm of the pedestal circle. The inset in FIG. 11E is a photograph of the polymeric microparticles from 1 hour emulsification (dyed in red and collected in a glass vial).

FIGS. 12A-12C show a three-dimensional (3D) all-liquid porous material fluidic chip devices having surfaces coated with low energy fluoroalkyl silanes with extreme wettabilities. FIG. 12A is a schematic illustration of the structure and layout of 4×4 bridge matrix integrated on a single piece of fluoroalkyl silane coated paper as a 3D fluidic chip. The two groups of orthogonally arranged channels are numbered as in x direction and in y direction in an order of testing liquids: water (blue), DMF (pink), heptane (wine) and ethanol (green). High power $O_2$ plasma etching (350 W) is locally applied to each channel to get an optimal flow rate for different liquids. The etching times are, 180 seconds for water channels, 60 seconds for DMF channels, 30 seconds for heptane channels and 15 seconds for ethanol channels. The dimensions of the fluidic channels (1, 2, 3, 4) in x direction are 25 mm (length)×1.8 mm (width). The dimensions of the fluidic channels (a, b, c, d) in y direction are 50 mm (length)×3 mm (width). The bridges are 10 mm in length. Each bridge is of a pair of perforations in three and of 500 µm in diameter. FIG. 12B shows z+ side of the 3D chip after being filled with the four testing liquids. FIG. 12C shows z− side of the same 3D chip, which is turned over along the short edge.

Figure 13:
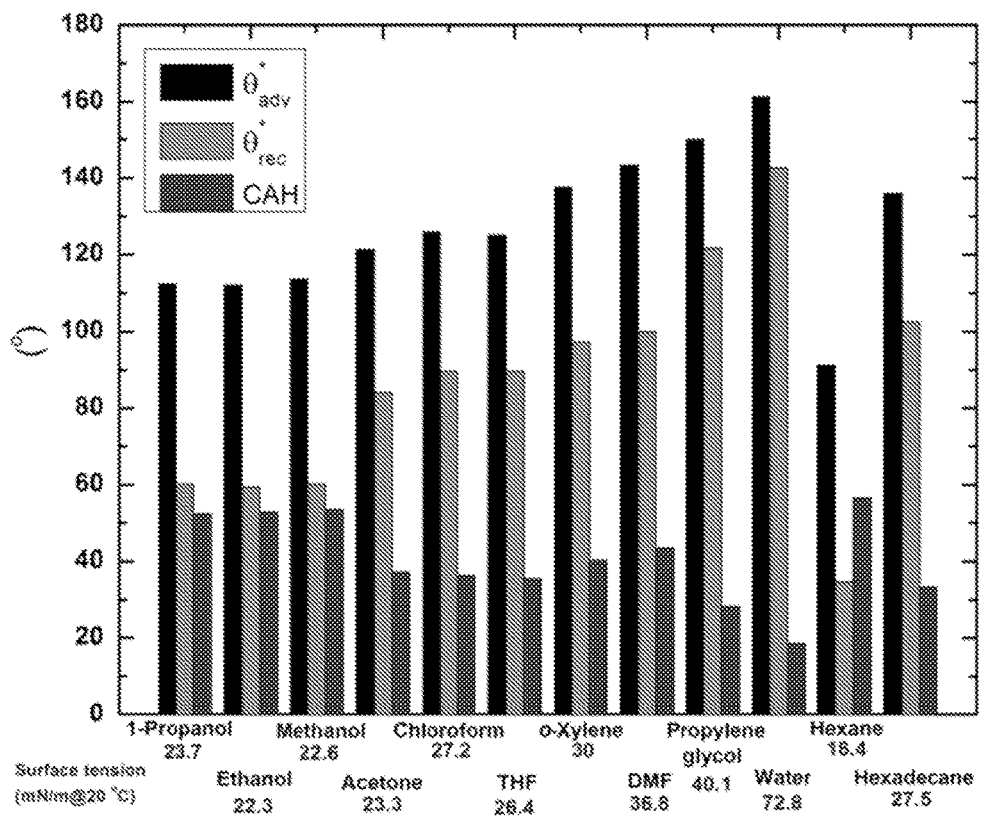

FIG. 13 shows contact angles on porous paper materials having omniphobic surfaces coated with deep fluorinated silanes prepared in accordance with certain aspects of the present teaching.

Figure 1:
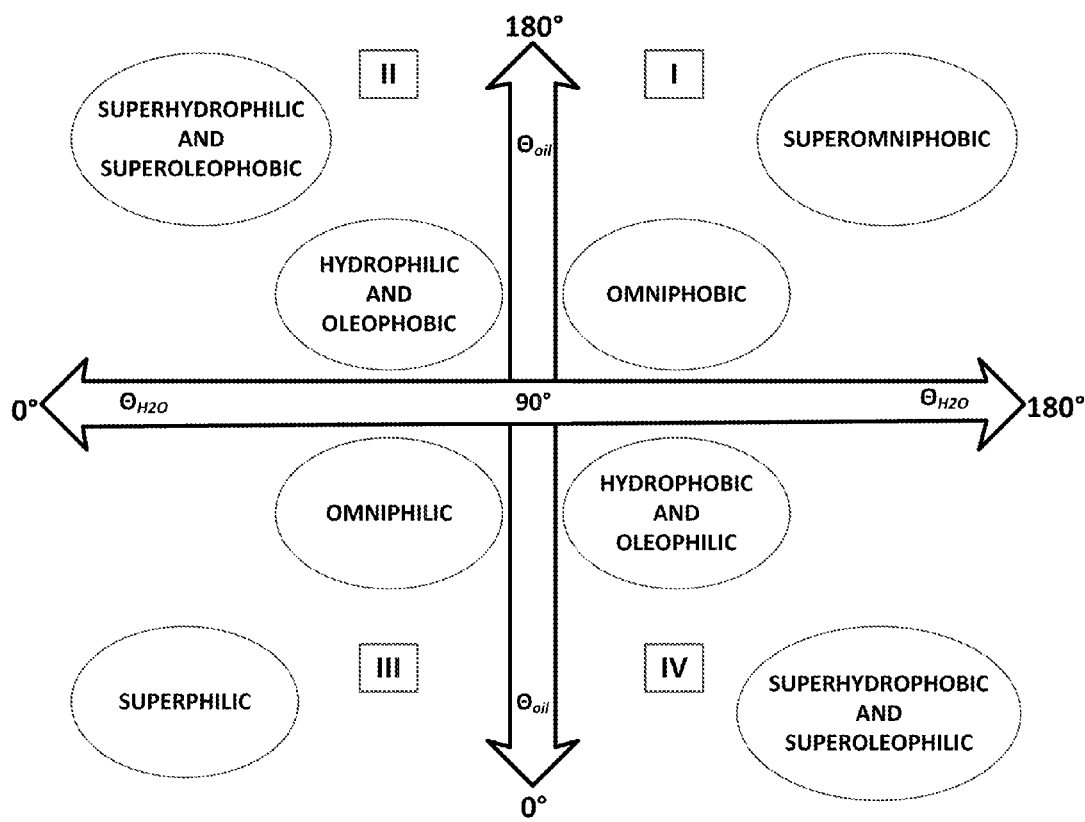
FIG. 1 shows quadrants of contact angle axes (from 0° to 180°) quadrants for surfaces having extreme wettabilities.
Figures 1, 15A:
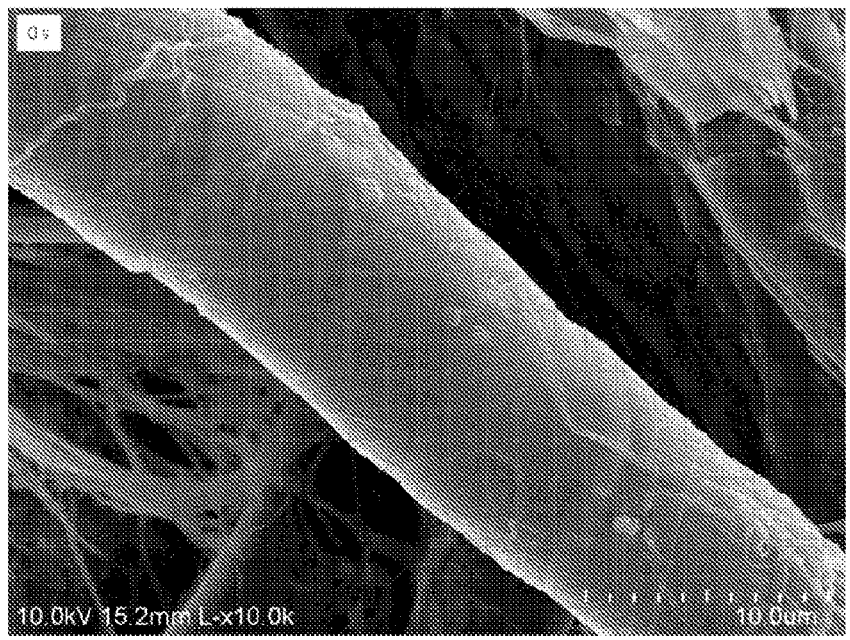
Figures 2, 15A:
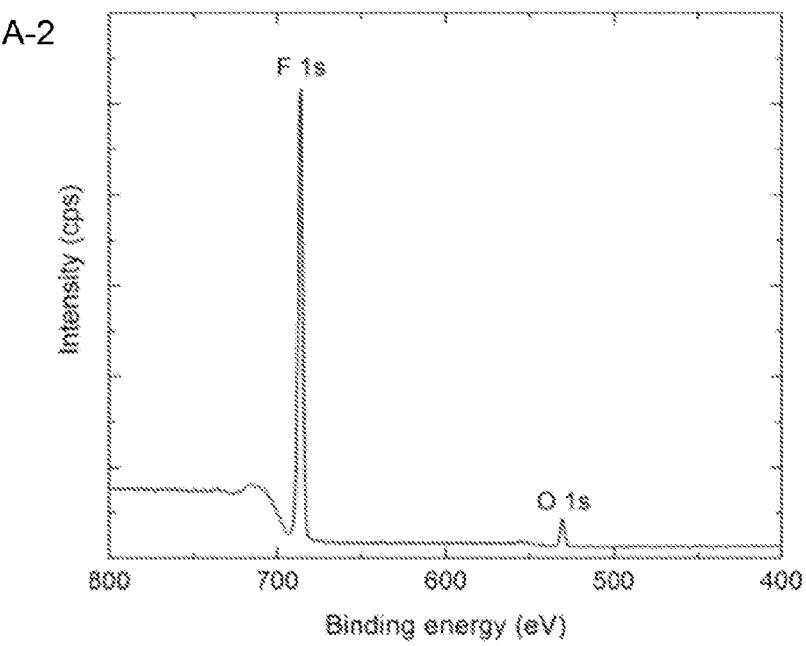
Figures 3, 15A:
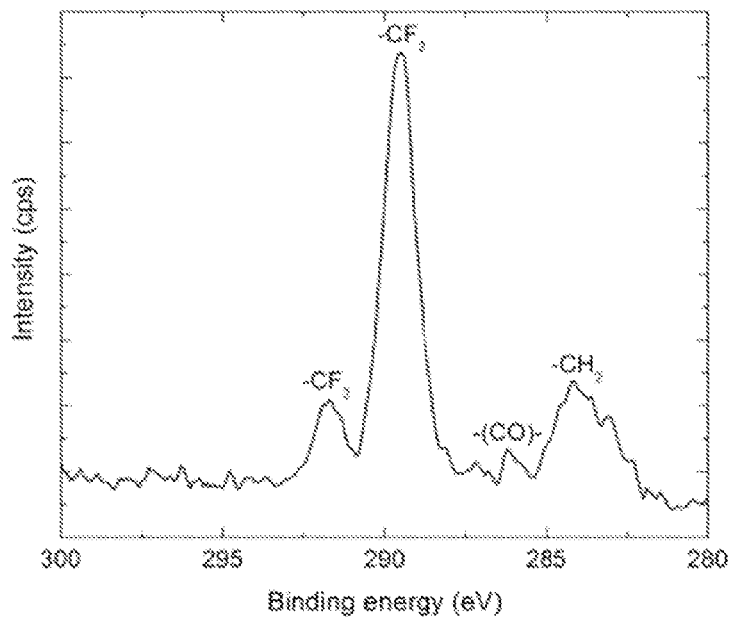
Figures 1, 15B:
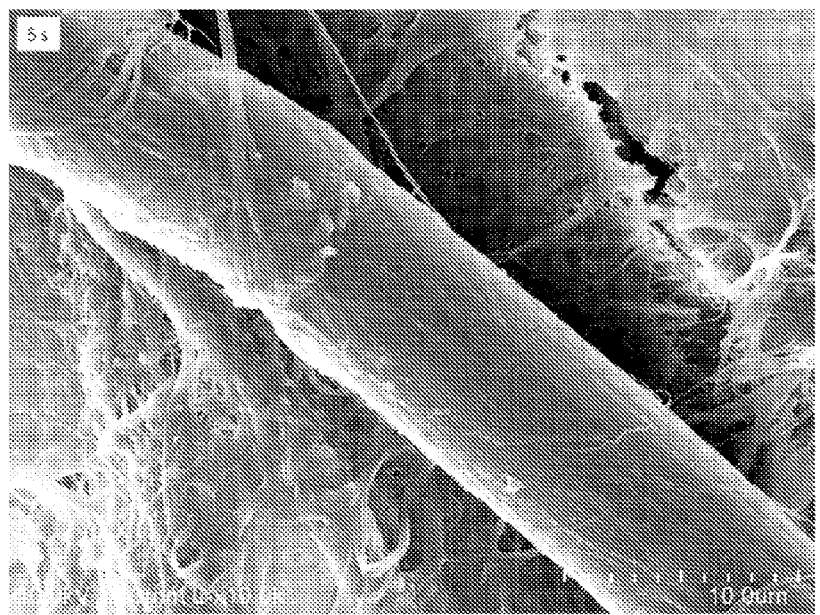
Figures 2, 15B:
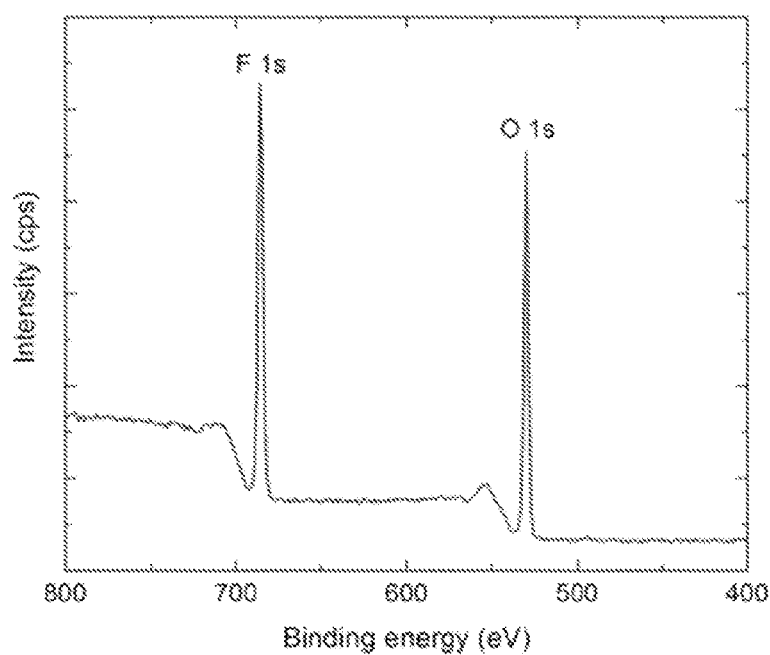
Figures 3, 15B:
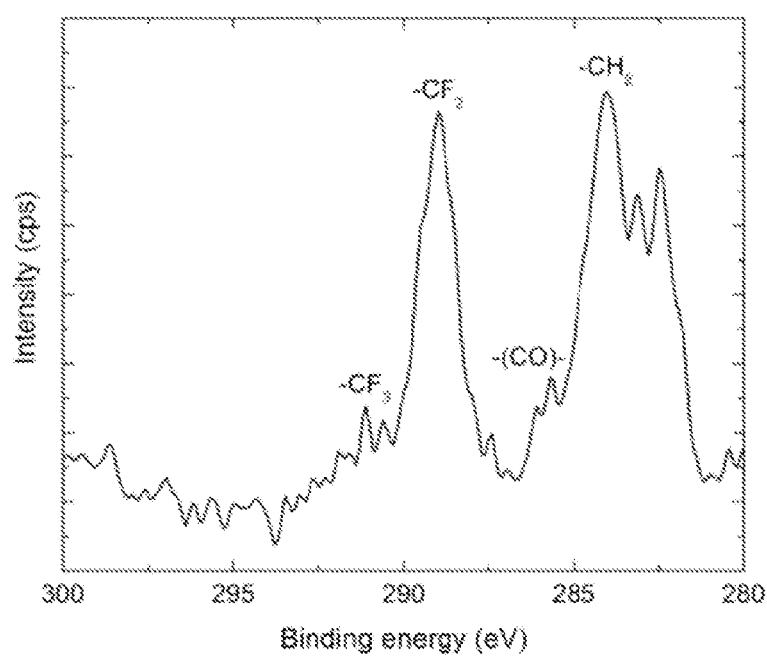
Figures 1, 15C:
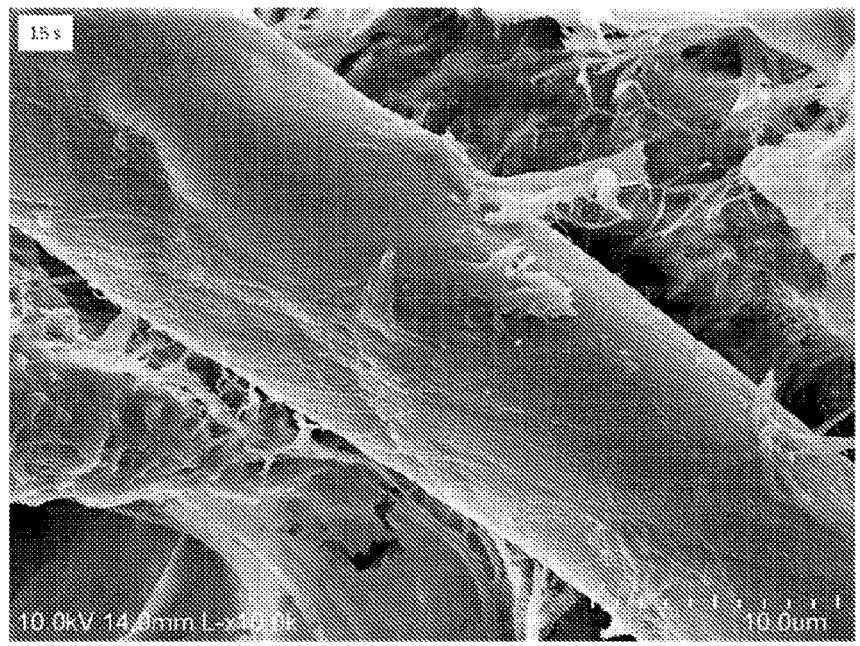
Figures 2, 15C:
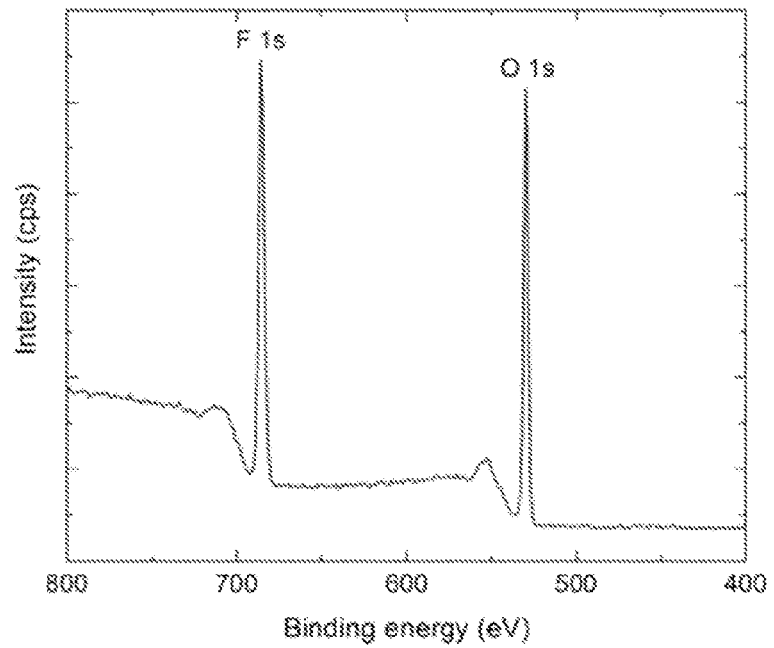
Figures 3, 15C:
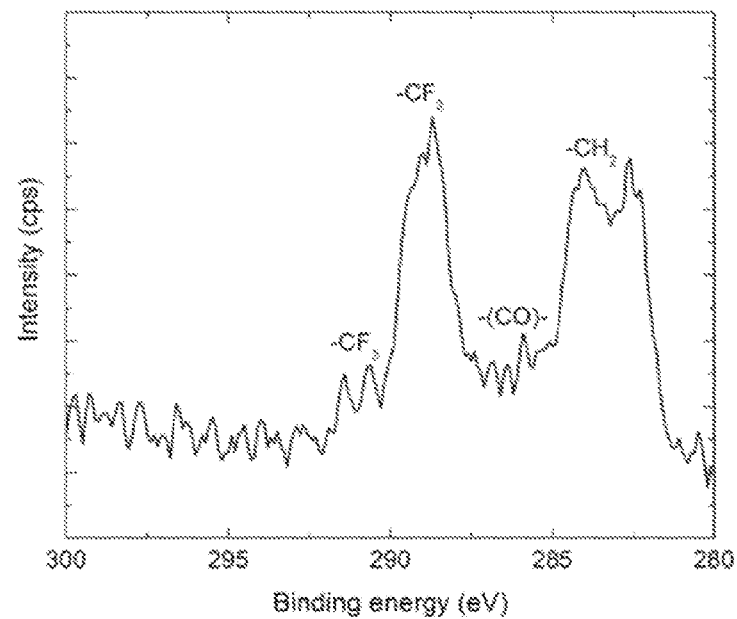
Figures 1, 15D:
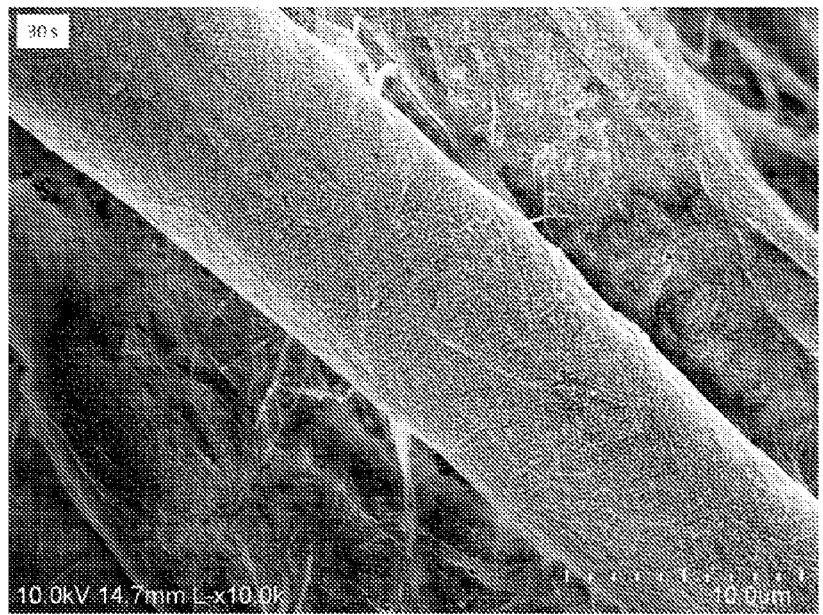
Figures 2, 15D:
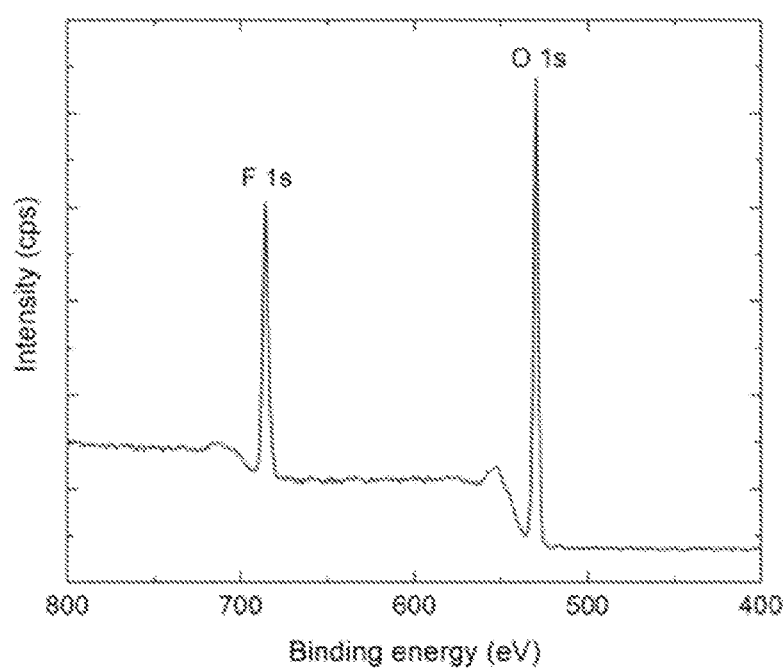
Figures 3, 15D:
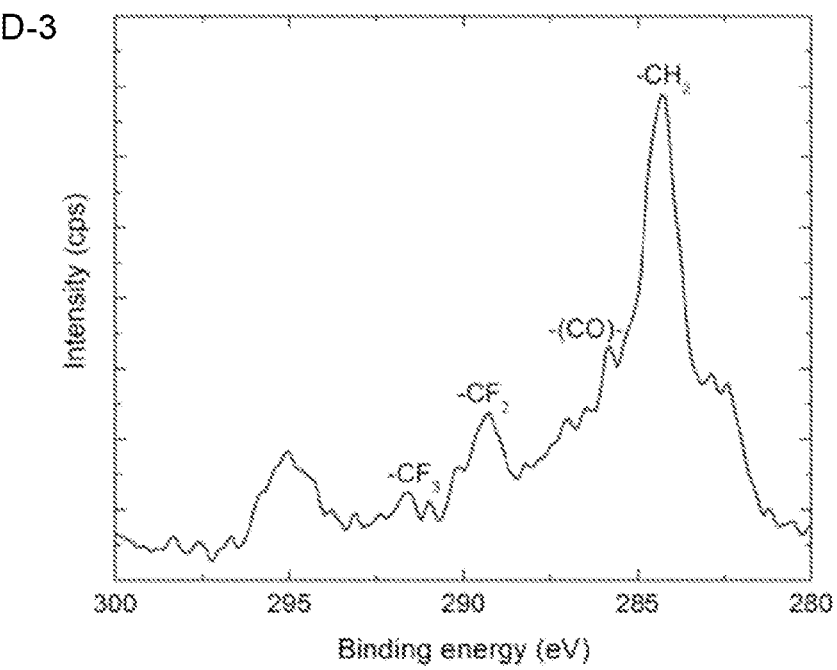
Figures 1, 15E:
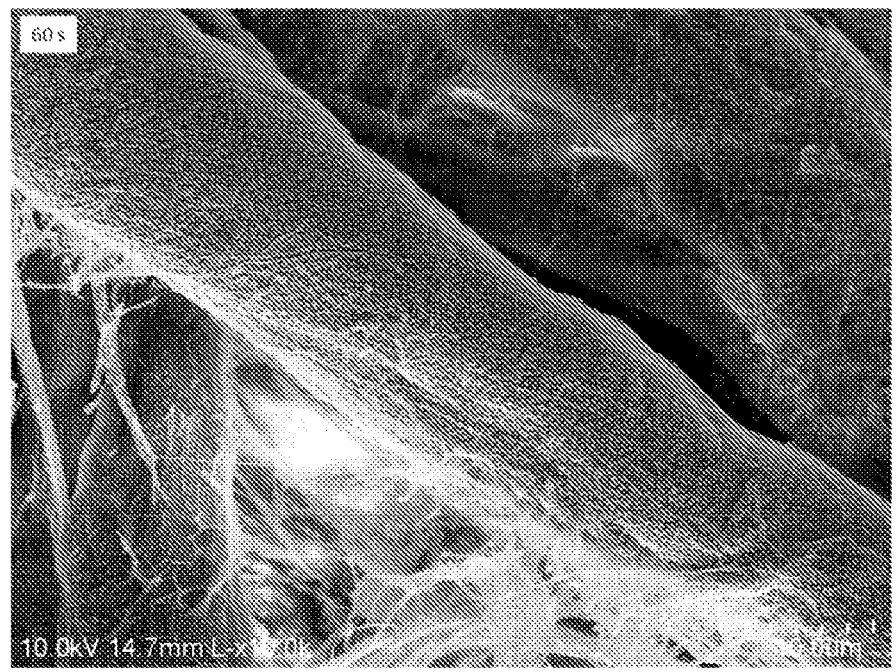
Figures 2, 15E:
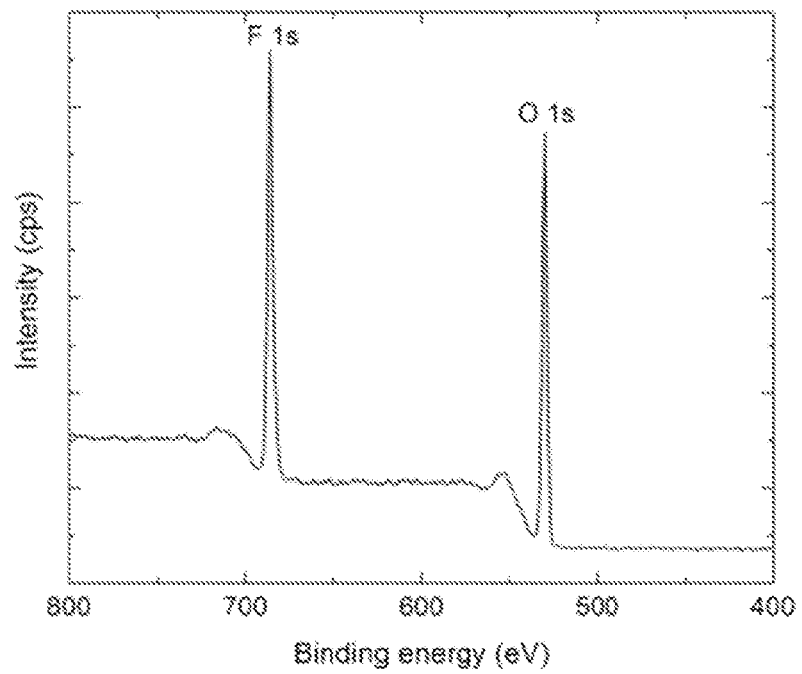
Figures 3, 15E:
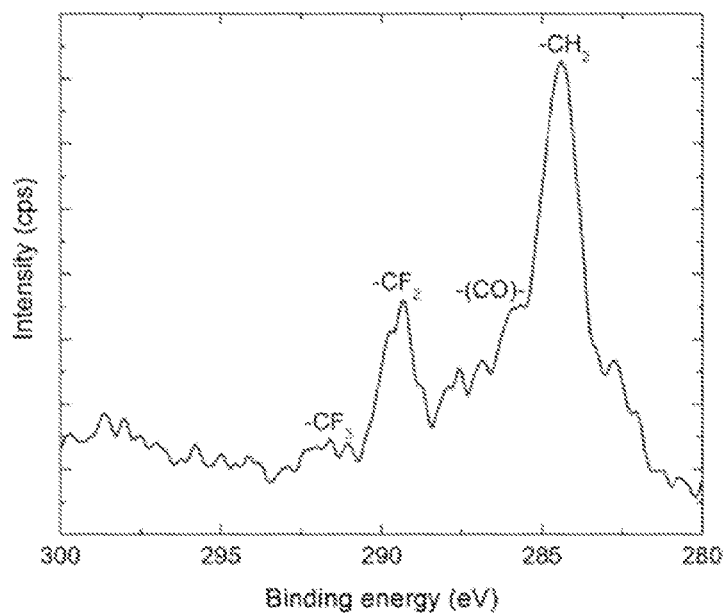
Figures 1, 15F:
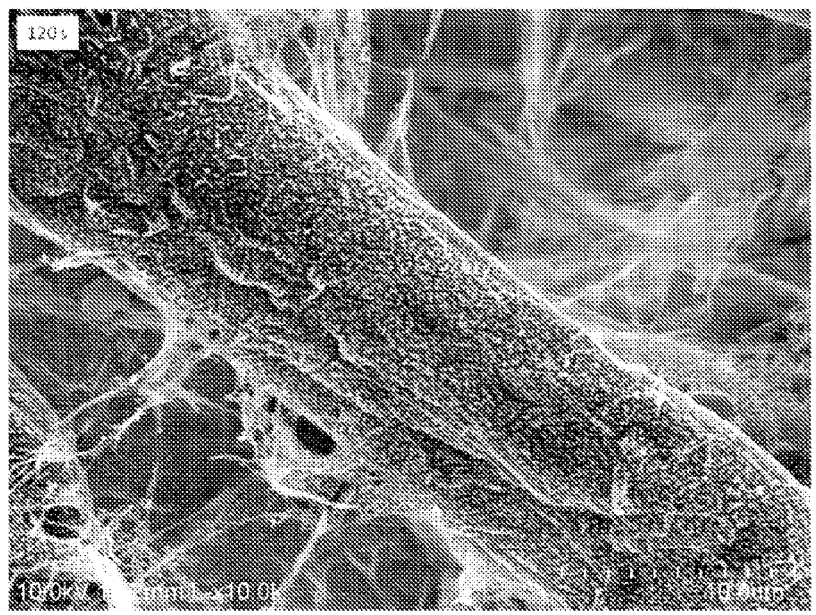
Figures 2, 15F:
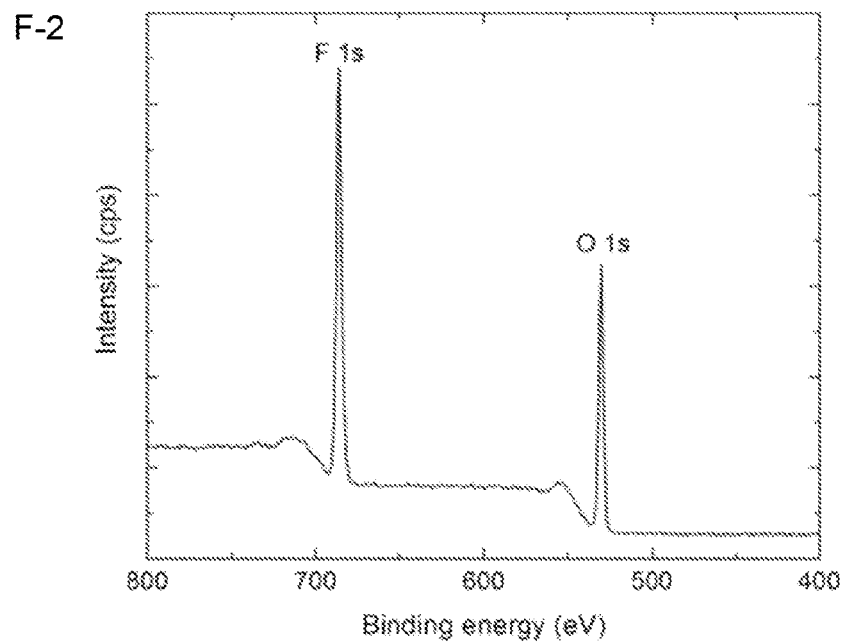
Figures 3, 15F:
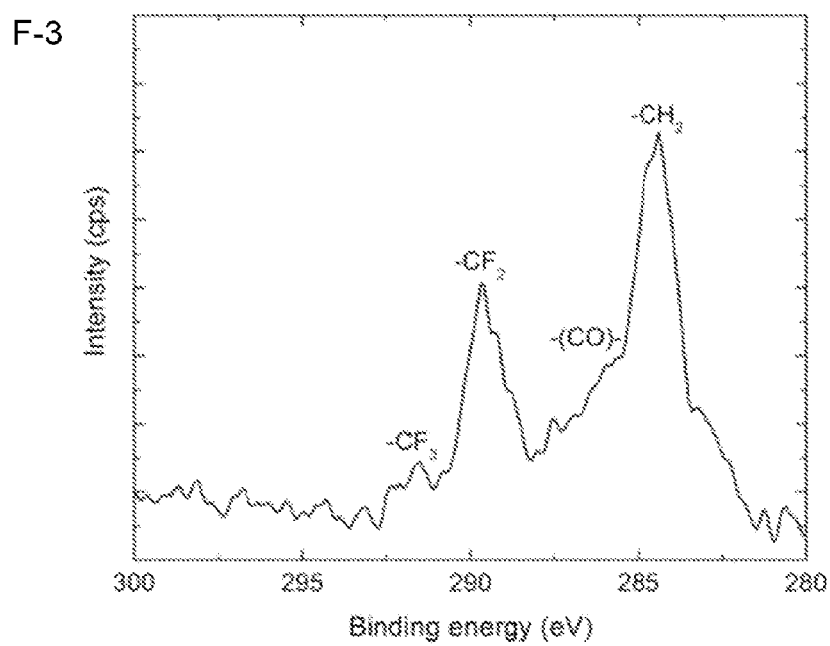
Figures 1, 15G:
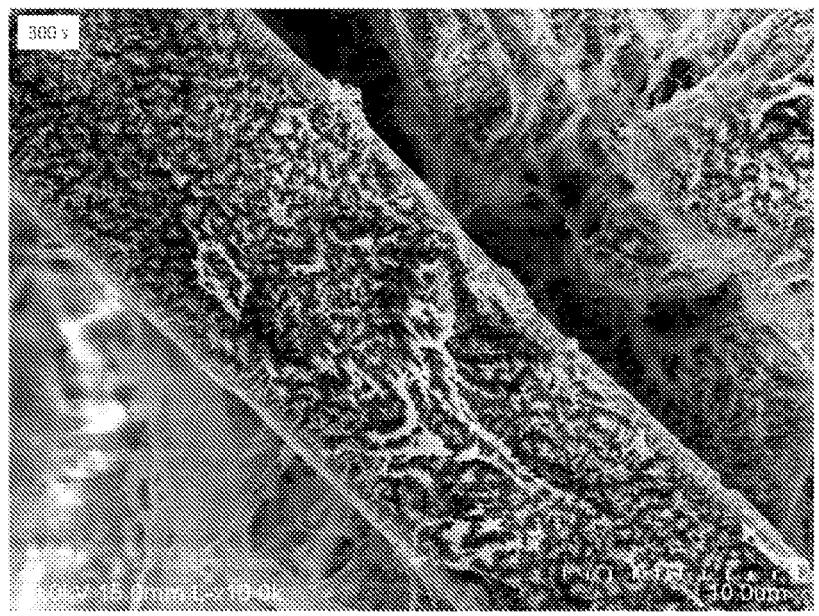
Figures 2, 15G:
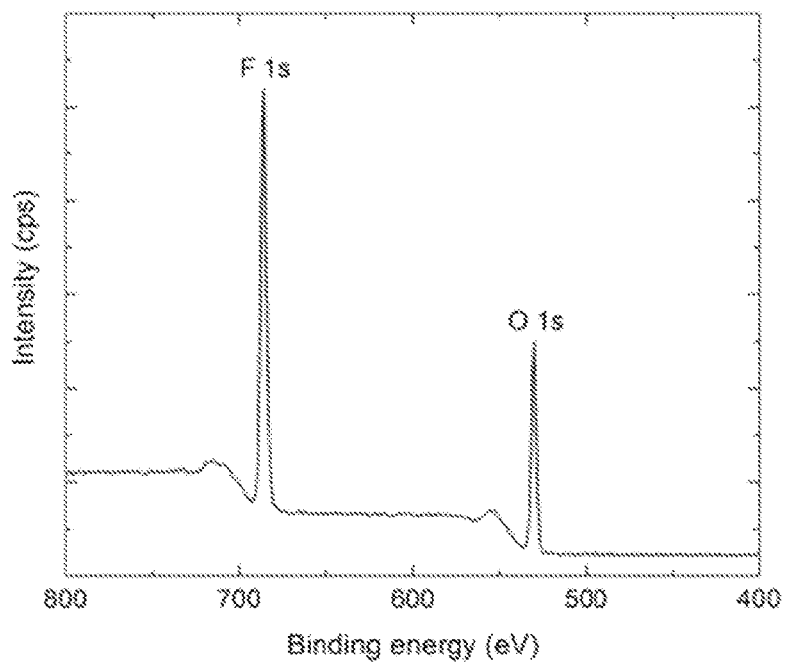
Figures 3, 15G:
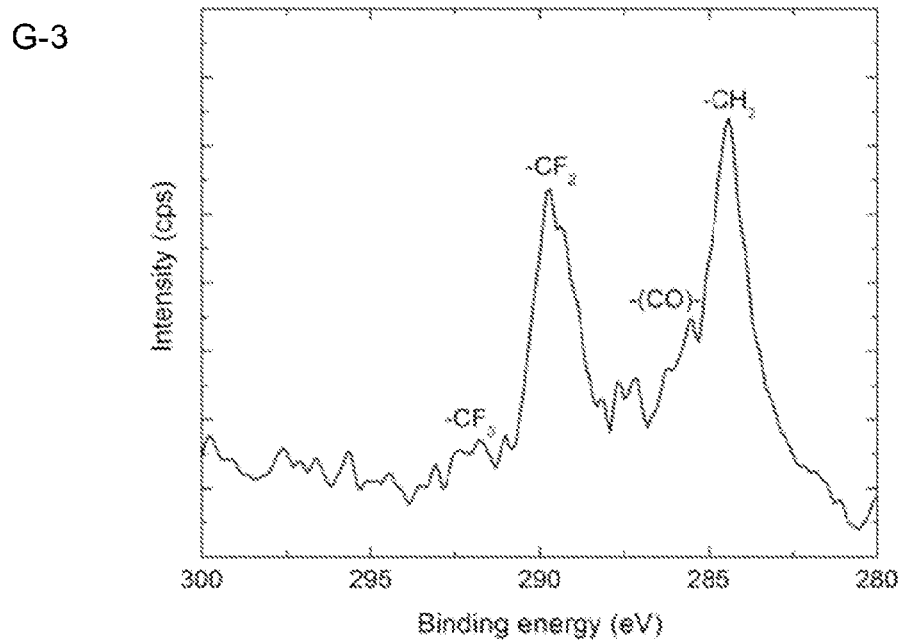
Figures 1, 15H:
Figures 2, 15H:
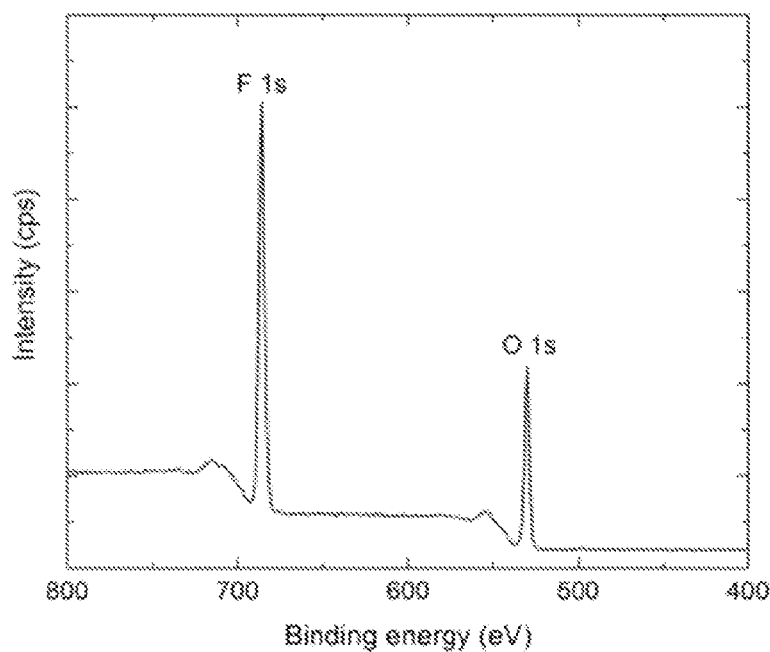
Figures 3, 15H:
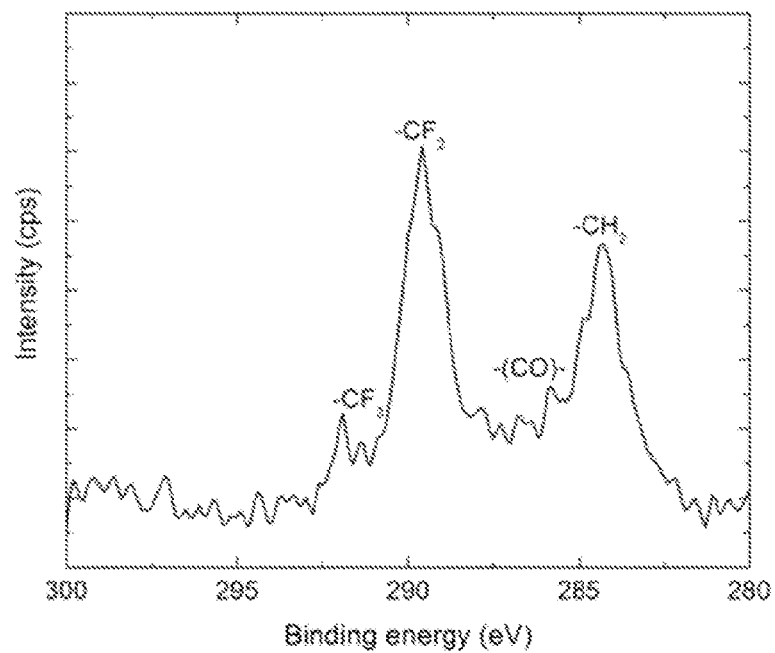
Figures 1, 15I:
Figures 2, 15I:
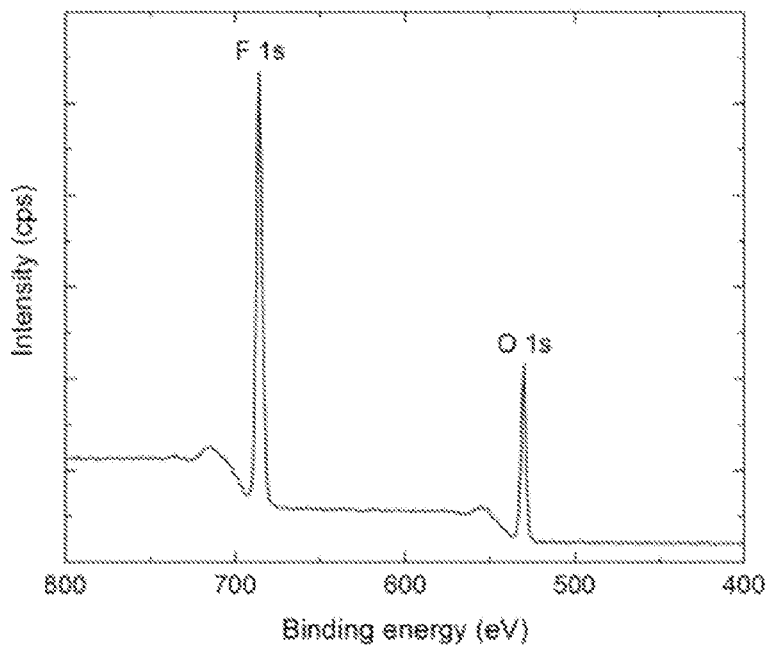
Figures 3, 15I:
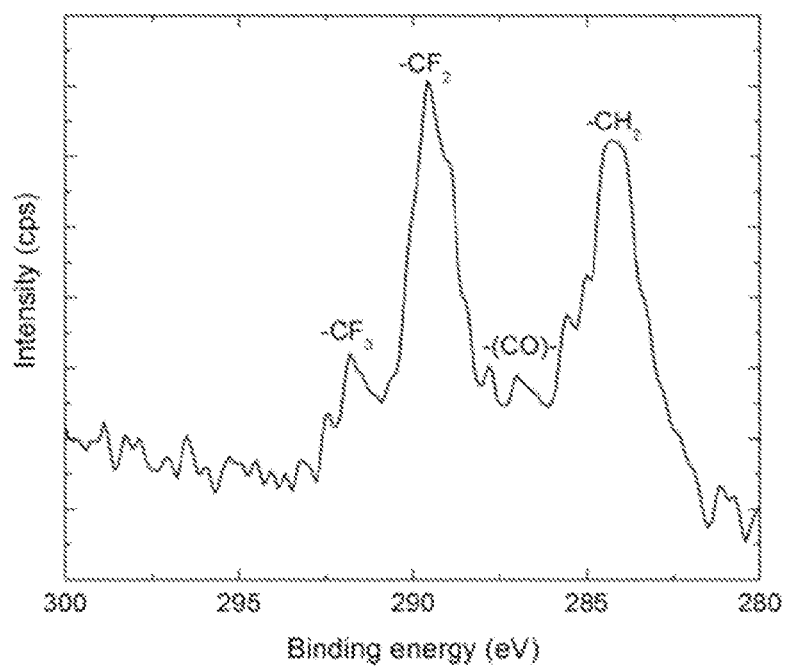
Figure 15J:
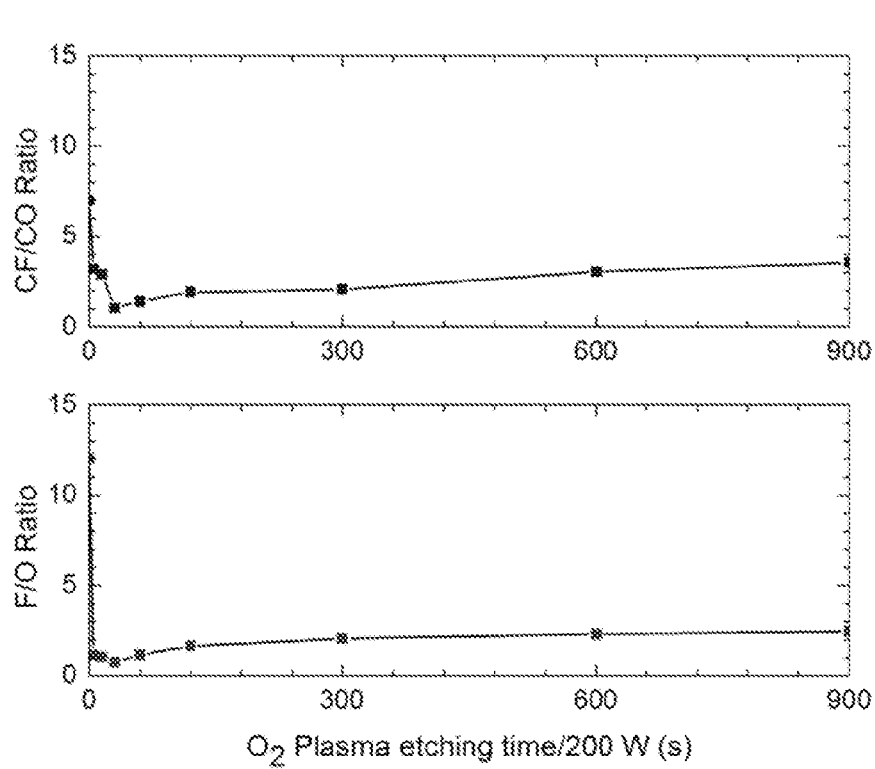

FIG. 14 shows advancing contact angles ($\theta^*_{adv}$) on a porous paper substrate having a coated surface with low energy fluoroalkyl silanes prepared in accordance with certain aspects of the present teachings and etched with $O_2$ plasma at varying etching times (ranging from 0 to 900 seconds). $\theta^*_{adv}$ for water, ethanol, hexadecane, and hexane are shown FIGS. 15A-1 to 15J are scanning electron microscopy (SEM) images and x-ray photoelectron spectroscopy (XPS) of porous materials having surfaces coated with low energy fluoroalkyl silanes with different time of $O_2$ plasma etching prepared in accordance with certain aspects of the present teachings.

Figures 16A, 16B:
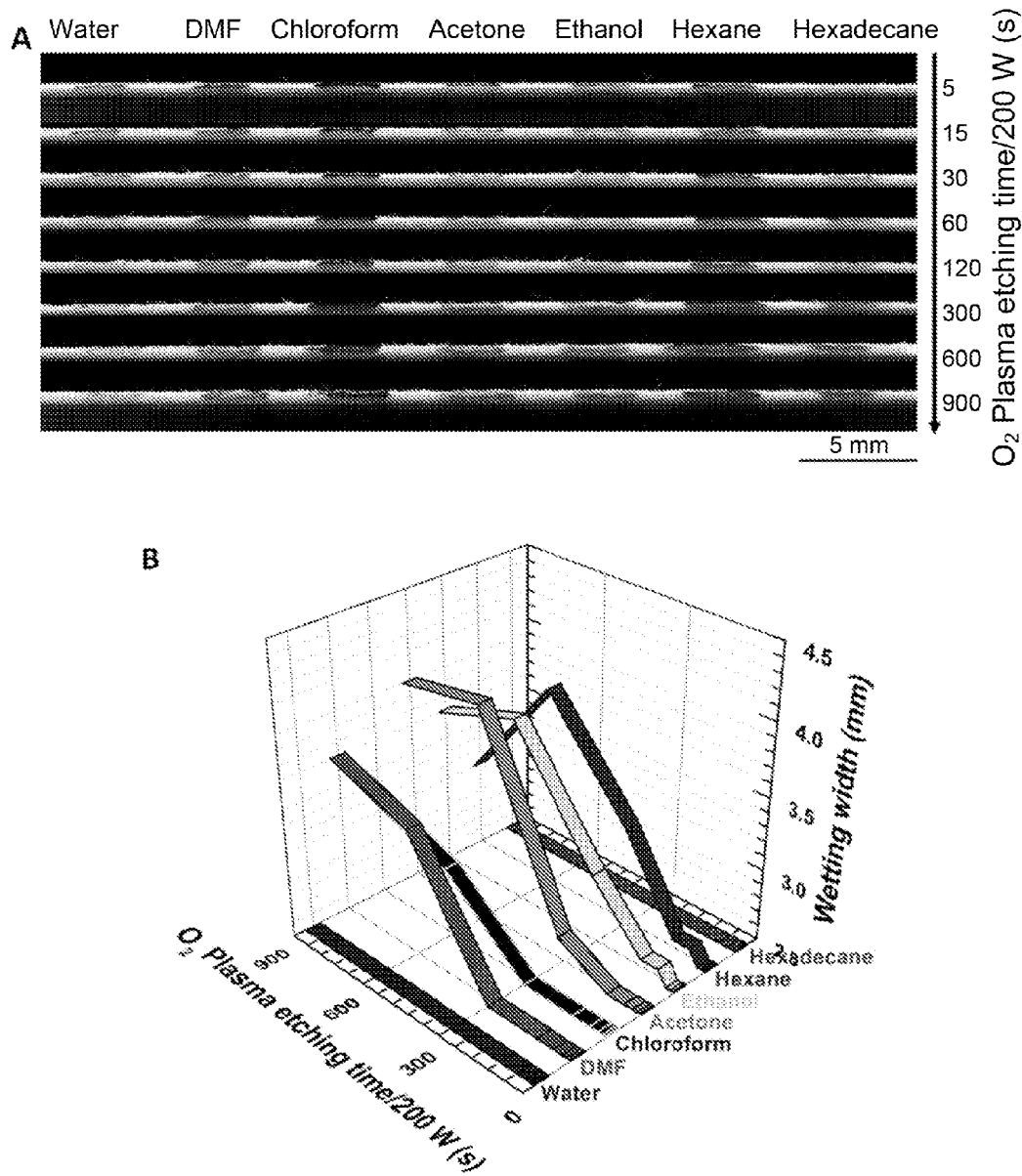

FIGS. 16A-16B. FIG. 16A is an optical image of the cross-section of two-dimensional (2D) channels formed in surfaces coated with low energy fluoroalkyl silanes having extreme wettabilities prepared in accordance with certain aspects of the present teachings and filled with seven test liquids. FIG. 16B shows plasma etching time versus wetting width (mm) for water, DMF, chloroform, acetone, ethanol, hexane, and hexadecane.

FIG. 17 shows surface tension of a water-ethanol binary mixture.

Figure 18:
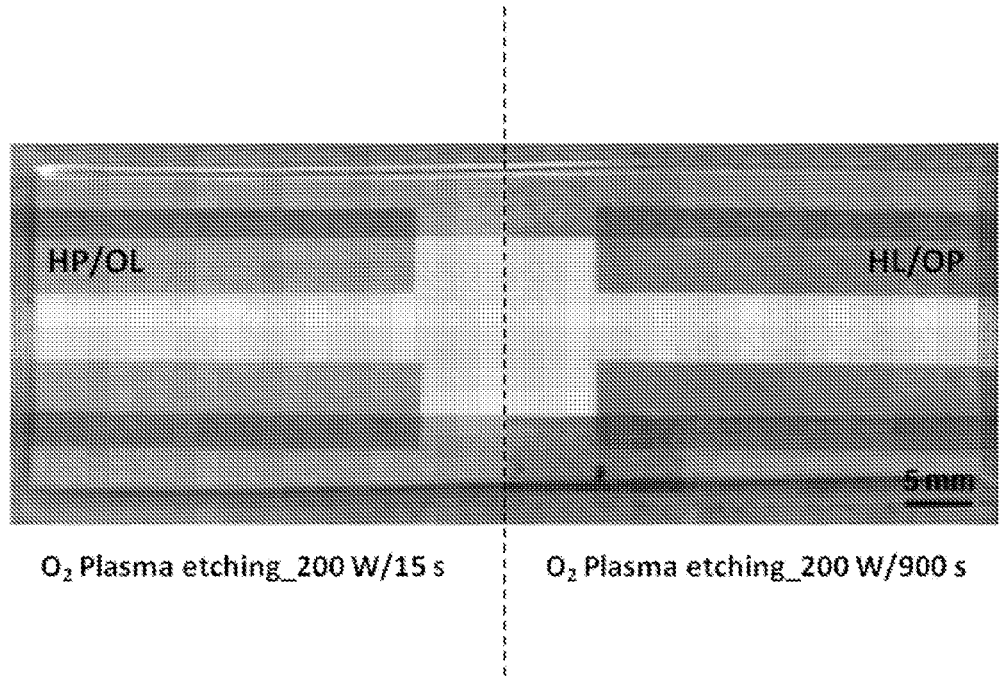

FIG. 18 shows design of geometry for a continuous surface oil-water separator device formed on porous surfaces coated with low energy fluoroalkyl silanes having extreme wettabilities prepared in accordance with certain aspects of the present teachings.

Figures 19A, 19B, 19C:
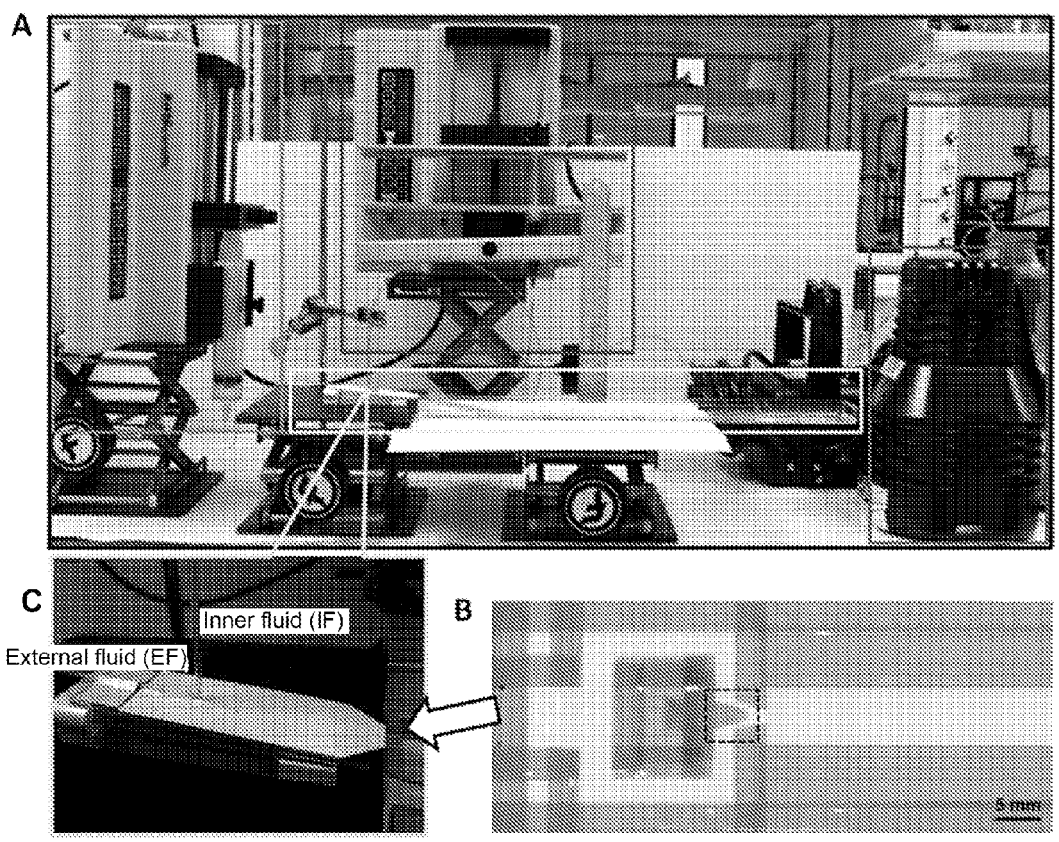

FIGS. 19A-19C show flow focusing geometry on porous materials having surfaces coated with low energy fluoroalkyl silanes prepared in accordance with certain aspects of the present teachings used for joining distinct streams for surface emulsification. FIG. 19A is a photograph of the device setup. FIG. 19B is a photograph showing a surface of the fluidic device used in the device of FIG. 19A, where the surface has an inner fluid channel and an outer or external fluid channel. FIG. 19C is a detailed view of the surface of the fluidic device shown in FIG. 19B.

Figures 20A, 20B, 20C, 20D:
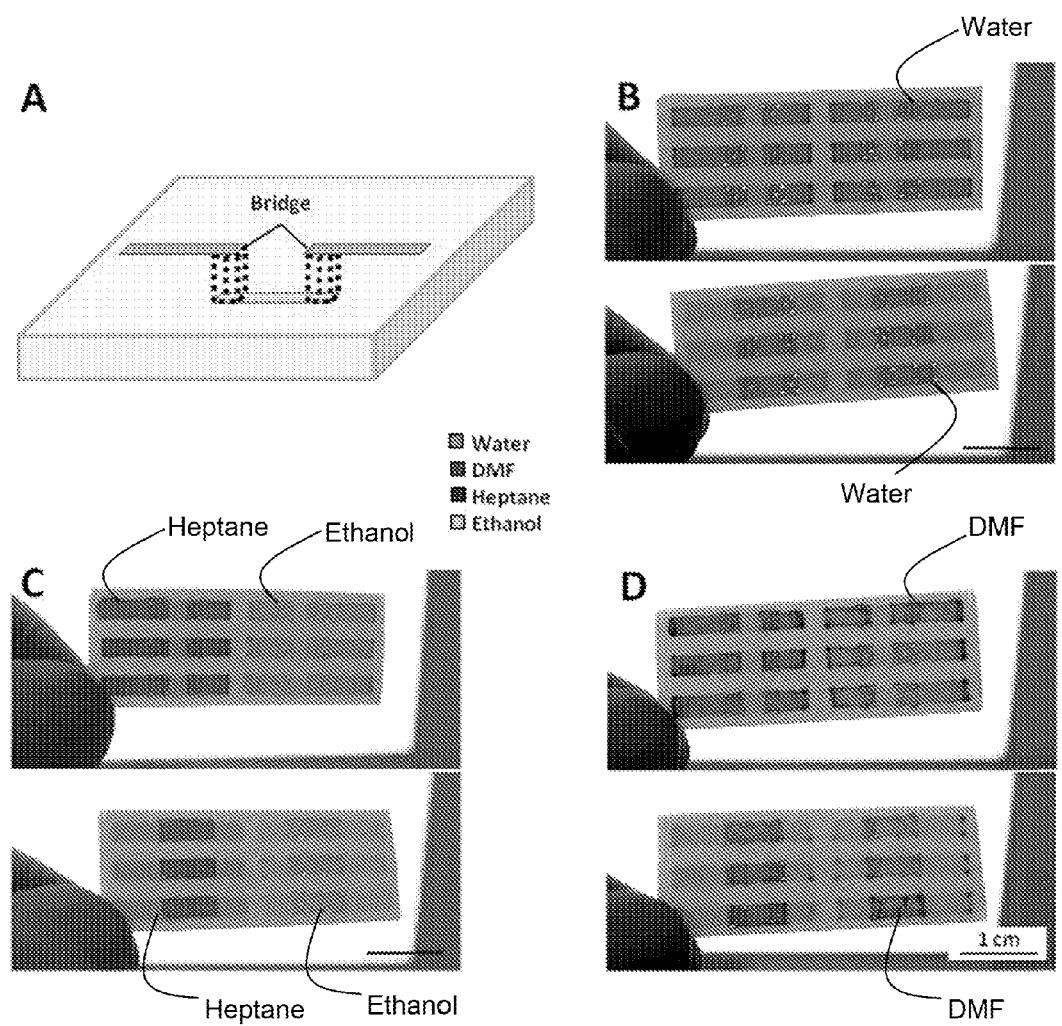

FIGS. 20A-20D show a fluidic device formed on a porous paper substrate having a coated surface with low energy fluoroalkyl silanes prepared in accordance with certain aspects of the present teachings. The fluidic device is used for a single-liquid and configured for three-dimensional (3D) liquid flow. FIG. 20A is a schematic of a single 3D channel with a bridge formed between an upper portion of the channel and a lower portion of the channel. FIGS. 20B-20D show top and bottom vies of such 3D channel separators tested with water, DMF, heptane, and ethanol.

Figure 21A:
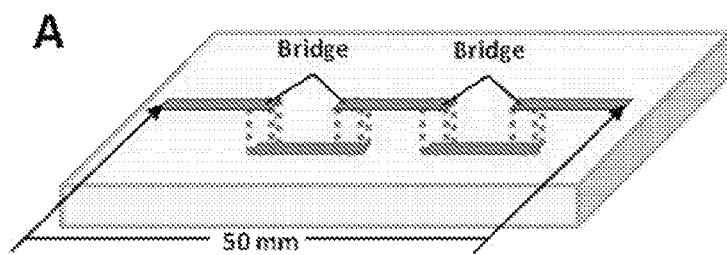
Figure 21B:
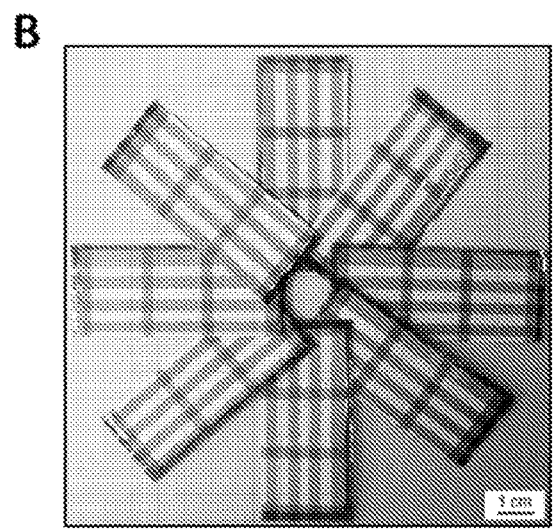
Figure 21C:
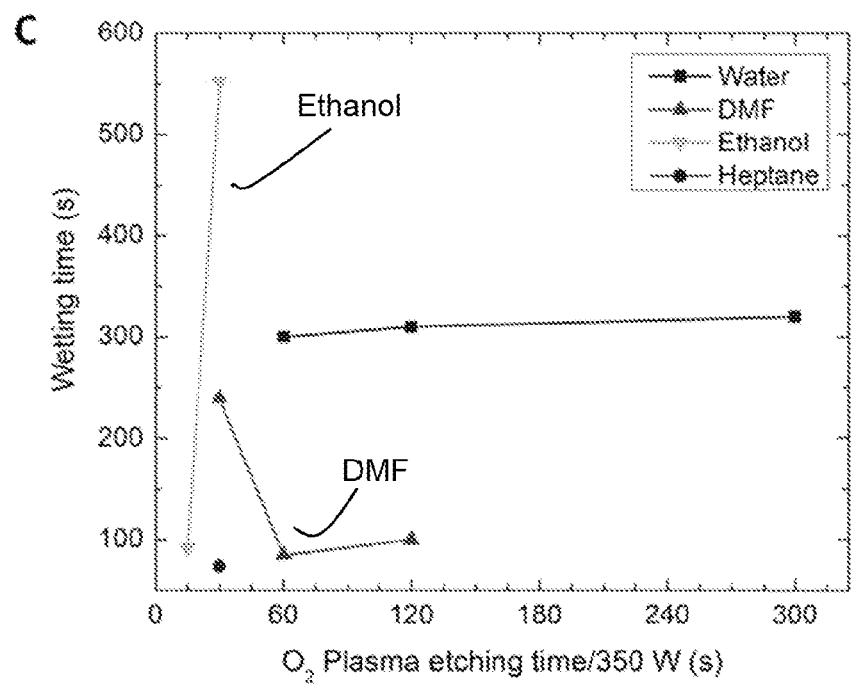

FIGS. 21A-21C show wetting time optimization on 3D fluidic channels in a fluidic device formed on a porous paper substrate having a coated surface with low energy fluoroalkyl silanes prepared in accordance with certain aspects of the present teachings. FIG. 21A is a schematic showing two bridges forming a 3D fluidic pathway for a fluidic device. FIG. 21 B is an assembly of multiple fluidic substrates centrally joined. Wetting times for water, DMF, ethanol, and heptane are provided in FIG. 21C.

Figure 22:
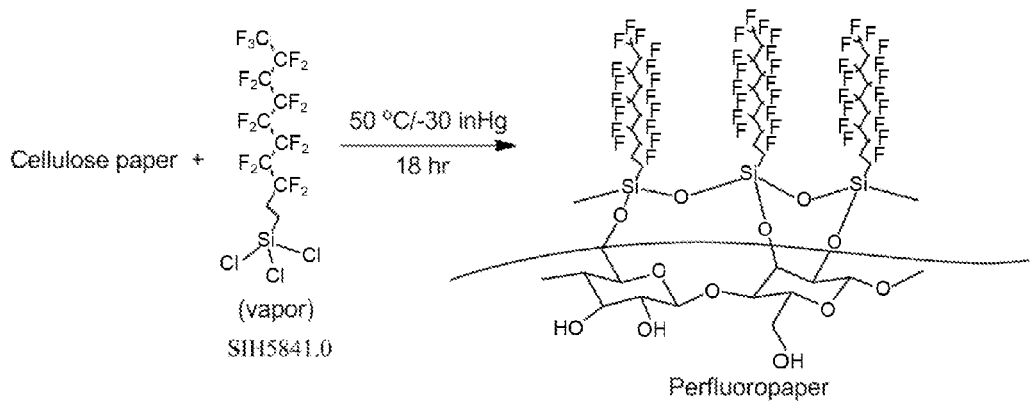

FIG. 22 shows a schematic of an exemplary deep fluorosilanization process onto a cellulose paper by vapor phase deposition of a fluoroalkyl silane precursor comprising heptadecafluoro-1,1,2,2-tetrahydrodecyl)trichloro silane (SIH5841.0) in accordance with certain aspects of the present disclosure.

Figures 23A, 23B, 23C, 23D:
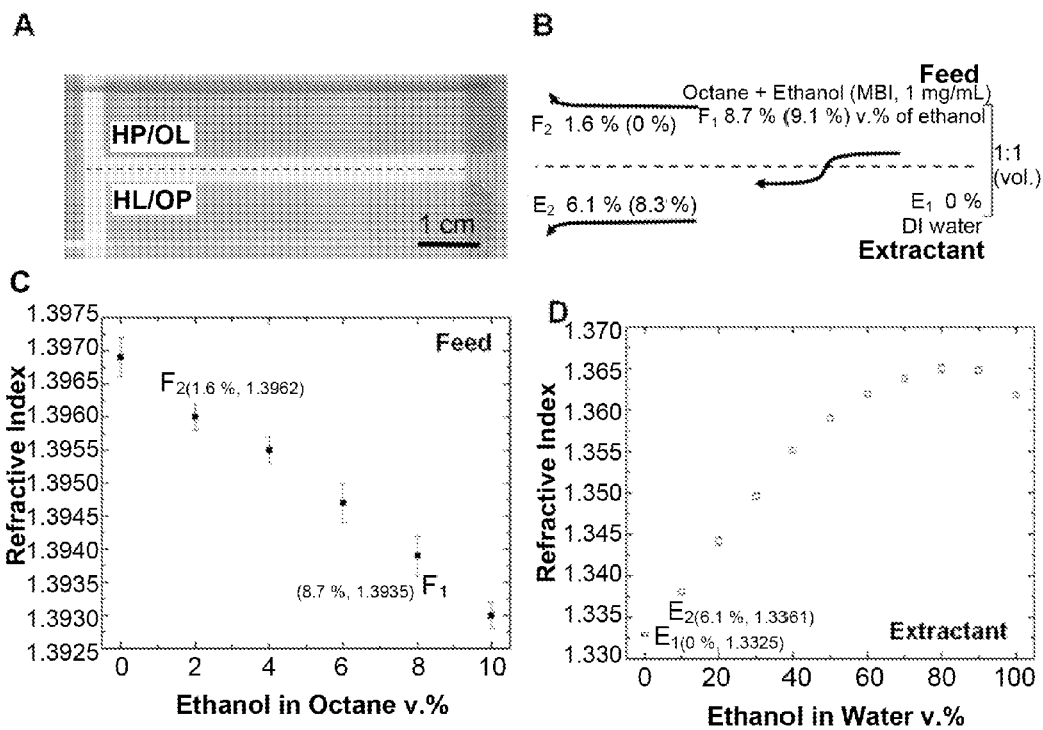

FIGS. 23A-23D. FIG. 23A shows a geometry of operation for a separation unit for continuous surface liquid-liquid extraction according to certain aspects of the present disclosure. FIG. 23B shows a schematic illustration of the extraction pattern for a feed and extractant on such a separation unit. FIG. 23C shows a refractive index check on the feed before and after extraction and separation. FIG. 23D shows a refractive index check on the extractant before and after extraction.

Figures 24A, 24B, 24C, 24D, 24E:
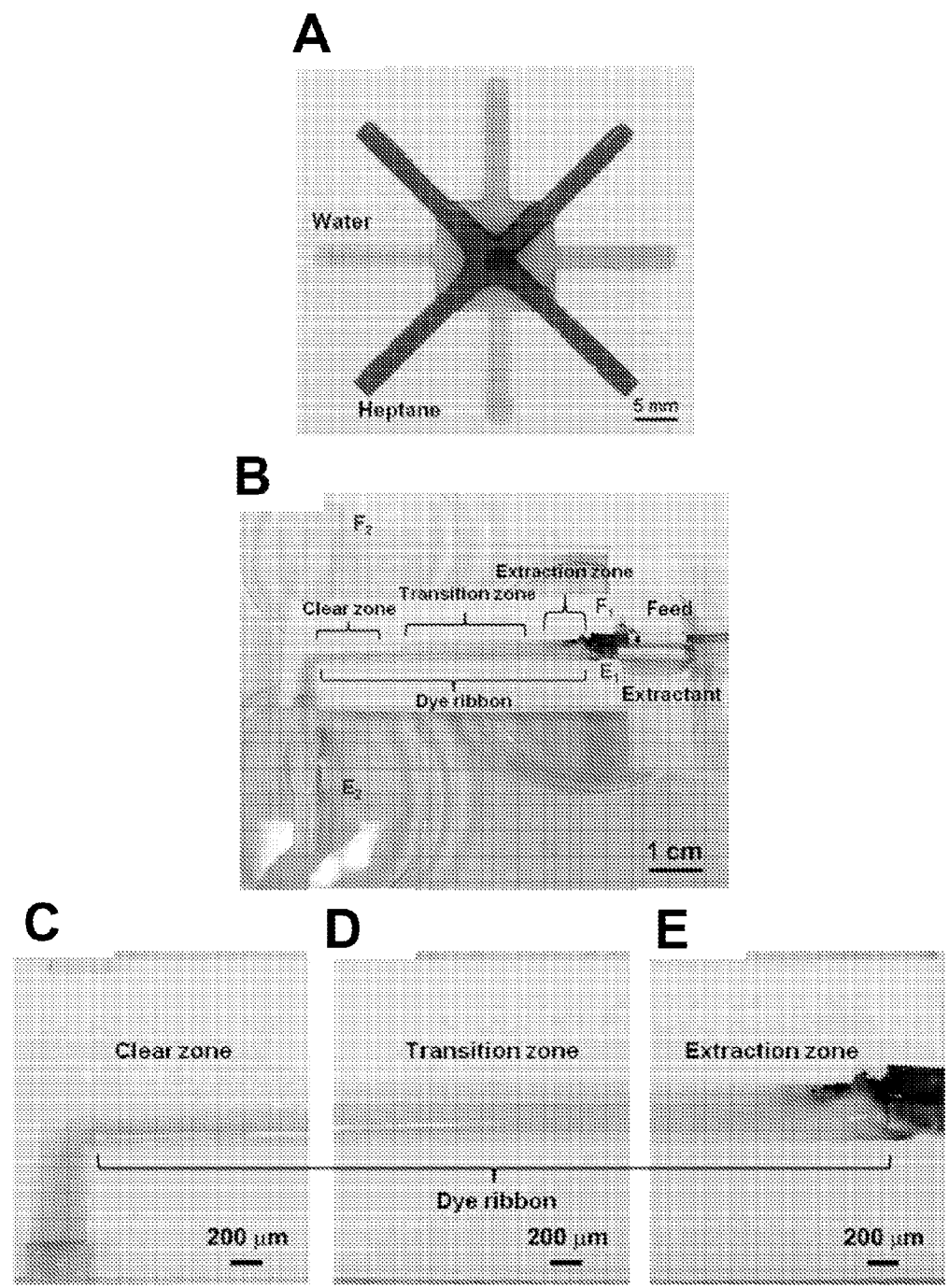

FIGS. 24A-24E show paper-based microfluidic applications designed with integrated extreme wettabilities for oil-water separation according to certain aspects of the present disclosure. FIG. 24A shows a multiplexed oil-water dispensation configuration according to certain aspects of the present disclosure. Four HL/OP and four HP/OL channels are radially arranged from a central reservoir, with which a heptane-water mixture can be automatically separated and dispensed. FIG. 24B shows a continuous surface liquid-liquid extraction separator device. A hydrophobic/oleophilic (HP/OL) fluidic channel is integrated with a hydrophilic/oleophobic (HL/OP) channel side-by-side and used as an operation unit for liquid-liquid extraction on the surface. FIGS. 24C-24E are magnified portions of FIG. 24B that show the details of the three zones in HP/OL channel and the dye ribbon in HL/OP channel.

Figures 25A, 25B, 25C:
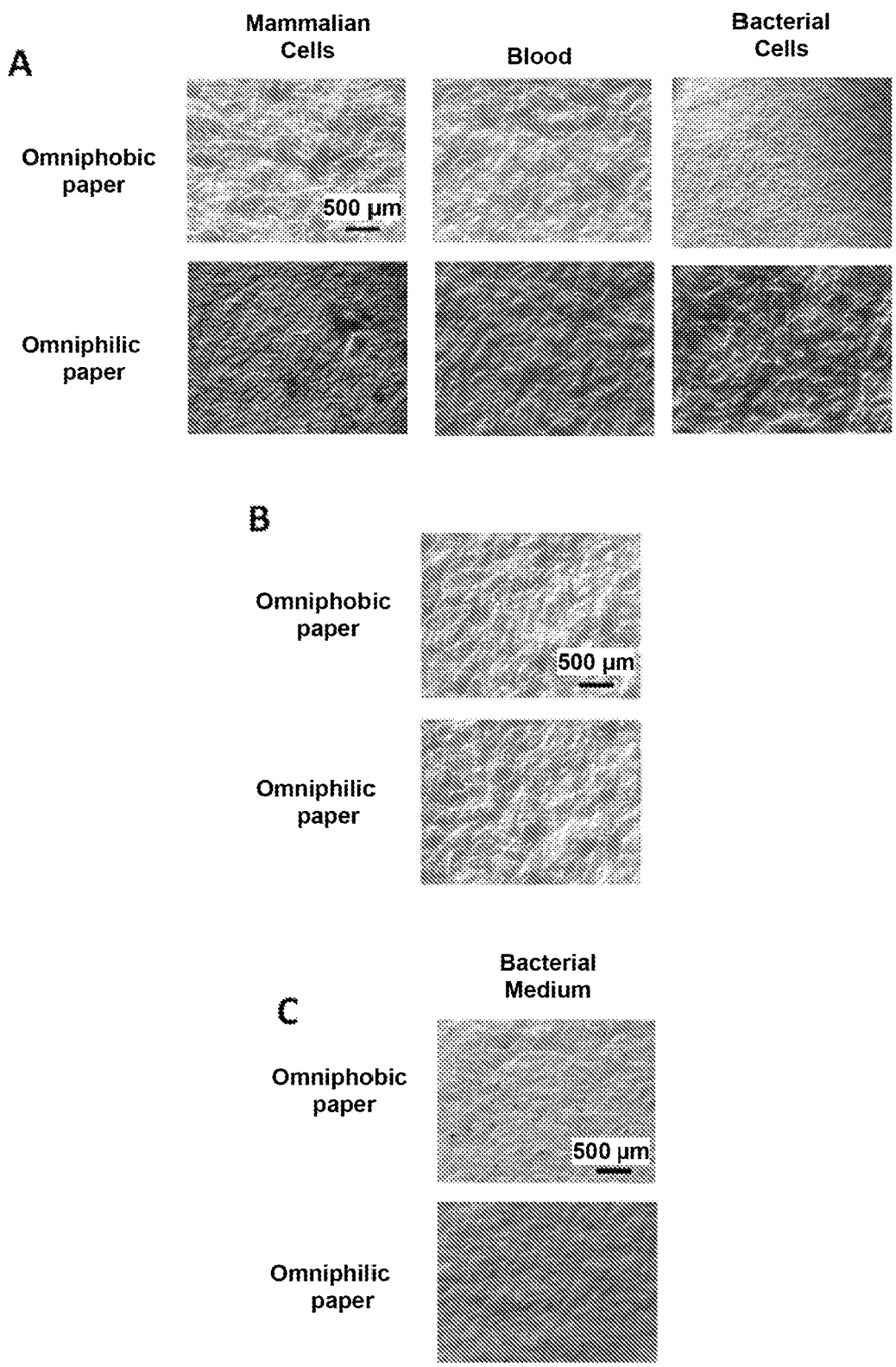

FIGS. 25A-25C. FIG. 25A shows microscopic images of both omniphobic and omniphilic paper prepared in accordance with certain aspects of the present disclosure cultured with mammalian cells (human SKOV3 cells), blood, and bacteria after Ponceau S staining. FIG. 25B shows microscopic images of the omniphobic and omniphilic paper before any cells (mammalian, blood, or bacteria) are added. FIG. 25C shows microscopic images of omniphobic and omniphilic paper stained with Ponceau S after it being incubated with bacterial medium.

Figures 26A, 26B, 26C:
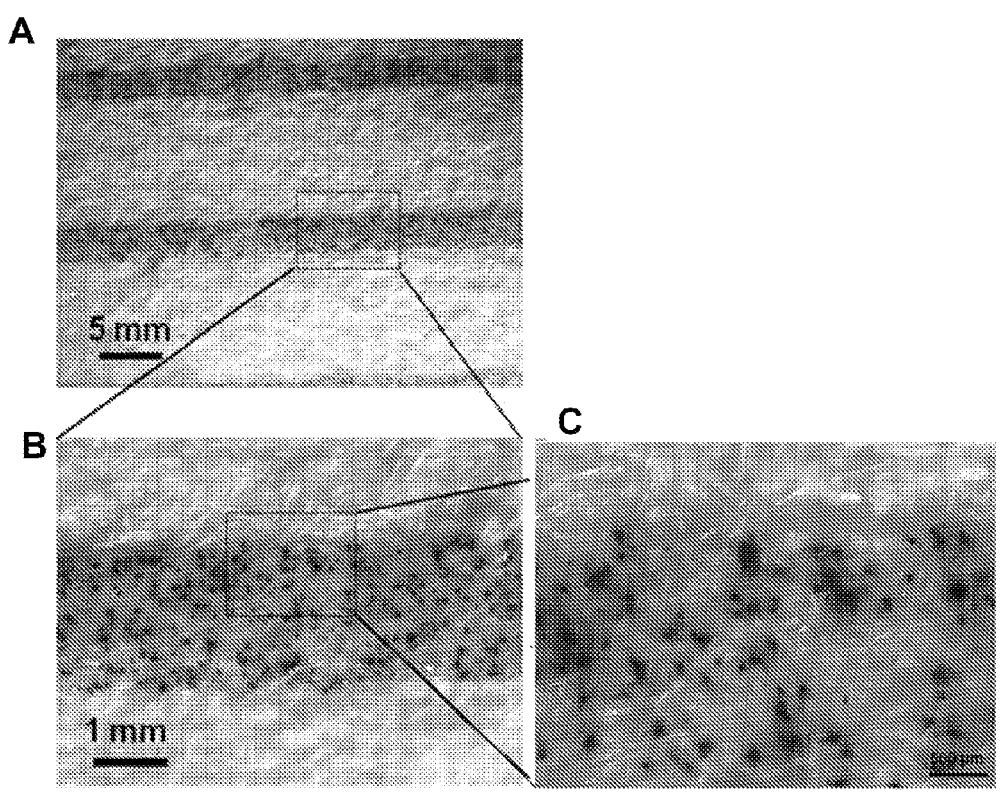

FIGS. 26A-26C show microscopic images of mammalian cells (SKOV3) growing on a surface prepared in accordance with certain aspects of the present teachings having select omniphilic channels (3 mm) on an omniphobic background. After three days of growth and then staining, the cells are shown to grow on the omniphobic regions, but not on the omniphobic regions. Successive magnifications of channels are shown, where FIG. 26A has a 5 mm scale. FIG. 26B is a detailed view taken in the designated region of FIG. 26B with a 1 mm scale, while FIG. 26C is a detailed view taken in the designated region of FIG. 26B with a 500 µm scale.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

As referred to herein, ranges are, unless specified otherwise, inclusive of endpoints and include disclosure of all distinct values and further divided ranges within the entire range.

In various aspects, the present disclosure provides novel porous materials having coated surfaces, which have vast applicability for numerous applications. For example, as will be discussed in further detail below, in certain aspects, the inventive technology can be employed to separate immiscible liquid components, like oil and water from a liquid-liquid mixture. As used herein, a "mixture" encompasses not only solutions having components (e.g., phases, moieties, solvents, solutes, molecules, and the like) that are homogenously mixed together, but also combinations of components or materials that are not necessarily evenly, homogeneously, or regularly distributed when combined (e.g., unevenly mixed combinations of components, separated layers of immiscible components, unevenly distributed suspensions, and the like). Further, the inventive technology can be employed to separate certain miscible liquid components. The inventive technology can thus be used in a wide variety of applications, including microfluidics where such separations are frequently conducted.

In accordance with certain aspects of the present teachings, a new methodology for the fabrication of a surface having extreme wettabilities is provided. Surfaces possessing extreme wettabilities are generally understood to be those that display extreme wetting (e.g., contact angles nearing 0°) or non-wetting (e.g., contact angles of greater than or equal to about 120°) with different liquids. In general, liquids may be classified as polar (such as water, alcohols, dimethyl formamide and the like) and non-polar (such as various oils). Notably, the use of "hydro" nomenclature is intended to encompass both water and polar liquids, while "oleo" nomenclature encompasses non-polar liquids, including oils. Extreme wettabilities may therefore include any combination of: (i) superhydrophobic and oleophilic; (ii) superhydrophobic and superoleophilic; (iii) superhydrophobic and superoleophobic; (iv) superhydrophilic and oleophobic; or (v) superhydrophilic and superoleophobic. In various aspects, the present disclosure provides new techniques for creating surfaces having predetermined extreme wettabilities in a streamlined process with materials that are readily available commercially. Thus, the surfaces having extreme wettabilities may be formed on a variety of commercially available porous materials by using commercially available low surface energy silanes. By changing the type of silane and the processing conditions in accordance with certain aspects of the present teachings, various different types of surfaces with extreme wettabilities can be formed.

By way of further background, extreme wettability can be understood in the context of the following. The primary measure of wetting of a liquid on a non-textured (or smooth) surface is the equilibrium contact angle θ, given by Young's relation as:

$$\cos\theta = \frac{\gamma_{SV} - \gamma_{SL}}{\gamma_{LV}}. \quad \text{(Equation 1)}$$

Here, γ refers to the interfacial tension, and S, L, and V designate the solid, liquid, and vapor phases, respectively. The solid-vapor interfacial tension ($\gamma_{SV}$) and the liquid-vapor interfacial tension ($\gamma_{LV}$) are also commonly referred to as the solid surface energy and the liquid surface tension, respectively. Non-textured surfaces that display contact angles θ greater than or equal to about 90° with water (or other polar liquids) are considered to be hydrophobic and surfaces that display contact angles greater than or equal to about 90° with oil (or other non-polar liquids) are considered to be oleophobic. Typically, surfaces with high $\gamma_{SV}$ tend to be hydrophilic, whereas those with low $\gamma_{SV}$ (such as highly fluorinated compounds) tend to be hydrophobic.

Surfaces that spontaneously approach a contact angle θ of 0° with water and oil are generally considered superhydrophilic and superoleophilic respectively and surfaces that approach contact angles θ greater than or equal to about 150° and low contact angle hysteresis (difference between the advancing $\theta_{adv}$ and the receding contact angle $\theta_{rec}$) with water and oil are generally considered to be superhydrophobic and superoleophobic, respectively.

Surfaces that display a contact angle θ of less than or equal to about 90°, optionally of less than or equal to about 85°, optionally of less than or equal to about 80°, optionally of less than or equal to about 75°, optionally of less than or equal to about 70°, optionally of less than or equal to about 65°, optionally of less than or equal to about 60°, optionally of less than or equal to about 55°, optionally of less than or equal to about 50°, and in certain aspects, optionally of less than or equal to about 45° with water or other polar liquids (e.g., alcohols, dimethyl formamide and the like) are considered to be "hydrophilic."

As used herein, surfaces that display a contact angle θ of less than or equal to about 5°, optionally of less than or equal to about 4°, optionally of less than or equal to about 3°, optionally of less than or equal to about 2°, optionally of less than or equal to about 1°, and in certain aspects, 0° with water or other polar liquids (e.g., alcohols, dimethyl formamide and the like) are considered to be "superhydrophilic."

Surfaces that display a contact angle of greater than or equal to about 90°, optionally greater than or equal to about 95°, optionally greater than or equal to about 100°, optionally greater than or equal to about 105°, optionally greater than or equal to about 110°, optionally greater than or equal to about 115°, optionally greater than or equal to about 120°, optionally greater than or equal to about 125°, optionally greater than or equal to about 130°, optionally greater than or equal to about 135°, optionally greater than or equal to about 140°, and in certain aspects, optionally greater than or equal to about 145° with water or other polar liquids are considered to be "hydrophobic."

Superhydrophobic surfaces are those that display a contact angle of greater than or equal to about 150°, optionally greater than or equal to about 151°, optionally greater than or equal to about 152°, optionally greater than or equal to about 153°, optionally greater than or equal to about 154°, optionally greater than or equal to about 155°, optionally greater than or equal to about 156°, optionally greater than or equal to about 157°, optionally greater than or equal to about 158°, optionally greater than or equal to about 159°, and in certain aspects, optionally greater than or equal to about 160° along with low contact angle hysteresis (difference between the advancing $\theta_{adv}$ and the receding contact angle $\theta_{rec}$) with water or other preselected polar liquids. In certain variations, a "superhydrophobic" surface has a contact angle of greater than or equal to about 150° and less than or equal to about 180° with water or another polar liquid.

Surfaces that display a contact angle θ of less than or equal to about 90°, optionally of less than or equal to about 85°, optionally of less than or equal to about 80°, optionally of less than or equal to about 75°, optionally of less than or equal to about 70°, optionally of less than or equal to about 65°, optionally of less than or equal to about 60°, optionally of less than or equal to about 55°, optionally of less than or equal to about 50°, and in certain aspects, 45° with oil (a preselected reference oil or other non-polar liquid) are considered to be "oleophilic." A "preselected oil" is intended to include any oil or combinations of oils of interest. As discussed herein, in certain non-limiting variations, an exemplary preselected oil used to demonstrate oleophobicity/oleophilicity is rapeseed oil (RSO).

Likewise, surfaces that display a contact angle θ of less than or equal to about 5°, optionally of less than or equal to about 4°, optionally of less than or equal to about 3°, optionally of less than or equal to about 2°, optionally of less than or equal to about 1°, and in certain aspects, 0° with oil (a preselected reference oil or other non-polar liquid) are considered to be "superoleophilic."

Surfaces that display a contact angle of greater than or equal to about 90°, optionally greater than or equal to about 95°, optionally greater than or equal to about 100°, optionally greater than or equal to about 105°, optionally greater than or equal to about 110°, optionally greater than or equal to about 115°, optionally greater than or equal to about 120°, optionally greater than or equal to about 125°, optionally greater than or equal to about 130°, optionally greater than or equal to about 135°, optionally greater than or equal to about 140°, and in certain aspects, optionally greater than or equal to about 145° with a preselected oil are considered to be "oleophobic." Due to the low surface tension values for oils, in spite of numerous known natural superhydrophobic surfaces, there are no known, naturally-occurring, superoleophobic surfaces.

Superoleophobic surfaces are those that display a contact angle of greater than or equal to about 150°, optionally greater than or equal to about 151°, optionally greater than or equal to about 152°, optionally greater than or equal to about 153°, optionally greater than or equal to about 154°, optionally greater than or equal to about 155°, optionally greater than or equal to about 156°, optionally greater than or equal to about 157°, optionally greater than or equal to about 158°, optionally greater than or equal to about 159°, and in certain aspects, optionally greater than or equal to about 160° along with low contact angle hysteresis (difference between the advancing $\theta_{adv}$ and the receding contact angle $\theta_{rec}$) with preselected low surface tension liquids, such as a representative oil (for example, rapeseed oil (RSO)). In certain variations a "superoleophobic" surface has a contact angle of greater than or equal to about 150° and less than or equal to about 180° with a preselected oil, like representative RSO oil.

As noted above, oleophobic and superoleophobic surfaces are generally hydrophobic and/or superhydrophobic, because the surface tension of water is significantly higher than that of oils. In accordance with the certain aspects of the present teachings, however, the presence of specific intermolecular interactions (hydrogen bonding, dipole-dipole interactions, and the like) at the solid-liquid interface and the magnitude of a solid-liquid interfacial energy ($\gamma_{sl}$) for water can be significantly lower than for oil.

By employing design principles in accordance with the present teachings on a porous material surface, the inventive materials can provide various extreme wettability combinations, including those that are oleophobic or superoleophobic, yet hydrophilic or superhydrophilic surfaces. In accordance with the principles of the present disclosure, re-entrant surface texture can be pre-selected in combination with surface chemistry modification to create low energy surfaces that can support a robust composite (solid-liquid-air) interface and display apparent contact angles greater than or equal to about 90° and in certain variations greater than or equal to about 150° with various low surface tension or high surface tension liquids. Surfaces displaying such functionality have vast applicability in a variety of fields, including commercial applications for liquid-liquid separation.

Re-entrant surface texture, in conjunction with surface chemistry and roughness, can be used to engineer superoleophobic surfaces, even with extremely low surface tensions liquids such as various oils and alcohols. When a liquid contacts a porous (or textured) surface, it exhibits an apparent advancing contact angle $\theta°$ that can be significantly different from the equilibrium contact angle. If the liquid fully penetrates the porous surface, it is said to be in the Wenzel state. If the liquid does not penetrate completely, a composite (solid-liquid-air) interface forms below the drop and it considered to be in the Cassie-Baxter state. In certain variations of the present disclosure, super-repellent surfaces have a surface geometry that promotes the Cassie-Baxter state. In the Cassie-Baxter state, liquid wets the porous surface up to the point where the local texture angle becomes equal to the equilibrium contact angle.

In accordance with certain aspects of the present teachings, a porous material substrate is selected to have such a desirable re-entrant surface texture (a line projected normal to the surface intersects the texture more than once), which can then be coupled with novel surface coatings to result in a low energy surface that has extreme wettability. By further design (for example, by selection or manipulation of the surface of the porous substrate), the oleophobicity of the surface can be preselected and tuned, for example, by preselecting a robustness factor (A*) and dimensionless spacing ratio (D*) to provide the desired oleophobicity.

Physically, A* is a measure of the pressure that the composite interface can withstand before transitioning (at A*=1) from the Cassie-Baxter state to the Wenzel state. Large values of the robustness factor (A*>>1) indicate the formation of a robust composite interface that can withstand a very high pressure. On the other hand, for A*<1, the composite interface cannot maintain its stability against even small pressure differentials, causing the liquid to completely penetrate the porous surface, leading to the Wenzel state. Physically, D* is a measure of the air entrapped below the composite interface. For textures that are dominated by cylindrical fiber-like features, such as the porous geometries suitable for use as materials in the present teachings, these design parameters are defined as, $$A^* = \frac{Rl_{cap}}{D^2} \frac{1-\cos\theta}{1+2(R/D)\sin\theta} \quad \text{(Equation 2)}$$

$$D^* = \frac{R+D}{R} \quad \text{(Equation 3)}$$

where R is the fiber radius, 2D is the inter-fiber spacing, and $l_{cap}$ is the capillary length of the liquid that is defined as, $$l_{cap} = \sqrt{\gamma_{lv}/\rho g} \quad \text{(Equation 4)}$$

where g is acceleration due to gravity and $\rho$ is the density of the liquid. The Cassie-Baxter relationship, which relates the apparent contact angle $\theta^*$ to the equilibrium contact angle $\theta$ can be expressed in terms of D* as, $$\cos\theta^* = -1 + \frac{1}{D^*}[\sin\theta + (\pi - \theta)\cos\theta] \quad \text{(Equation 5)}$$

As can be observed from Equation 5, higher values of D* correspond to a higher fraction of air in the composite interface and consequently an increase in $\theta^*$ for a given liquid. D* only depends on geometry, whereas A* depends on the geometry, as well as the liquid and the solid surface. In certain aspects of the present teachings, a superhydrophilic surface can be designed where $A^*_{water}<1$ irrespective of D* and that a superoleophobic surface has $A^*_{oil}>>1$ and D*>1.

FIG. 1 shows the overall wettability landscape based on the various contact angles that are possible with polar liquids (e.g., water) and non-polar liquids (e.g., various oils). Based on respective contact angles, it is possible to design different surfaces with extreme wettability to oil and water, shown as Quadrants I-IV in FIG. 1 (see also FIGS. 2 and 3A-3B with examples).

Quadrant I has an oil contact angle $\theta_{OIL}$ of greater than or equal to about 90° to less than or equal to about 180° and a water contact angle $\theta_{H2O}$ of greater than or equal to about 90° to less than or equal to about 180°. Thus, in Quadrant I, omniphobic surfaces are shown. Omniphobic surfaces are those surfaces that repel (or are non-wetting to) almost all known liquids, polar or non-polar. Omniphobic surfaces are generally indicated to have contact angles $\theta_{OIL}$ and $\theta_{H2O}$ of greater than 90°. While omniphobic wettability encompasses superomniphobic wettability, superomniphobic surfaces are typically considered to have $\theta_{OIL}$ and $\theta_{H2O}$ of greater than or equal to about 150° up to about 180°, by way of example and as discussed previously above.

Quadrant II has an oil contact angle $\theta_{OIL}$ of greater than or equal to about 90° to less than or equal to about 180° and a water contact angle $\theta_{H2O}$ of greater than or equal to 0° to less than or equal to about 90°. Thus, as shown in FIG. 1, Quadrant II includes surfaces that are both hydrophilic and oleophobic, as well as superhydrophilic and superoleophobic. These surfaces, counter-intuitively, are wet by a polar liquid, such as water or alcohol, but can repel low surface tension non-polar liquids, such as various oils. Again, while oleophobic wettability includes superoleophobic wettability, superoleophobic surfaces are typically considered to have $\theta_{OIL}$ of greater than or equal to about 150° up to about 180°, by way of example and as discussed previously above. Similarly, while hydrophilic wettability encompasses superhydrophilic wettability, superhydrophilic surfaces are typically considered to have $\theta_{H2O}$ of 0° to less than or equal to about 30°.

Quadrant III has an oil contact angle $\theta_{OIL}$ of greater than or equal to about 0° to less than or equal to about 90° and a water contact angle $\theta_{H2O}$ of greater than or equal to about 0° to less than or equal to about 90°. Thus, in Quadrant III, omniphilic surfaces are shown. Omniphilic surfaces are those surfaces that are wet by all liquids, polar or non-polar. Notably, omniphilic surfaces are indicated to have contact angles $\theta_{OIL}$ and $\theta_{H2O}$ of less than 90°, while superphilic surfaces may have $\theta_{OIL}$ and $\theta_{H2O}$ of greater than 0 up to about 30°, by way of example and as discussed previously above. Many conventional porous surfaces, such as various fabrics, paper, and filter paper are inherently omniphilic.

Finally, Quadrant IV shows an oil contact angle $\theta_{OIL}$ of greater than or equal to about 0° to less than or equal to about 90° and a water contact angle $\theta_{H2O}$ of greater than or equal to about 90° to less than or equal to about 180°. Thus, as shown in FIG. 1, Quadrant IV includes hydrophobic and oleophilic surfaces, as well as superhydrophobic and superoleophilic surfaces. Again, while hydrophobic wettability includes superhydrophobic wettability, superhydrophobic surfaces are typically considered to have $\theta_{H2O}$ of greater than or equal to about 150° up to about 180°, by way of example and as discussed previously above. Similarly, while oleophilic wettability encompasses superoleophilic wettability, superoleophilic surfaces are typically considered to have $\theta_{OIL}$ of 0° to less than or equal to about 30°. Such surfaces are wet by a non-polar liquid such as a low surface tension oil, but can repel a high surface tension polar liquid, such as water.

The present technology provides a methodology for the fabrication of surfaces with the three other extreme wettabilities in Quadrants I-II and IV (omniphobic; superhydrophobic and superoleophilic; superoleophobic and superhydrophilic). Furthermore, in certain aspects, the present teachings contemplate forming surfaces that have an extreme wettability selected from Quadrants I I-II and IV, along with at least one other wettability selected from Quadrants I-IV. Moreover, in certain variations, the methods of the present disclosure use various commercially available porous materials that are treated by using silanization. Notably, the present disclosure contemplates a porous surface having a plurality of distinct extreme wettabilities, including two, three, or more distinct wettability characteristics on different regions of the surface of the porous surface.

Therefore, in certain aspects, the present teachings contemplate omniphobic surfaces that are surfaces that repel (or are non-wetting to) almost all known liquids, polar or non-polar. Thus, omniphobic surfaces can be considered to be both hydrophobic and oleophobic, while superomniphobic can be considered to be both superhydrophobic and superoleophobic, as discussed previously. In certain variations, the present disclosure provides a coated surface that is both superhydrophobic, having a first apparent advancing dynamic contact angle of greater than or equal to about 150° for water and superoleophobic, having a second apparent advancing dynamic contact angle of greater than or equal to about 150° for a preselected oil, such as RSO. Such surfaces can have a range of applications such as developing surfaces with enhanced solvent-resistance, chemical and biological protection, stain-resistant textiles, "non-stick" coatings for various applications, controlling protein and cell adhesion on surfaces, engineering surfaces with enhanced resistance to organic solvents, reduction of biofouling and the development of finger-print resistant surfaces for flat-panel displays, cell-phones and sunglasses, and the like.

In other variations, the present teachings contemplate superhydrophobic and superoleophilic surfaces. This type of surface is unique. In certain variations, the present disclosure provides a coated surface that is both superhydrophobic, having a first apparent advancing dynamic contact angle of greater than or equal to about 150° for water and oleophilic, having a second apparent advancing dynamic contact angle of less than or equal to about 90° for a preselected oil, such as RSO. In certain other variations, the present disclosure provides a coated surface that is both superhydrophobic, having a first apparent advancing dynamic contact angle of greater than or equal to about 150° for water and superoleophilic, having a second apparent advancing dynamic contact angle of less than or equal to about 5° for a preselected oil, such as RSO. These surfaces are wet by a non-polar liquid, such as a low surface tension oil, but can repel a high surface tension polar liquid such as water. Such surfaces are useful for oil-water separation, developing self-cleaning surfaces, and various water-repellent surfaces, including textiles and fabrics.

In yet other variations, the present disclosure provides superoleophobic and superhydrophilic surfaces. In certain other variations, the present disclosure provides a coated surface that is both superhydrophilic, having a first apparent advancing dynamic contact angle of less than or equal to about 5° for water and oleophobic, having a second apparent advancing dynamic contact angle of greater than or equal to about 90° for a preselected oil, such as RSO. In certain other variations, the present disclosure provides a coated surface that is both superhydrophilic, having a first apparent advancing dynamic contact angle of less than or equal to about 5° for water and superoleophobic, having a second apparent advancing dynamic contact angle of greater than or equal to about 5° for a preselected oil, such as RSO. These surfaces are wet by a polar liquid, such as water or alcohol, but can repel low surface tension non-polar liquids, such as various oils. Such surfaces are counter-intuitive and unexpected, and can allow for solely gravity-driven separation of oil-water mixtures. Furthermore, such materials prepared in accordance with the present teachings are highly economical and therefore provide extremely cost efficient oil-water separation, for example. These materials are capable of separating free oil-water, oil-water dispersions, as well as surfactant stabilized oil-water emulsions.

In accordance with various aspects of the present disclosure, the inventive material comprises a porous substrate material having a coated surface. In certain aspects, the porous substrate is highly porous (e.g., of greater than or equal to about 1% to less than or equal to about 99%, optionally having a porosity of greater than or equal to about 10% to less than or equal to about 95%), having a plurality of pores formed within a body of the material. In certain aspects, the plurality of pores includes a plurality of internal pores and external pores that are open to one another and form continuous flow paths or channels through the substrate body extending from a first external surface to a second external surface. As used herein, the terms pore refers to pore openings of various sizes, including so-called "macropores" (pores greater than 50 nm diameter) and "mesopores" (pores having diameter between 2 nm and 50 nm), unless otherwise indicated, and "pore size" refers to an average or median value, including both the internal and external pore diameter sizes. In various aspects, the porous substrate comprises a plurality of pores having an average pore size diameter of greater than or equal to about 10 nm to less than or equal to about 1 mm, optionally greater than or equal to about 20 nm to less than or equal to about 10 μm; optionally greater than or equal to about 30 nm to less than or equal to about 5 μm; optionally greater than or equal to about 40 nm to less than or equal to about 1 μm. In certain variations, an average pore size diameter of the plurality of pores in the substrate material is selected to be greater than or equal to about 10 nm to less than or equal to about 1 mm, optionally greater than or equal to about 50 nm to less than or equal to about 500 nm.

In certain aspects of the present disclosure, the porous substrate material is selected to have a plurality of hydroxyl groups on exposed surfaces. The porous substrate material comprises a plurality of hydroxyl groups, which could be any disposed on any woven or non-woven substrate, including fabrics, textiles, thin sheets or films, membranes, or coatings on a porous substrate, so long as there is a significant number of hydroxyl groups on the exposed surface. The presence of surface hydroxyl (—OH) groups facilitates a silanization reaction in accordance with various aspects of the present disclosure. Thus, in various aspects, a significant amount of hydroxyl groups are present on the exposed surface of the porous substrate material. In certain variations, a commercially available porous material is selected that inherently possesses surface hydroxyl groups (for example, cellulose-based paper, cotton fabrics, and the like). A metal having a sufficient amount of activated hydroxyl groups on the surface is also contemplated in certain alternative embodiments. In other embodiments, if the porous surface does not possess surface hydroxyl groups, a thin polymeric coating (e.g., greater than or equal to about 10 nanometers to less than or equal to about 10 micrometers) comprising a polymer that possesses hydroxyl groups (such as poly vinyl alcohol, polyethylene glycol, polypropylene glycol, and poly(tetramethylene ether) glycol) is applied to a surface of the porous material (and may coat internal pore surfaces, as well).

The inventive methods of treating a surface to provide an extreme wettability are generally compatible with a wide range of substrate materials, including various commercially available materials. Therefore, in certain exemplary embodiments, a porous material is selected from the group consisting of: polymeric materials, organic materials (such as materials derived from plants or animals), metallic materials, inorganic materials, and combinations thereof.

The porous materials can be woven or nonwoven fabrics, textiles, or papers. The natural geometry of the fibers provides desired re-entrant surface textures. In certain aspects, the porous material is constructed from one or more materials selected from the group consisting of screen, mesh, paper, woven cloth (e.g., cloth or fabric), non-woven cloth (e.g., felt), fiber, foam, molecular sieves, entangled nanowires, and electrospun polymeric nanofibers, and combinations thereof. Any porous substrate known or to be discovered in the art compatible with the coating materials is further contemplated by the present disclosure.

It should be noted that the material composition of the porous substrate material having a desirable re-entrant surface texture may vary significantly, as in certain aspects, it is the chemistry of the exposed surface that influences the design and properties exhibited. For example, a metal mesh, such as copper, may have desirable re-entrant surface texture, but lack sufficient hydroxyl groups on the surface. The metal mesh lacking the hydroxyl groups may be coated with a material that bears substantial hydroxyl groups, such as cellulose nanofibrils, to facilitate subsequent silanization. Similarly, metals or other inorganic materials with surface hydroxyl groups present due to oxidation and/or corrosion are also contemplate.

Examples of suitable porous substrates include, by way of non-limiting example, paper comprising cellulose, such as filter papers. One such cellulose filter paper is commercially available from Whatman as the WHATMAN-G3, having a nominal pore size of 6 μm, an overall diameter of 150 mm, and a thickness of 390 μm. Another suitable example includes millipore nitrocellulose filter membranes having a nominal pore size of 220 nm, commercially available from Fisher Scientific. Yet other suitable substrate materials include polycarbonate filter membranes, such as a first polycarbonate filter membrane having a nominal pore size of 50 nm or a second polycarbonate filter membrane having a nominal pore size of 600 nm, both of which are commercially available as SPI-PORE from SPI.

As such, the silanization process of certain embodiments of the present teachings can be tuned to penetrate to a predetermined depth of bulk of the porous substrate material (e.g., to react with exposed pore opening surfaces extending into the bulk of the material at a predetermined distance), so not just the outer surface has the coated surface with extreme wettability. The ability to coat within a bulk region of the porous substrate material enables the material to retain its wettability properties, even after physical damage, such as a scratch.

In accordance with the present disclosure, a porous substrate comprising hydroxyl groups can be treated by reaction with a silane component to form a surface coating on the porous material surface. The silane component is selected to have a low surface energy. Based on these principles and as further described herein, new porous materials with engineered extreme wettabilities are contemplated.

In accordance with certain aspects of the present disclosure, prior to applying a low surface energy coating, the exposed surfaces are optionally further treated to enhance formation of hydroxyl groups on a surface of the porous material or alternatively a polymeric material comprising hydroxyl groups. As noted above, the presence of surface hydroxyl (—OH) groups facilitates a silanization reaction in accordance with various aspects of the present disclosure. To enhance the amount of silanization when forming the surface coating, prior to reaction with a low surface energy silane, the porous surface is first exposed to an oxidative plasma (e.g., oxygen plasma) to activate the surface. Alternatively, a polymeric surface may be similarly activated using oxygen plasma, which is then followed by silanization.

Methods for forming a porous surface having a predetermined wettability thus include reacting a low surface energy fluoroalkyl silane with hydroxyl groups on a surface of a porous material, in certain variations. As will be described in more detail below, the low surface energy fluoroalkyl silane advantageously has a surface tension of less than or equal to about 35 mN/m. The reacting is then conducted until greater than or equal to about 30% of the hydroxyl groups on the surface react with the low surface energy fluoroalkyl silane in a silanization reaction to form a coated surface having the predetermined wettability. In accordance with the present teachings, the reaction conditions (e.g., temperature, pressure, and reaction time) are thus selected so as to form a surface coating that exhibits one of the following extreme wettabilities:

(i) superhydrophobic, where the coated surface has a first apparent advancing dynamic contact angle of greater than or equal to about 150° for water and oleophilic, having a second apparent advancing dynamic contact angle of less than or equal to about 90° for a preselected oil;

(ii) superhydrophobic, where the coated surface has a first apparent advancing dynamic contact angle of greater than or equal to about 150° for water and superoleophilic, having a second apparent advancing dynamic contact angle of less than or equal to about 5° for a preselected oil;

(iii) superhydrophobic, where the coated surface has a first apparent advancing dynamic contact angle of greater than or equal to about 150° for water and superoleophobic, having a second apparent advancing dynamic contact angle of greater than or equal to about 150° for a preselected oil;

(iv) superhydrophilic, where the coated surface has a first apparent advancing dynamic contact angle of less than or equal to about 5° for water and oleophobic, having a second apparent advancing dynamic contact angle of greater than or equal to about 90° for a preselected oil; or (v) superhydrophilic, where the coated surface has a first apparent advancing dynamic contact angle of less than or equal to about 5° for water and superoleophobic, having a second apparent advancing dynamic contact angle of greater than or equal to about 150° for a preselected oil.

In certain aspects, the method further comprises applying the low surface energy fluoroalkyl silane onto a surface of a porous material before the reaction is initiated and conducted. The low surface energy fluoroalkyl silane precursor may be in the form of a coating precursor that is applied to the surface. As appreciated by those of skill in the art, other conventional components may be included in the coating precursor, so long as they do not significantly affect the wettability of the surface coating formed. Such conventional components may include solvents, carriers, antioxidants, anti-foaming agents, stabilizers, or other standard additives, like flow additives, rheology modifiers, adhesion promoters, and the like. The low surface energy fluoroalkyl silane in the precursor can be applied to the surface of the porous material by using any conventional coating technique including vapor phase deposition, dip coating, flow coating, spin coating, roll coating, curtain coating and spray coating. In certain embodiments, the precursor may form a coating that permeates the substrate, including coating substantially all of the internal pores.

In certain variations, a thickness of the coating formed after reacting may be greater than or equal to about 10 nm to less than or equal to about 10 µm. Such a thickness may be measured from an external surface of the coating inwards into the body/bulk region of the porous material, for example.

In accordance with various aspects of the present disclosure, prior to applying a low surface energy coating, the exposed surfaces are optionally further treated to enhance formation of hydroxyl groups on a surface of the porous material or alternatively a polymeric material comprising hydroxyl groups. As noted above, the presence of surface hydroxyl (—OH) groups facilitates a silanization reaction in accordance with various aspects of the present disclosure. To enhance the amount of silanization when forming the surface coating, prior to reaction with a low surface energy silane, the porous surface is first exposed to oxygen plasma to activate the surface. Alternatively, a polymeric surface may be similarly activated using oxygen plasma, which is then followed by silanization.

The present disclosure thus provides methods for forming a porous surface having a predetermined wettability. In certain variations, such a method comprises reacting a low surface energy fluoroalkyl silane with hydroxyl groups on a surface of a porous material.

As noted previously above, in certain embodiments, a surface of a porous material may be treated (prior to applying the low surface energy fluoroalkyl silane) to enhance hydroxyl group formation on the surface of the material, for example, activating the surface of the material by treatment and exposure to oxygen plasma. In one example, high power oxygen ($O_2$) plasma etching up to a power level of 350 W can be applied to a surface. Notably, the power of the $O_2$ plasma may vary, for example, from 30 W up to 350 W. Such treatment is suitable when the porous material is capable of forming hydroxyl groups. However, in other embodiments, where a porous material does not form hydroxyl groups (even when exposed to oxygen plasma), the methods may further comprise applying a material that comprises or is capable of forming hydroxyl groups. In one such example, such a material may be a polymeric material that comprises or forms hydroxyl groups. For example, a polymeric material may be applied prior to applying the low energy silane. The polymeric material providing hydroxyl groups on the surface may comprise polyvinyl alcohol or any other polymers rich in hydroxyl groups, like polyols, such as polyethylene glycol, polypropylene glycol, and poly(tetramethylene ether) glycol are appropriate. In certain alternative aspects, polyethers and polyesters are also believed to be polymeric materials that provide suitable hydroxyl groups. The polymeric material may be applied to the porous surface as a thin coating (having a thickness of greater than or equal to about 10 nm to less than or equal to about 10 micrometers). Moreover, in such an embodiment, the polymer surface may be subsequently activated using oxygen plasma, which is then followed by silanization with the low surface energy fluoroalkyl silane precursor.

In certain variations, the reacting of the hydroxyl groups on the porous substrate may be conducted at ambient pressure and temperature conditions. In other aspects, the reacting is conducted under negative pressure conditions, for example, by disposing the porous substrate in a vacuum chamber, oven, or desiccator while the reaction occurs.

In certain aspects, the reacting of the low surface energy fluoroalkyl silane with hydroxyl groups on the surface of the porous material is conducted at a temperature ranging from room temperature to less than or equal to about 125° C., optionally at a temperature of greater than or equal to about 21° C. (about 70° F.) to less than or equal to about 110° C. (about 230° F.).

As noted above, the reacting of the low surface energy fluoroalkyl silane with hydroxyl groups on the surface of the porous material is conducted until greater than or equal to about 30% of the hydroxyl groups on the surface react with the low surface energy fluoroalkyl silane in a silanization reaction to form a coated surface having the predetermined wettability. In certain aspects, the reacting is conducted until greater than or equal to about 40% of the hydroxyl groups react with the low surface energy fluoroalkyl silane to form the coated surface and in other aspects, the reacting may occur until greater than or equal to about 60% of the hydroxyl groups react with the low surface energy fluoroalkyl silane to form the coated surface.

The surface coating on the porous material formed by reacting the low surface energy fluoroalkyl silane with hydroxyl groups may comprise only one or more low surface energy fluoroalkyl silanes after the reacting, without any additional components. For example, the surface coating may consist essentially of the reacted low surface energy fluoroalkyl silane(s). In accordance with inventive principles of the present disclosure, no additional particles or other components are necessary to achieve the predetermined extreme surface wettability.

Accordingly, in certain variations, the reacting of the low surface energy fluoroalkyl silane with hydroxyl groups is conducted for greater than or equal to about 1 hour to less than or equal to about 14 days. In certain variations, the reacting is conducted for greater than or equal to about 10 hours to less than or equal to about 24 hours. In other variations, the reacting is conducted for greater than or equal to about 1 day to less than or equal to about 14 days. In yet other variations, the reacting may be conducted for greater than or equal to about 1 day to less than or equal to about 5 days. In certain variations, the reacting is conducted for greater than or equal to about 1 hour to less than or equal to about 15 hours.

In certain aspects, the low surface energy silane comprises at least one fluorine atom. The low surface energy fluoroalkyl silane advantageously has a surface tension of less than or equal to about 35 mN/m; optionally less than or equal to about 25 mN/n; and in certain variations, optionally less than or equal to about 10 mN/m, depending on the type of extreme wettability desired.

A low surface energy fluoroalkyl silane in accordance with certain aspects of the present teachings is a silane that may be represented by a general structure (I):

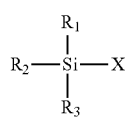

(I)

where $R^1$, $R^2$, and $R^3$ are hydrolyzable ligands complexed to the Si atom. Suitable hydrolyzable ligands may include halides or alkyl ether/alkyoxy groups that can be hydrolyzed to form a hydroxyl group and thus a silanol. $R^1$, $R^2$, and $R^3$ may be independently selected to hydrolysable or non-hydrolyzable. Thus, in certain variations, at least one of $R^1$, $R^2$, and $R^3$ may be independently selected from a group of hydrolysable radicals consisting of: chlorine (Cl), bromine (Br), methoxy ($OCH_3$), ethoxy ($OC_2H_5$), and propoxy ($OC_3H_7$). In certain embodiments, two or three of $R^1$, $R^2$, and $R^3$ are such hydrolysable groups. However, in certain alternate variations, one or two of $R^1$, $R^2$, and $R^3$ may be independently selected from a group of nonhydrolysable groups, such as hydrogen (H), alkyl groups, cycloalkyl groups, aryl groups, and the like.

X may be represented by $(CH_2)_nY$, where n ranges from 0 to 3. Y is a hydrocarbon radical that comprises at least one fluorine group and therefore provides low surface energy to the silane. Y may be a partially fluorinated or fully fluorinated hydrocarbon radical. Suitable hydrocarbon radicals include fluorinated aliphatic groups, fluorinated alicyclic groups, and combinations thereof. By way of example, Y may be a fluorinated linear or branched alkyl radical. In certain variations, suitable fluorinated alkyl radicals may have 5 to 12 carbon atoms, optionally from 6 to 10 carbon atoms. In certain preferred aspects, Y is a linear alkyl group, such as a fluorinated hexyl, heptyl, octyl, nonyl, or decyl group. In certain preferred aspects, particularly suitable low surface energy fluoroalkyl silane are selected from a group consisting of: heptadecafluoro-1,1,2,2-tetrahydrodecyl triethoxysilane, heptadecafluoro-1,1,2,2-tetrahydrodecyl trichlorosilane, tridecafluoro-1,1,2,2-tetrahydrooctyl triethoxysilane, tridecafluoro-1,1,2,2-tetrahydrooctyl trichlorosilane, nonafluorohexyl triethoxysilane, nonafluorohexyl trichlorosilane, and combinations thereof.

In accordance with various aspects of the present disclosure, after applying the low surface energy coating, one or more regions of the coated surface may be further treated to have a distinct wettability. In certain variations, one or more regions of the low surface energy coated surface may be further treated by exposing the low surface energy coated surface to oxygen plasma. In other variations, one or more materials having a distinct surface wettability may be applied to the surface, for example, material that is capable of adhering and coupling with the low surface energy coated surface. Such materials may include certain inks or adhesives that may be printed onto the low surface energy coated surface. In one example, high power oxygen ($O_2$) plasma is used to etch the low surface energy coated surface at a power level of greater than or equal to about 250 W to less than or equal to about 350 W. Such plasma treatment further modifies the wettability properties of the exposed regions of the coated surface to provide additional design options. Masking can be used to selectively treat the coated surface of the porous material substrate. In certain aspects, one or more regions of the coated surface of the substrate are exposed to plasma treatment for a duration of greater than or equal to about 15 seconds up to about 900 seconds. However, as will be appreciated by those of skill in the art, plasma treatment times may vary from those specified here depending on the composition of the low surface energy coated surface and substrate, as well as depending on plasma processing conditions, including power levels. As explained in more detail below, a duration of exposure to the oxygen plasma treatment can be used to further tailor the wettability properties on a low surface energy coated surface.

Thus, in certain embodiments, the present disclosure contemplates a method of forming a porous surface having a predetermined wettability selected to be superhydrophobic and superoleophobic (number (iii) above), and thus has a first apparent advancing dynamic contact angle of greater than or equal to about 150° for water and a second apparent advancing dynamic contact angle of greater than or equal to about 150° for a preselected oil. Such a method comprises reacting a low surface energy fluoroalkyl silane with hydroxyl groups on a surface of a porous material, where the low surface energy fluoroalkyl silane has a surface tension of less than or equal to about 25 mN/m. The reacting is then conducted until greater than or equal to about 60% of the hydroxyl groups on the surface react with the low surface energy fluoroalkyl silane in a silanization reaction to form the coated surface exhibiting superhydrophobic and superoleophobic wettability. In other aspects, the superhydrophobic and superoleophobic coated surface may consist essentially of the reacted low surface energy fluoroalkyl silane or silanes. In certain aspects, the superhydrophobic and superoleophobic coated surface has a ratio of fluorine to oxygen of greater than or equal to about 2. A ratio of fluorine to oxygen in the surface coating can be obtained using x-ray photoelectron spectroscopy, as is well known to those of skill in the art.

In one variation, forming a coated surface that is superhydrophobic and superoleophobic comprises selecting the low surface energy fluoroalkyl silane from a group consisting of heptadecafluoro-1,1,2,2-tetrahydrodecyl trichlorosilane, heptadecafluoro-1,1,2,2-tetrahydrooctyl trichlorosilane, and combinations thereof. The reaction of the low surface energy fluoroalkyl silane with hydroxyl groups on the surface occurs at room temperature within a vacuum desiccator for a duration of greater than or equal to about 1 day to less than or equal to about 5 days until greater than or equal to about 60% of the hydroxyl groups have reacted with the low surface energy fluoroalkyl silane.

In another variation, a superhydrophobic and superoleophobic coated surface is formed by selecting the low surface energy fluoroalkyl silane from a group consisting of heptadecafluoro-1,1,2,2-tetrahydrodecyl triethoxysilane, heptadecafluoro-1,1,2,2-tetrahydrooctyl trichlorosilane, and combinations thereof. Such a low surface energy fluoroalkyl silane is reacted with hydroxyl groups on the surface at room temperature within a vacuum desiccator for a duration of greater than or equal to about 10 days to less than or equal to about 14 days until greater than or equal to about 60% of the hydroxyl groups have reacted with the low surface energy fluoroalkyl silane.

In yet another variation, a superhydrophobic and superoleophobic coated surface is formed by using a low surface energy fluoroalkyl silane selected from a group consisting of heptadecafluoro-1,1,2,2-tetrahydrodecyl trichlorosilane, heptadecafluoro-1,1,2,2-tetrahydrooctyl trichlorosilane, and combinations thereof. In this variation, the reacting of the low surface energy fluoroalkyl silane with hydroxyl groups on the surface occurs at greater than or equal to about 95° C. (about 203° F.) to less than or equal to about 105° C., optionally at about 100° C., for a duration of greater than or equal to about 10 hours to less than or equal to about 24 hours until greater than or equal to about 60% of the hydroxyl groups have reacted with the low surface energy fluoroalkyl silane.

In a further variation, a superhydrophobic and superoleophobic coated surface is formed by selecting the low surface energy fluoroalkyl silane from a group consisting of heptadecafluoro-1,1,2,2-tetrahydrodecyl triethoxysilane, heptadecafluoro-1,1,2,2-tetrahydrooctyl trichlorosilane, and combinations thereof. Such a low surface energy fluoroalkyl silane is reacted with hydroxyl groups on the surface within a vacuum desiccator at a temperature of greater than or equal to about 45° C. (about 113° F.) to less than or equal to about 55° C. (about 131° F.), optionally at about 50° C. (about 122° F.). The reacting of the low surface energy fluoroalkyl silane with hydroxyl groups on the surface occurs for a duration of greater than or equal to about 10 hours to less than or equal to about 24 hours until greater than or equal to about 60% of the hydroxyl groups have reacted with the low surface energy fluoroalkyl silane.

In other aspects, the present disclosure contemplates methods of forming a porous surface having a predetermined wettability selected to be superhydrophobic and superoleophilic (number (ii) above), and thus has a first apparent advancing dynamic contact angle of greater than or equal to about 150° for water and a second apparent advancing dynamic contact angle of less than or equal to about 5° for a preselected oil. Such a method comprises reacting a low surface energy fluoroalkyl silane with hydroxyl groups on a surface of a porous material, where the low surface energy fluoroalkyl silane has a surface tension of less than or equal to about 35 mN/m. The reacting is then conducted until greater than or equal to about 40% of the hydroxyl groups on the surface react with the low surface energy fluoroalkyl silane in a silanization reaction to form the coated surface exhibiting superhydrophobic and superoleophilic wettability. In certain aspects, the superhydrophobic and superoleophilic coated surface may consist essentially of the reacted low surface energy fluoroalkyl silane or silanes. In certain aspects, the superhydrophobic and superoleophobic coated surface has a ratio of fluorine to oxygen of greater than or equal to about 1.

In one variation, forming a coated surface that superhydrophobic and superoleophilic comprises selecting the low surface energy fluoroalkyl silane from a group consisting of heptadecafluoro-1,1,2,2-tetrahydrodecyl triethoxysilane, tridecafluoro-1,1,2,2-tetrahydrooctyl triethoxysilane, and combinations thereof. The reacting of the low surface energy fluoroalkyl silane with hydroxyl groups on the surface can occur at greater than or equal to about 95° C. (about 203° F.) to less than or equal to about 105° C., optionally at about 100° C. The reacting can be conducted for a duration of greater than or equal to about 1 hour to less than or equal to about 2 hours until greater than or equal to about 40% of the hydroxyl groups have reacted with the low surface energy fluoroalkyl silane.

In another variation, a superhydrophobic and superoleophilic coated surface with the low surface energy fluoroalkyl silane comprising nonafluorohexyl triethoxysilane. The reacting of the low surface energy fluoroalkyl silane with hydroxyl groups on the surface occurs at room temperature within a vacuum desiccator for a duration of greater than or equal to about 10 days to less than or equal to about 14 days until greater than or equal to about 40% of the hydroxyl groups have reacted with the low surface energy fluoroalkyl silane.

In yet another variation, a superhydrophobic and superoleophilic coated surface is formed by selecting the low surface energy fluoroalkyl silane from a group consisting of heptadecafluoro-1,1,2,2-tetrahydrodecyl triethoxysilane, tridecafluoro-1,1,2,2-tetrahydrooctyl triethoxysilane, and combinations thereof. In this embodiment, the method includes reacting of the low surface energy fluoroalkyl silane with hydroxyl groups on the surface occurs at room temperature within a vacuum desiccator for a duration of greater than or equal to about 5 days to less than or equal to about 10 days until greater than or equal to about 40% of the hydroxyl groups have reacted with the low surface energy fluoroalkyl silane.

In other aspects, the present disclosure contemplates methods of forming a porous surface having a predetermined wettability selected to be superhydrophilic and superoleophobic (number (v) above), and thus has a first apparent advancing dynamic contact angle of less than or equal to about 5° for water and a second apparent advancing dynamic contact angle of greater than or equal to about 150° for a preselected oil. Such a method comprises reacting a low surface energy fluoroalkyl silane with hydroxyl groups on a surface of a porous material, where the low surface energy fluoroalkyl silane has a surface tension of less than or equal to about 35 mN/m. The reacting is then conducted until greater than or equal to about 30% of the hydroxyl groups on the surface react with the low surface energy fluoroalkyl silane in a silanization reaction to form the coated surface exhibiting superhydrophilic and superoleophobic wettability. In certain aspects, the superhydrophilic and superoleophobic coated surface may consist essentially of the reacted low surface energy fluoroalkyl silane or silanes. In certain aspects, the superhydrophilic and superoleophobic coated surface has a ratio of fluorine to oxygen of greater than or equal to about 0.5.

In one variation, a superhydrophilic and superoleophobic coated surface is formed by selecting the low surface energy fluoroalkyl silane from a group consisting of heptadecafluoro-1,1,2,2-tetrahydrodecyl triethoxysilane, tridecafluoro-1,1,2,2-tetrahydrooctyl triethoxysilane, nonafluorohexyl triethoxysilane, and any combinations thereof. The reacting of the low surface energy fluoroalkyl silane with hydroxyl groups on the surface occurs at room temperature within a vacuum desiccator for a duration of greater than or equal to about 10 hours to less than or equal to about 24 hours, until greater than or equal to about 30% of the hydroxyl groups have reacted with the low surface energy fluoroalkyl silane.

In another variation, a superhydrophilic and superoleophobic coated surface is formed by selecting the low surface energy fluoroalkyl silane from a group consisting of heptadecafluoro-1,1,2,2-tetrahydrodecyl trichlorosilane, heptadecafluoro-1,1,2,2-tetrahydrooctyl trichlorosilane, and combinations thereof. The reacting of the low surface energy fluoroalkyl silane with hydroxyl groups on the surface occurs at room temperature within a vacuum desiccator for a duration of greater than or equal to about 1 hour to less than or equal to about 15 hours, until greater than or equal to about 30% of the hydroxyl groups have reacted with the low surface energy fluoroalkyl silane.

FIGS. 4A and 4B shows micrographs reflecting morphology of a commercially available cellulose based filter paper, before (FIG. 4A) and after silanization (FIG. 4B) in accordance with certain aspects of the present disclosure. Notably, the pre-treated paper is both hydrophilic and oleophilic, while the treated paper comprising the low surface energy coated surface exhibiting extreme wettability is both superhydrophobic and superhydrophilic (omniphobic).

The present disclosure further contemplates an embodiment where a porous material comprises a coated surface that is both superhydrophobic, having a first apparent advancing dynamic contact angle of greater than or equal to about 150° for water and oleophilic, having a second apparent advancing dynamic contact angle of less than or equal to about 90° for a preselected oil. In certain variations, the coated surface is superoleophilic, having the second apparent advancing dynamic contact angle of less than or equal to about 5° for a preselected oil. The porous material may be any of the substrates discussed above that were discussed previously above. In one embodiment, the substrate comprises paper or cellulose. In certain variations, the surface coating may comprise a layer formed by reacting a low surface energy fluoroalkyl silane with hydroxyl groups on the surface of the porous material. Thus, in such variations, the coated surface comprises a low surface energy fluoroalkyl silane having a surface tension of less than or equal to about 35 mN/m that has reacted with hydroxyl groups on the porous material. In certain aspects, the coated surface consists essentially of a low surface energy fluoroalkyl silane having a surface tension of less than or equal to about 35 mN/m reacted with hydroxyl groups on the porous material.

In certain other variations, the surface coating optionally further comprises a polymeric material that serves as a sublayer beneath the coating formed by the low surface energy fluoroalkyl silane. Such a polymeric material may comprise surface hydroxyl groups that react with the low surface energy fluoroalkyl silane and may comprise polyvinyl alcohol. In such variations, the coated surface consists essentially of a polymeric material on the porous material and a low surface energy fluoroalkyl silane having a surface tension of less than or equal to about 35 mN/m reacted with hydroxyl groups on the polymeric material.

In various aspects, where the surface wettability is superhydrophobic and oleophilic or superoleophilic, the coated surface has a ratio of fluorine to oxygen of greater than or equal to about 1. As noted above, a ratio of F:O can be obtained using x-ray photoelectron spectroscopy, as is well known to those of skill in the art. In certain aspects, greater than or equal to about 40% of the hydroxyl groups on the porous material (whether on the activated porous material itself or on a sublayer polymeric coating bearing hydroxyl groups) are reacted with the low surface energy fluoroalkyl silane. The superhydrophobic and oleophilic/superoleophilic surface coating may be formed by reacting a low surface energy fluoroalkyl silane selected from a group consisting of: heptadecafluoro-1,1,2,2-tetrahydrodecyl triethoxysilane, tridecafluoro-1,1,2,2-tetrahydrooctyl triethoxysilane, nonafluorohexyl triethoxysilane, and combinations thereof.

In other aspects, the present disclosure further contemplates an embodiment where a porous material comprises a coated surface that is both superhydrophobic, having a first apparent advancing dynamic contact angle of greater than or equal to about 150° for water and superoleophobic, having a second apparent advancing dynamic contact angle of greater than or equal to about 150° for a preselected oil. In such an embodiment, the superhydrophobic and superoleophobic coated surface is considered to be omniphobic. The porous material may be any of the substrates discussed above that were discussed previously above. In one embodiment, the substrate comprises paper or cellulose. In certain variations, the surface coating may comprise a layer formed by reacting a low surface energy fluoroalkyl silane having a surface tension of less than or equal to about 25 mN/m with hydroxyl groups on the surface of the porous material, and in certain variations, the low surface energy fluoroalkyl silane may have a surface tension of less than or equal to about 10 mN/m.

Thus, in such variations, the coated surface comprises a low surface energy fluoroalkyl silane having a surface tension of less than or equal to about 25 mN/m, optionally less than or equal to about 10 mN/m, that has reacted with hydroxyl groups on the porous material. In certain aspects, the coated surface consists essentially of a low surface energy fluoroalkyl silane having a surface tension of less than or equal to about 25 mN/m, optionally less than or equal to about 10 mN/m, reacted with hydroxyl groups on the porous material.

In certain other variations, the surface coating optionally further comprises a polymeric material that serves as a sublayer beneath the coating formed by the low surface energy fluoroalkyl silane. Such a polymeric material may comprise surface hydroxyl groups that react with the low surface energy fluoroalkyl silane and may comprise polyvinyl alcohol. In such variations, the coated surface consists essentially of a polymeric material on the porous material and a low surface energy fluoroalkyl silane having a surface tension of less than or equal to about 25 mN/m, optionally less than or equal to about 10 mN/m, reacted with hydroxyl groups on the polymeric material.

In various aspects, where the surface wettability is superhydrophobic and superoleophobic (e.g., omniphobic), the coated surface has a ratio of fluorine to oxygen of greater than or equal to about 2. In certain aspects, greater than or equal to about 60% of the hydroxyl groups on the porous material (whether on the activated native porous material itself or on a sublayer polymeric coating bearing hydroxyl groups) are reacted with the low surface energy fluoroalkyl silane. The superhydrophobic and superoleophobic surface coating may be formed by reacting a low surface energy fluoroalkyl silane selected from a group consisting of: heptadecafluoro-1,1,2,2-tetrahydrodecyl triethoxysilane, heptadecafluoro-1,1,2,2-tetrahydrodecyl trichlorosilane, heptadecafluoro-1,1,2,2-tetrahydrooctyl trichloro silane, tridecafluoro-1,1,2,2-tetrahydrooctyl triethoxysilane, and combinations thereof.

In yet other aspects, the present disclosure contemplates a porous material comprising a coated surface that is both superhydrophilic, having a first apparent advancing dynamic contact angle of less than or equal to about 5° for water and oleophobic, having a second apparent advancing dynamic contact angle of greater than or equal to about 90° for a preselected oil. In certain variations, the coated surface is superoleophobic, having the second apparent advancing dynamic contact angle of less than or equal to about 5° for a preselected oil. The porous material may be any of the substrates discussed above that were discussed previously above. In one embodiment, the substrate comprises paper or cellulose. In certain variations, the surface coating may comprise a layer formed by reacting a low surface energy fluoroalkyl silane with hydroxyl groups on the surface of the porous material. Thus, in such variations, the coated surface comprises a low surface energy fluoroalkyl silane having a surface tension of less than or equal to about 35 mN/m that has reacted with hydroxyl groups on the porous material. In certain aspects, the coated surface consists essentially of a low surface energy fluoroalkyl silane having a surface tension of less than or equal to about 35 mN/m reacted with hydroxyl groups on the porous material.

In certain other variations, the surface coating optionally further comprises a polymeric material that serves as a sublayer beneath the coating formed by the low surface energy fluoroalkyl silane. Such a polymeric material may comprise surface hydroxyl groups that react with the low surface energy fluoroalkyl silane and may comprise polyvinyl alcohol. In such variations, the coated surface consists essentially of a polymeric material on the porous material and a low surface energy fluoroalkyl silane having a surface tension of less than or equal to about 35 mN/m reacted with hydroxyl groups on the polymeric material.

In various aspects, where the surface wettability is superhydrophilic and oleophobic or superoleophobic, coated surface has a ratio of fluorine to oxygen of greater than or equal to about 0.5. In certain aspects, greater than or equal to about 30% of the hydroxyl groups on the porous material (whether on the activated porous material itself or on a sublayer polymeric coating bearing hydroxyl groups) are reacted with the low surface energy fluoroalkyl silane. The superhydrophilic and oleophobic or superoleophobic surface coating may be formed by reacting a low surface energy fluoroalkyl silane selected from a group consisting of heptadecafluoro-1,1,2,2-tetrahydrodecyl triethoxysilane, heptadecafluoro-1,1,2,2-tetrahydrodecyl trichlorosilane, heptadecafluoro-1,1,2,2-tetrahydrooctyl trichloro silane, tridecafluoro-1,1,2,2-tetrahydrooctyl triethoxysilane, nonafluorohexyl triethoxysilane, and combinations thereof.

In various aspects, the present disclosure provides novel porous materials having predetermined extreme wettabilities. For example, commercially available porous materials can be treated in accordance with the inventive technology to provide novel materials, lowering the cost and research necessary to introduce extreme wettabilities into products. Moreover, the methods of the present technology are simple, but readily adaptable. For example, similar chemical processes can be used to create different wettabilities, which permits not only design of distinct materials on the same equipment, but also reuse of processing equipment for different applications.

The ability to control the wettability of surfaces and membranes is a key aspect of developing a large number of new technologies such as: efficient separation oil and water for oil spills, low-cost paper-based microfluidic devices, and self-cleaning materials, by way of non-limiting example. Moreover, the inventive porous materials can be made at low-cost and on a massive scale manufacturing, which makes them commercially viable and particularly useful in disposable applications. For example, it is contemplated that the coated surfaces of porous materials according to certain aspects of the present technology are particularly suitable for use in microfluidic devices, such as paper-based microfluidic devices. Such paper based microfluidics may include disposable assays and tests.

In other aspects, porous materials having coated surfaces in accordance with the present teachings can be used as oil-water separation membranes. The Deepwater Horizon oil spill in the Gulf of Mexico highlighted the difficulties in finding effective oil-water separation technology. Efficient, cost-effective processes for oil-water separation, especially in the presence of dispersants (or surfactants), are particularly desirable. Surfactant-stabilized mixtures of oil and water are classified, in terms of the diameter (d) of the dispersed phase, as free oil and water if d>150 µm, a dispersion if 20 µm<d<150 µm or an emulsion if d<20 µm. Conventional gravity separators and skimming techniques are incapable of separating emulsions. Membrane-based technologies are attractive for demulsification (the conversion of an emulsion to a free oil-water mixture), because they are relatively energy efficient, cost effective, and are applicable across a wide range of industrial effluents. However, for complete oil-water separation, demulsification is typically followed by either gravity separation or skimming.

Separation membranes are typically classified as either hydrophobic or hydrophilic. Their wettability by oil is often not specified because, in most cases, such membranes are oleophilic, that is, their contact angle with oil is <90°. Hydrophobic (or superhydrophobic) and oleophilic membranes are typically used in energy-intensive cross-flow filtration systems, because they are unsuitable for gravity-driven oil-water separation. Water naturally settles below oil and against the membrane owing to its higher density, thus forming a barrier layer that prevents oil permeation. Hydrophobic and oleophilic membranes are also easily fouled by oil during demulsification. Although conventional hydrophilic membranes can be used for gravity-driven demulsification, and are more resistant to fouling, they are unsuitable for the separation of free oil-water mixtures or water-in-oil emulsions because both oil and water can easily permeate through them.

As many as three different phases (oil, oil-in-water or water-in-oil emulsion, and water) may co-exist in oil-water mixtures. To effect the gravity-driven separation of all types of oil-water mixtures in a single step, the ideal membrane is expected to be hydrophilic (or superhydrophilic) and oleophobic (or superoleophobic), both in air and when submerged in water. However, a membrane that is oleophobic in air typically loses its oleophobicity under water, and vice versa.

Most surfaces that are superoleophobic (displaying apparent contact angles for oil of $\theta_{oil}$>150°) are also superhydrophobic. This is due to the higher surface tension of water, which results in the respective Young's contact angles satisfying $\theta_{water}$>$\theta_{oil}$. Creation of surfaces having $\theta_{water}$>$\theta_{oil}$ has been achieved by using specific interactions between water and the substrate to lower the solid-liquid interfacial tension ($\gamma_{sl}$). However, almost all of such surfaces are oleophilic. Hydrophilic (or superhydrophilic) and oleophobic (or superoleophobic) surfaces, like those provided by the present teachings, are extremely unique.

Accordingly, novel porous materials fabricated in accordance with the inventive principles can be used in a separator device as separator membrane, which is both hydrophilic and oleophobic in both air and under water. These membranes can separate oil-water mixtures, including surfactant stabilized emulsions, solely using gravity, in a single unit operation, with more than 99.9% separation efficiency. These membranes are used for the separation of free oil-water, oil-water dispersions, as well as surfactant stabilized oil-water emulsions with greater than 99.9% separation efficiency, as shown in FIGS. 6 and 7. The separator membrane comprises a hydrophilic and oleophobic membrane, where free oil (hexadecane) and water are separated after two minutes in FIG. 6. In FIG. 7, separation of an oil-in-water emulsion using the hydrophilic and oleophobic porous separator membrane is shown. The oil-in-water emulsion comprises hexadecane oil stabilized by a surfactant, sodium dodecyl sulfate (SDS), in water. As can be seen, after 5 minutes elapse, the emulsion separates into pure hexadecane and water with SDS. The purity level of hexadecane is about 99.9 weight % and the water likewise has a purity of about 99.9 weight %, excluding the SDS.

In various aspects, the present disclosure provides methods and apparatuses for continuously filtering a first component from a liquid-liquid mixture. A method of separating a liquid-liquid mixture comprises contacting a liquid-liquid mixture with a porous separator material having a coated surface (comprising a low surface energy fluoroalkyl silane) exhibiting extreme wettability. In certain aspects, the method of separating a liquid-liquid mixture comprises contacting a liquid-liquid mixture with a porous separator material having a coated surface (comprising a low surface energy fluoroalkyl silane) exhibiting extreme wettability in accordance with various aspects of the present disclosure. The liquid-liquid mixture comprises a first component present at an initial amount and a second component. The separation of the first component from the second component can occur by contacting the liquid-liquid mixture with the coated surface of the porous material via wicking on or through one or more regions of the coated surface.

Thus, in certain variations, the contacting facilitates separation by passage of the first component through the porous separator material, so that the contacting separates greater than or equal to about 85 weight % to less than or equal to about 100 weight % of the initial amount of the first component from the liquid-liquid mixture. The balance that remains above the porous separator is primarily the second component. In certain aspects, this may be a gravity fed separation process. Such high separation levels occur with separators prepared in accordance with the present disclosure, even for emulsions and dispersed phases. In other aspects, the contacting facilitates separation of the first component from the second component by transporting the first component via a first fluid pathway and the second component via a second distinct fluid pathway. In this way, greater than or equal to about 85 weight % to less than or equal to about 100 weight % of the initial amount of the first component from the liquid-liquid mixture and greater than or equal to about 85% to less than or equal to about 100% of the second component from the liquid-liquid mixture, so that the first component and the second component are separated and collected at high purity levels. Again, such high separation levels are possible for emulsions and dispersed phases with the inventive technology.

Such continuous methods of separation can be conducted in various conventional separator devices. For example, in certain embodiments, the liquid-liquid mixture is gravity-assisted or gravity fed towards the porous separator material having a coated surface (comprising a low surface energy fluoroalkyl silane) to continuously separate the first component and optionally the second component from the liquid-liquid mixture. Therefore, the first component can be efficiently and continuously separated from a concentrated second component.

In other aspects, the inventive porous materials having coated surfaces with extreme wettability are particularly suitable for use in microfluidic devices, such as paper-based microfluidic devices, including bioassay and "lab-on-a-chip" applications. In certain aspects, different surfaces with extreme wettabilities can be combined on a single substrate (porous material surface) to enable cheap, rapid, facile and conclusive industrial and medical diagnostics, in particular for use in developing countries. For example, microfluidic devices are typically created by fabricating channels that are wetting to a particular contacting fluid or liquid, within a background that cannot be wet by the contacting fluid or liquid. This confines the contacting fluid or liquid within the patterned channels.

Conventional devices can only be used with high surface tension liquids, such as water. The chemically patterned channels typically created in previous work cannot contain low surface tension liquids, such as various oils and alcohols. This limitation severely curtails the potential applications of conventional paper-based microfluidic devices to only water and water-based solutions. However, paper-based fluidic devices prepared in accordance with certain aspects of the present teachings successfully address and overcome such issues.

Combining low-cost and high-performance, open-channel paper-based fluidic devices in particular are a promising platform for point-of-care diagnostics and field detection. A fluidic channel on paper can be prepared by creating a hydrophilic-hydrophobic contrast (e.g., a surface energy barrier) between the channel and background. Compared with traditional closed-channel microfluidics, current open-channel microfluidic device platforms lack versatility in fluid control to match demand for increased design complexity. In certain aspects, the inventive technology provides novel open-channel fluidic devices, such as a paper-based open channel microfluidic device.

In accordance with certain embodiments of the present disclosure, a fluidic or microfluidic device is contemplated. Such a fluidic or microfluidic device optionally comprises a porous material having a surface comprising: (i) a first surface region exhibiting an extreme wettability and (ii) a second surface region, distinct from the first surface region, exhibiting a second, distinct wettability. The extreme wettability of the first surface region may be selected from a group consisting of: (i) superhydrophobic and oleophilic; (ii) superhydrophobic and superoleophilic; (iii) superhydrophobic and superoleophobic; (iv) superhydrophilic and oleophobic; and (v) superhydrophilic and superoleophobic. Thus, the (i) first surface region and/or the (ii) second surface region can be applied as a coating on the surface in accordance with the various principles previously outlined above. In certain aspects, one of the first and second surface regions is capable of receiving, transferring, and/or storing a target fluid (or fluids), while the other of the first and second surface regions repel the target fluid (or fluids). The fluid or fluids may be a polar liquid, a non-polar liquid, or combinations thereof. Accordingly, in the microfluidic device, the (i) first surface region and (ii) second surface region together define at least one microscale fluidic pathway for the fluid on the surface of the porous material. In certain aspects, the at least one fluidic pathway is an open channel exposed to an external environment. The fluidic or microfluidic device may be used for separating a single stream of distinct components, combining distinct components into a single stream (e.g., emulsification or formation), testing, analytics, detection, bioassays, and the like.

In certain aspects, the disclosure provides methods of forming features, such as fluidic pathways, that are on a microscale. In other aspects, the fluidic pathways are on a macroscale. In some aspects, the feature or pathway is optionally smaller than a microstructure, such as a nanoscale feature. As used herein, "macroscale" refers to a feature having at least one dimension above 100 µm. "Microscale" refers to a feature having at least one dimension that is less than or equal to about 100 µm, optionally less than or equal to about 50 µm, optionally less than or equal to about 25 µm, optionally less than or equal to about 10 µm, and in some aspects, less than or equal to about 1 µm. A "nanoscale" feature has at least one dimension that is less than or equal to about 100 nm (0.1 µm), optionally less than or equal to about 50 nm, and optionally less than or equal to about 10 nm. As used herein, reference to a microscale, microstructure, micro-channel, or microfluidic channels, encompasses smaller structures, such as the equivalent nanoscale structures, as well.

Thus, in certain aspects, methods are provided for forming a micro scale feature (optionally any structure, like a fluidic pathway, that is a microstructure or smaller) on a surface of a porous material substrate. The microscale feature or structure has a major elongate axis or prominent elongate dimension, which may far exceed a microscale dimension (e.g., be on a macroscale). In certain aspects, the first and second surface regions may be applied as a pattern to the surface of the porous material, for example, in channels formed by masking the surface and applying a coating to the unmasked regions of the surface of the porous material. In certain aspects, the feature or fluidic pathway is an open channel or feature, meaning that it has at least one exposed region and does not form an enclosed structure. As described in further detail below, the at least one fluidic pathway may be configured to promote two-dimensional transport of a fluid or alternatively configured to promote three-dimensional transport of a fluid.

In accordance with certain other embodiments of the present disclosure, a fluidic or microfluidic device optionally comprises a porous material comprising a surface comprising: (i) a first surface region that comprises a coating that is superhydrophobic, having a first apparent advancing dynamic contact angle of greater than or equal to about 150° for water and superoleophobic, having a second apparent advancing dynamic contact angle of greater than or equal to about 150° for a preselected oil. The surface also comprises (ii) a second surface region that is hydrophilic, having a first apparent advancing dynamic contact angle of less than or equal to about 90° for water and oleophilic, having a second apparent advancing dynamic contact angle of less than or equal to about 90° for a preselected oil. In certain aspects, the fluid or fluids may be a polar liquid, a non-polar liquid, or combinations thereof. The second surface region is thus capable of receiving, transferring, and/or storing a fluid (or fluids). However, the first surface region may repel the fluid (or fluids). In the microfluidic device, the (i) first surface region and (ii) second surface region together define at least one microscale fluidic pathway for the fluid on the surface of the porous material. In certain aspects, the at least one fluidic pathway is an open channel pathway. The (i) first surface region can be applied as a coating on the surface in accordance with the various principles previously discussed above.

In certain aspects, the coating of the first surface region comprises a low surface energy fluoroalkyl silane having a surface tension of less than or equal to about 25 mN/m. In certain variations, the low surface energy fluoroalkyl silane is selected from a group consisting of: heptadecafluoro-1,1,2,2-tetrahydrodecyl triethoxysilane, heptadecafluoro-1,1,2,2-tetrahydrodecyl trichlorosilane, heptadecafluoro-1,1,2,2-tetrahydrooctyl trichloro silane, tridecafluoro-1,1,2,2-tetrahydrooctyl triethoxysilane, and combinations thereof. In other aspects, the coating of the first surface region comprises a low surface energy fluoroalkyl silane having a surface tension of less than or equal to about 10 mN/m. In certain embodiments, the coating on the surface defining the first surface region consists essentially of a low surface energy fluoroalkyl silane having a surface tension of less than or equal to about 25 mN/m. In certain variations, the coating on the first surface region has a ratio of fluorine to oxygen of greater than or equal to about 2.

In other aspects, the surface of the porous material comprises hydroxyl groups, as discussed in previous embodiments above. Thus, in certain variations, greater than or equal to about 60% of the hydroxyl groups on the porous material are reacted with the low surface energy fluoroalkyl silane. In certain aspects, the porous material comprises paper or cellulose. In other aspects, the porous material comprises a polymeric coating comprising hydroxyl groups in the areas corresponding to the first surface region, such as polyvinyl alcohol. Then, the coating comprising low surface energy fluoroalkyl silanes is disposed over the polymeric coating to define the first surface region.

Generally, as noted above, a solid surface can be made more wettable to liquids by applying a plasma treatment in accordance with certain variations of the present disclosure, such as oxygen plasma treatment, after formation of the fluoroalkyl silanized coating. This is the same phenomenon observed on the HP/OL and omniphilic fluoro-papers (FIGS. 1, 2, and 3A-3B: Quadrants IV and III). Extreme wettabilities can be thus formed on the porous material surface comprising the fluoroalkyl silane coating, as shown in FIGS. 3A-3B. In FIG. 3A, wettability quadrants with oil-water contact angle axes (from 0° to 180°). Quadrant I has an omniphobic surface (e.g., all-liquid nonwetting) from perfluoro silane-coated paper; Quadrant II has a hydrophilic and oleophobic surface (HL/OP) (e.g., water wetting, but oil nonwetting) from deep-$O_2$-plasma-etched perfluoroalkyl silane-coated paper (with about 200 W/900 seconds of plasma treatment); Quadrant III, has an omniphilic surface (e.g., all-liquid wetting) from middle-$O_2$-plasma-etched perfluoroalkyl silane-coated paper (with about 60 seconds plasma treatment); Quadrant IV, hydrophobic and oleophilic (HP/OL) (e.g., water nonwetting, but oil wetting) from light-$O_2$-plasma-etched perfluoroalkyl silane-coated paper (with 15 seconds of plasma treatment). It should be noted that the treatment times discussed herein are exemplary, but may vary based on different plasma devices and processing conditions. FIG. 3B shows a continuous change of surface wettability on fluoroalkyl silane-coated paper by 200 W power $O_2$ plasma etching. The four extreme wettabilities (omniphobic, HP/OL, omniphilic and HL/OP) can be achieved in sequence from 0 seconds to 900 seconds and longer. Water (blue), ethanol (green), hexane (red) and hexadecane (red) are used for testing, covering both polar and nonpolar liquids with surface tensions ranging from 72.8 to 18.4 mN m$^{-1}$ (at 20° C.). "Oil recovery" in nonpolar liquids is observed as the contact angle of alkanes first reduces and then recovers to the original value or even higher, with an increased O$_2$ plasma etching time (FIG. 14).

Figure 2:
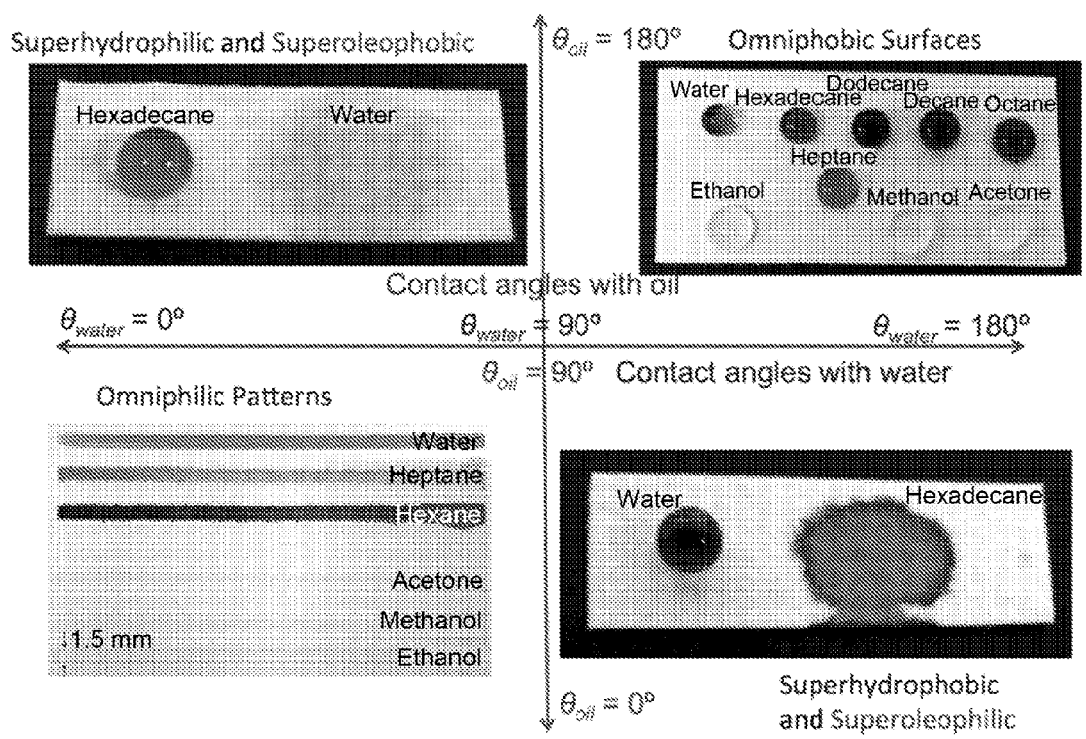
FIG. 2 shows quadrants for contact angles of surfaces as in FIG. 1, but with insets of photographs of examples prepared in accordance with certain aspects of the present teachings having extreme wettabilities within each respective quadrant.

Thus, in accordance with certain aspects of the present teachings, O$_2$ plasma treatment after formation of the fluoroalkyl silanized coating can be used to make the surface more wettable to select liquids/fluids. After a short time (<15 seconds) of O$_2$ plasma etching (again, at 200 W standard power unless otherwise indicated), the omniphobic porous material surface comprising the fluoroalkyl silane coating can be transformed into HP/OL (FIGS. 2 and 3A-3B). In between, it is a HP/semi-OL state. This means that the coated surface is nonwetting to water and alkanes with high carbon number like hexadecane are likewise nonwetting, but those with low carbon number, like hexane, are wetting. In this case, SEM and XPS results show that the morphology of cellulose fibers change very little, but a great increase in oxygen on surface occurs (FIGS. 15B-1-15B-3). The surface energy is high enough to $\theta^*_{adv}$ for the liquids with low surface tension, like alkanes and ethanol, to be as low as zero (FIG. 14). However, due to the relatively high surface tension, $\theta^*_{adv}$ of water is only decreased, but not zero, e.g., water remains nonwetting on the surface. With a longer time of O$_2$ plasma etching (for example, up to around 30 seconds), the fluorine to oxygen (F/O) ratio can reach its minimal value (FIGS. 15D-1-15D-3 and FIG. 15J). In this case, many nanostructures appear along the cellulose microfibers. This is believed to be caused by the removal of amorphous parts in cellulose fibers and the exposure of crystalline cellulose nanofibrils. After 60 seconds of plasma etching, induced by increased surface roughness (FIGS. 15E-1-15E-3), water is now wetting, by which the porous material surface comprising the fluoroalkyl silane coating becomes omniphilic (FIGS. 2 and 3B).

With even longer durations of O$_2$ plasma etching, rather than making the omniphilic fluoroalkyl silanized coating more wettable, a HL/OP extreme wettability appears on the fluoro-paper (FIG. 3A, Quadrant II). This phenomenon is unexpected and is not believed to have been reported or observed before. Counter-intuitively, upon further increasing the O$_2$ plasma etching time, rather than making the omniphilic surface more wettable, the plasma treatment yields the HL/OP extreme wettability (FIG. 3B). When the O$_2$ plasma etching time was greater than 300 seconds, the surface became non-wettable for hexadecane and for the etching times greater than 900 seconds, the surface became non-wettable for even hexane.

This abnormal trend is referred here as "oil recovery," as this decrease of wettability reflected in the recovery on $\theta^*_{adv}$ is predominantly observed among non-polar liquids such as alkanes like hexane (FIG. 14). When the etching time is above 300 seconds, a recovery on $\theta^*_{adv}$ of alkanes—designated "oil recovery"—can be clearly observed (FIGS. 3B and 14). Interestingly, the oil recovery only occurs with nonpolar liquids. For the polar liquids, like water and ethanol, $\theta^*_{adv}$ remains at zero.

To determine the cause of this unusual trend, SEM and XPS characterizations are used to analyze the changes and details on both surface roughness and chemistry (FIGS. 15F-1-15F-3 and 15I-1-15I-3). It is found that after F/O ratio reaches its minimal value around 30 seconds of etching, it is then subsequently recovered with additional treatment. It is believed that this kind of fluorine element recovery is caused by re-deposition of fluorocarbon fragments on an O$_2$ plasma-etched surface. Meanwhile with further oxygen plasma etching, the surface of cellulose microfibers become rougher and rougher, with more and more crystalline nanofibrils being exposed. Believed to be caused by a synergetic effect from both enhancement in roughness and recovered fluorine content on surface, alkanes become nonwetting or in certain variations, even superoleophobic, like hexadecane ($\theta^*_{adv}$ C16 is 154.3 on 900 seconds-etched fluoroalkyl silane-coated paper).

Generally, if a surface cannot be wetted by oil, like alkanes, wetting from water is even more difficult. This is because the surface tension of water is much higher than those of alkanes. However, after a redeposition of fluorocarbon fragments, a binary reconfigurable surface is believed to result. In this case, if a polar liquid, like water, contacts the surface, the polar groups, like hydroxyls along cellulose fibers, will cover the nonpolar groups (fluorocarbon deposits) on the surface to lower the interfacial free energy. The result is to make the polar liquid tend to wet the surface, while the surface is not wet by non-polar liquids, like hexane. Moreover, on the surface of O$_2$ plasma-etched cellulose paper, the wetting effect to polar liquids is further enhanced by the nanoscale roughness (FIGS. 15I-1-15I-3). Thus, the methods of the present disclosure provide an ability to control surface energy, roughness and reconfigurability, which allows creation of surfaces with finely tuned wettability. Benefiting from the unexpected oil recovery, all four extreme wettabilities can be created on the fluoroalkyl silane coated-paper by regulating the O$_2$ plasma etching time, formed in the sequence of omniphobic (FIGS. 1, 2, and 3A, Quadrant I), HP/OL (FIGS. 1, 2, and 3A, Quadrant IV), omniphilic (FIGS. 1, 2, and 3A, Quadrant III), and finally to HL/OP (FIGS. 1, 2, and 3A, Quadrant II). This is of great significance not only in patterning paper and other porous substrates, but also as a powerful tool to further regulate the wettability of open fluidic channels on paper. As such, advanced fluid control motifs can be achieved and integrated into open-channel paper-based fluidic devices.

Because the O$_2$ plasma etching employed is directional in nature, only a portion of the surface of the fluoroalkyl silane-coated paper is modified. In other words, the liquid can be well confined to a predetermined depth from the paper surface, rather than wet the whole layer of paper (FIG. 10C, FIG. 16A). This can be beneficial in lowering sample retention (e.g., the ineffective sample consumption used for reaching work or detection zones). For example, in a fluidic channel with the dimensions of 50 mm (length)×2 mm (width)×390 μm (thickness of paper), the volume is 39 μL. If the liquid is confined to a wetting depth of 100 μm, the volume is reduced down to 10 μL, which is almost 75% less liquid retention.

By way of further explanation, based on the four extreme wettabilities (FIGS. 1, 2, and 3A), where a low surface energy fluoroalkyl silane is first applied to a porous substrate (such as paper), the patterning of the coated fluoro-papers can be grouped into four stages. At a first stage without etching, the fluoroalkyl silane-coated paper is omniphobic like the remainder of the coated background of the paper. Next, in the second stage, with less than 15 seconds of etching, the fluoro-paper is transformed into HP/OL. In this case, both wetting length and wetting velocity of water are still close to zero due to its high surface tension (72.8 mN m$^{-1}$) (water ribbons in FIGS. 10B, 10D). However, for low surface tension liquids, either polar or nonpolar, they can wet a certain length (FIG. 10A).

Polarity of each liquid must be considered. This can be explained by the local movement of three-phase contact line (TCL) of liquid on a cellulose microfiber. Locally, a cellulose microfiber surface can be considered as quasi-smooth. If the local movement of TCL happens spontaneously, it means that the free energy change during wetting ($\Delta G_{wetting}$) should be negative. $\Delta G_{wetting}$ can be expressed in the following equation, $$\Delta G_{wetting}=(\gamma_{SL}+\gamma_{LG}\cos\theta)-\gamma_{SG}$$

where $\gamma_{SL}$, $\gamma_{LG}$, $\gamma_{SG}$ are the interfacial tensions between the solid and the liquid, the liquid and the vapor, and the solid and the vapor, respectively. $\theta$ is the instant local contact angle. On the HP/OL fluoroalkyl silane-coated paper, due to the difference of solid-liquid interaction between the liquid and the etched surface, $\gamma_{SL}$ from polar liquids could be lower than that from nonpolar liquids with similar or even lower $\gamma_{LG}$. So, the tendency of a polar liquid with a relatively high surface tension (like DMF) to wet the surface could be even higher than that of a nonpolar liquid (like hexadecane).

Subsequently, in the third stage with 60 seconds of etching, the surface of fluoroalkyl silane-coated paper becomes omniphilic. In this case, water, DMF and ethanol can fill the entire channel that is 50 mm long. The maximal wetting velocity for the three polar liquids is slightly different in the forward and backward direction based on etching time and depending on a lower or higher surface tension (ethanol 30 seconds, DMF 60 seconds, water 120 seconds). Hexane experiences a slightly increased wetting length compared with that on the HP/OL stage and reaches maximum in both wetting length and wetting velocity on the 60 second-etched surface. Due to a stronger affection of oil recovery, both wetting length and wetting velocity of hexadecane go down after they reach a maximum on the 15 second-etched surface. Among the polar liquids, acetone and chloroform behave differently. The wetting length of acetone reaches a maximum on the 60 second-etched surface, but the maximal wetting velocity is from 120 second etching. To chloroform, from 5 second to 900 second etching, it shows two peaks in wetting length. One is from the 15 second-etched surface, the other is from the 120 second-etched surface. In addition, on the 120 second-etched surface, the wetting velocity of chloroform reaches its maximum.

With a longer etching time of around 900 seconds, the channels proceed to the fourth stage in HL/OP behavior. In this case, both hexadecane and hexane are beaded-up. Only water and DMF can still fill the entire 50 mm long channel. However, water and DMF also show a decline in wetting velocity. The wetting length and wetting velocity from ethanol, acetone and chloroform are greatly decreased. From this point, the oil recovery effect can also affect polar liquids in their wetting length and wetting velocity.

Therefore, in certain variations, the present disclosure contemplates methods of making a fluidic or microfluidic device that comprises a porous material comprising a surface comprising: (i) a first surface region exhibiting an extreme wettability and (ii) a second surface region, distinct from the first surface region, exhibiting a second, distinct wettability, as discussed above. As shown in FIG. 5, a porous material is a cellulose filter paper that is used as a substrate 20. A surface of the porous surface is first treated via a vapor-phase deposition of a low surface energy fluoroalkyl silane to form a coating 30 thereon. Next, the coated porous material surface is masked with a mask 40 defining a pattern having a predetermined geometry with predetermined dimensions. In certain aspects, suitable masks may include KAPTON™ tapes (S-14532, S-10518, S-7595) commercially available from Uline. Next, the select surface regions of the masked porous material surface are exposed to etching, for example, plasma treatment like oxygen ($O_2$) plasma etching, for a predetermined amount of time. The masked substrate 40 may thus be selectively treated by $O_2$ plasma etching (e.g., a PLASMATHERM™ 790, chamber vacuum 20 Torr, $O_2$ flow rate 20 sccm, bias RF source power 200 W-350 W) to obtain multiplexed treated surface 50 on paper chips shown in FIG. 5. The multiplexed treated surface 50 has first regions 52 and second regions 54 and exhibits extreme wettability. First regions 52 correspond to those having the fluoroalkyl silane coating 30 intact. The plasma (e.g., oxygen plasma) etches the exposed unmasked regions of the surface of the substrate 20 comprising the fluoroalkyl silane coating 30 during the process, so that there is minimal or no fluoroalkyl silane coating 30 remaining in those second surface regions 54.

By using localized plasma etching, extreme wettabilities can be selectively integrated on the surface of porous substrates, like paper, which offers an effective and facile method to fabricate advanced paper-based fluidic devices. Thus, the first surface region comprising the fluoroalkyl silane coating will repel fluids (e.g., is omniphobic or has other extreme wettability), while the second surface region of the porous material is capable of being wetted with fluids (e.g., is omniphilic, hydrophilic, or oleophilic). As such, a patterned microfluidic device can be formed. These extreme wettabilities combined with increased fluid control are useful in advanced applications for open-channel fluidic devices, such as paper alcoholmeter, continuous surface oil-water separation, surface emulsification and three-dimensional (3D) all-liquid fluidic chips, by way of non-limiting example.

FIG. 8 shows a paper-based microfluidic device prepared by patterning a porous material having a surface coated with low energy fluoroalkyl silanes defining a background region that is omniphobic (hydrophobic and oleophobic). The fluid pathways are plasma etched are omniphilic (hydrophilic and oleophilic). Water, heptane, hexane, acetone, methanol, and ethanol are placed on the background area, as well as in the fluidic channels. All of the fluids are repelled on the omniphobic background, while all of the fluids are wetted in the omniphilic channels.

FIG. 9 shows various omniphilic fluidic pathways etched via oxygen plasma treatment within the omniphobic coated surface comprising low energy fluoroalkyl silanes prepared in accordance with certain aspects of the present teachings. The patterned omniphilic fluidic pathways have complex shapes and sizes. The channels have been fully wetted by a fluid to better show the patterned regions. Thus, various complex and intricate features, such as continuous or discontinuous fluidic channels, can be formed in accordance with the present teachings.

Thus, microfluidic devices can be formed by processes that optionally comprise applying fluoroalkyl silane, for example, by vapor phase deposition, on cellulose paper and then treating with an etching step, for example, $O_2$ plasma post-treatment etching. In this manner, selective integration of extreme wettabilities for different fluids or liquids on a piece of paper or other porous material is provided, including omniphobic, (HP/OL) and omniphilic properties. With this technique, the four possible combinations of extreme wettabilities, including omniphobic (e.g., non-wetting to all liquids), omniphilic (e.g., wetting to all liquids), hydrophilic-oleophobic (HL/OP, e.g., wetting for water or other polar liquids, but nonwetting for oil or other nonpolar liquids, like alkanes) and reversely hydrophobic-oleophilic (HP/OL, e.g., non-wetting for water and other polar liquids, but wetting for oil and other non-polar liquid) can be achieved on a porous material surface, such as a paper surface (FIGS. 2 and 3A-3B). These extreme wettabilities combined with increased fluid control are useful in advanced applications for open-channel fluidic devices, such as paper alcoholmeter, continuous surface oil-water separation, surface emulsification and three-dimensional (3D) all-liquid fluidic chips.

Moreover, by local plasma etching or other post-coating treatment, a variety of different extreme wettabilities can be selectively integrated on the surface of the paper (or textile) having the fluoroalkyl silane coating, which provides the ability to fabricate advanced paper-based fluidic devices. The omniphobic surface on the porous material comprising a fluoroalkyl silane (FIGS. 1, 2, and 3A-3B: Quadrant I), is a starting point of the following design. For example, the coating comprising a fluoroalkyl silane reacted with hydroxyl groups on a surface of the porous paper material can be considered to be deep fluorosilanization via vapor deposition. In one example, a suitable cellulose filter paper is commercially available from Whatman as the WHATMAN-G3, having a nominal pore size of 6 μm, an overall diameter of 150 mm, and a thickness of 390 μm. The paper is a target disposed in a vapor deposition chamber. A fluoroalkyl silane comprises heptadecafluoro-1,1,2,2-tetrahydrodecyl)trichlorosilane (SIH5841.0). A dose of about 400 μL of heptadecafluoro-1,1,2,2-tetrahydrodecyl)trichlorosilane is introduced to the vapor deposition chamber, such as a vacuum oven (General Electric Precision). See FIG. 22 for an exemplary reaction schematic of SIH5841.0 forming a deep silanization coating on a cellulose paper to form a so-called "fluoropaper" in accordance with certain aspects of the present teachings. The temperature during vapor deposition is 50° C., with a vacuum of –30 inches Hg, with no pre-pumping. The vapor deposition process is conducted for 17-18 hours. After deposition, the coated paper can be soaked in a solvent or other post-treatment agent, such as ASAHIKLIN® AK-225 (neat) is 100% dichloropentafluoropropane (HCFC-225) to remove an unreacted fluorosilanes. The coated surface of the paper may be soaked in the post-treatment agent for about 20 hours. After forming the fluoroalkyl silane coating, $O_2$ plasma post-treatment can be used to further modify the surface properties.

To make a multiplex patterned fluoroalkyl silane coated paper, the sample surface is first masked with predetermined geometry and dimensions, then exposed under $O_2$ plasma etching for a certain time (as described above in the context of FIG. 5). Seven different liquids, water (blue), DMF (pink), chloroform (black), acetone (purplish gray), ethanol (light pink), hexane (wine) and hexadecane (dark red), covering polar and nonpolar liquids and with surface tension varying from 72.8 mN m$^{-1}$ to 18.4 mN m$^{-1}$ at 20° C., are used here for testing. A whole set of fluid behavior in 2D lateral flow on fluoro-paper is obtained (FIG. 10A). On each fluoroalkyl silane-coated paper chip, there are seven straight channels with the dimensions of 50 mm (length)×2 mm (width). A thickness of the paper is 390 μm. Each channel is impregnated with 20 μL testing liquid.

From these seven channels, the fluid behavior in lateral flow is obtained under room temperature and atmospheric pressure. Three parameters—maximum wetting length (the maximum horizontal distance the liquid front covers) (FIG. 10B, Table 2), average wetting velocity (maximum wetting length divided by the total wetting time) (FIG. 10D, Table 3), and wetting depth (the vertical distance the impregnated liquid can reach) (FIG. 10C, Table 4)—which directly relate to device design and application, are systematically studied.

Scanning electron microscopy (SEM) and X-ray photoelectron spectroscopy (XPS) results show that after the deep fluorination, there is little change in surface morphology, but a great increase of fluorine element on surface (FIGS. 15A-1-15A-3). This perfluorinated surface has an ultralow surface energy and a certain roughness, which can keep all kinds of liquid from wetting. Contact angles on deep fluorinated omniphobic fluoro-paper prepared in accordance with this example are shown in FIG. 13. The apparent advancing contact angle of water ($\theta^*_{adv}$ H$_2$O) on the perfluoro-paper is above 160°. The minimal surface tension of oil, such as alkanes, can go down to 18.4 mN m$^{-1}$ from hexane ($\theta^*_{adv}$ C6 is 91.3°). For polar liquids, the lowest record is achieved from ethanol with a typical surface tension of 22.3 mN m$^{-1}$ ($\theta^*_{adv}$ EtOH is 112.1°).

To better understand flow in a porous material, such as those formed in accordance with the present teachings, the Washburn may be used to describe the one-dimensional transport of fluids in porous materials, $$L^2 = \frac{\gamma Dt\cos\theta}{4\eta},$$

where L is the distance covered by the front of a liquid with dynamic viscosity η and surface tension γ, D is the average pore diameter, t is the time, and θ is the contact angle. (γ cos θ/4η) is the coefficient of penetrance.

In experiments or practical applications, deviations from the Washburn equation may arise for several reasons: i) a limiting reservoir or constrained flow (e.g. in the case where a narrow channel connects to a wider channel), ii) non-constant cross-sectional area within the liquid channel, iii) variations in the paper properties (e.g. pore size, purity), and iv) influences from the environment (e.g. gravity, ambient temperature, evaporation from liquid front).

To theoretically obtain Washburn flow in a porous material, the local contact angle of a liquid should be close to zero. So, while not limiting the present teachings to any particular theory, the phenomena observed on porous material surface subjected to deep silanization treatment with a low surface energy fluoroalkyl silane followed by etching to obtain extreme wettability in accordance with certain aspects of the present teachings, where liquids can wet the $O_2$ plasma-etched surface is considered to be a hemi-wicking rather than Washburn mechanism. Because in this case the apparent contact angle is zero though, the local contact angle is not. If a liquid undergoes hemi-wicking in a porous material, it can mean that wetting is not infinite and it will stop flow at a certain wetting length.

Here, in this example, each 20 μL of test liquid is considered as a limiting reservoir. The width of channels is 2 mm and the depth depends on $O_2$ plasma etching time and the wettability of the test liquid (see Table 4 below). For a fixed etching time and test liquid, the cross-sectional area within a channel is assumed to be constant. Porosity (6 μm) and chemical purity of the cellulose papers are assumed to be constant too. The paper chips are horizontally positioned on the bench during testing, so the influence of gravity on lateral flow is negligible. However, evaporation from the liquid front is taken into account, especially for liquids with low boiling points (b.p.). With these concepts and the Washburn equation in mind, the capillary flow is mainly determined by hydrophilicity (cos θ) and surface-tension-viscosity ratio (γ/η). Without $O_2$ plasma etching, the fluoro-paper is omniphobic, as is the background area on paper chips, and all liquids bead up with $\theta^*_{adv}$ greater than 90° (FIG. 13). Therefore, the maximum wetting length is close to zero. In the opposite and fully wetted case (i.e., cos θ=1), capillary flow appears to be dependent solely on (γ/η). If the channels can be fully wetted by the test liquids, the order of wetting velocity should be consistent with (γ/η) (Table 1): acetone>water>hexane>chloroform>DMF>ethanol>hexadecane.

The wetting velocity can be greatly affected by both surface tension and polarity of the target liquid (FIG. 10D). For example, comparing hexane with hexadecane, both are nonpolar liquids, but hexane is of a lower surface tension (18.4 mN m$^{-1}$) than hexadecane (27.5 mN m$^{-1}$). The wetting length and wetting velocity of hexane are much higher than those of hexadecane. A similar concept is observed from the wetting length and wetting velocity of acetone (surface tension 23.3 mN m$^{-1}$) and ethanol (surface tension 22.3 mN m$^{-1}$). But if chloroform or DMF are compared with hexadecane, the surface tension of chloroform (27.2 mN m$^{-1}$) or DMF (36.8 mN m$^{-1}$) is close to or even higher than hexadecane (27.5 mN m$^{-1}$), however, the wetting length and wetting velocity of the two polar liquids are higher than those of hexadecane (FIG. 10D). Therefore, surface tension is not the only factor that can affect the wetting behavior.

Table 1 below shows liquid properties (surface tension, viscosity, polarity index, boiling point (b.p.)) of the seven test liquids. Values with an asterisk show maximum values from each row, while values with a cross are the minimum values. The same notation is used in Tables 2-4 for maximum and minimum levels.

TABLE 1

| Water | DMF | Chloroform | Acetone | Ethanol | Hexane | Hexadecane |
|---|---|---|---|---|---|---|
| Surface tension (mN/m at 20° C.) | | | | | | |
| 72.8* | 36.8 | 27.2 | 23.3 | 22.3 | 18.4† | 27.5 |
| Viscosity (mPa · s at 20° C.) | | | | | | |
| 1.00 | 0.92 | 0.57 | 0.31† | 1.10 | 0.31† | 3.01 (25° C.)* |
| Surface-tension-viscosity ratio (m/s at 20° C.) | | | | | | |
| 72.8 | 40.0 | 47.7 | 75.2* | 20.3 | 59.4 | 9.1† |
| Polarity index | | | | | | |
| 10.2* | 6.4 | 4.1 | 5.1 | 5.2 | 0.1† | 0.1† |
| b.p. (° C.) | | | | | | |
| 100.0 | 152.0 | 61.2 | 56.0† | 78.4 | 68.7 | 271.0* |

*Maximum value
†Minimum value

Table 2 shows a maximum wetting length, i.e. the maximum horizontal distance the liquid front covers for the seven liquids tested.

TABLE 2

| O$_2$ plasma etching time/ 200 W (s) | Maximum wetting length (mm) | | | | | | |
|---|---|---|---|---|---|---|---|
| | Water | DMF | Chloroform | Acetone | Ethanol | Hexane | Hexadecane |
| 0 | 3.8 | 3.8 | 3.8 | 3.8 | 3.8 | 3.8 | 3.8 |
| 5 | 4.0† | 7.2 | 9.6 | 11.6 | 16.0 | 25.0* | 6.9 |
| 15 | 5.8† | 36.4 | 23.5 | 42.7 | 50* | 39.5 | 33.5 |
| 30 | 10.7† | 50* | 21.5 | 43.7 | 50* | 40.5 | 23.6 |
| 60 | 50* | 50* | 20.0† | 45.5 | 50* | 42.6 | 24.6 |
| 120 | 50* | 50* | 34.5 | 42.5 | 50* | 38.6 | 21.4† |
| 300 | 50* | 50* | 13.0 | 30.9 | 37.6 | 25.5 | 3.8† |
| 600 | 50* | 50* | 13.6 | 27.0 | 35.2 | 22.1 | 3.8† |
| 900 | 50* | 50* | 14.2 | 21.4 | 31.8 | 3.8† | 3.8† |

*Maximum value
†Minimum value

Table 3 shows average wetting velocity, i.e. maximum wetting length divided by the total wetting time.

TABLE 3

| O$_2$ plasma etching time/200 W (s) | Average wetting velocity (mm/s) | | | | | | |
|---|---|---|---|---|---|---|---|
| | Water | DMF | Chloroform | Acetone | Ethanol | Hexane | Hexadecane |
| 0 | 0 | 0 | 0 | 0 | 0 | 0 | 0 |
| 5 | 0† | 0† | 0† | 0.50 | 0.43 | 1.04* | 0† |
| 15 | 0† | 0.14 | 0.56 | 2.03 | 2.27* | 1.88 | 0.08 |
| 30 | 0.47 | 1.35 | 0.50 | 2.43 | 2.63* | 2.25 | 0.06† |
| 60 | 0.16 | 1.67 | 0.21 | 2.28 | 1.85 | 2.84* | 0.05† |
| 120 | 0.81 | 1.00 | 0.82 | 2.66* | 1.39 | 2.27 | 0.01† |
| 300 | 0.25 | 0.61 | 0.14 | 1.82* | 0.63 | 1.70 | 0† |
| 600 | 0.15 | 0.16 | 0.10 | 0.73 | 0.35 | 0.88* | 0† |
| 900 | 0.15 | 0.10 | 0.12 | 0.40* | 0.25 | 0† | 0† |

*Maximum value
†Minimum value

Table 4 shows a wetting depth, i.e. the vertical distance the impregnated liquid can reach.

TABLE 4

| O$_2$ plasma etching | Wetting depth (µm) | | | | | | |
|---|---|---|---|---|---|---|---|
| time/200 W (s) | Water | DMF | Chloroform | Acetone | Ethanol | Hexane | Hexadecane |
| 0 | 0 | 0 | 0 | 0 | 0 | 0 | 0 |
| 5 | 52 | 75 | 94* | 66 | 56 | 94* | 28† |
| 15 | 65† | 94 | 103 | 81 | 85 | 108* | 66 |
| 30 | 93 | 101 | 92 | 69 | 70 | 149* | 58† |
| 60 | 85† | 160 | 89 | 240 | 273* | 211 | 94 |
| 120 | 116 | 202 | 99 | 273 | 287* | 226 | 99† |
| 300 | 160† | 273 | 197 | 282 | 301* | 230 | 216 |
| 600 | 183 | 291 | 240 | 318 | 321* | 291 | 150† |
| 900 | 211† | 305 | 245 | 339 | 341* | 310 | 211† |

For a certain liquid, the capillary flow is only related to its wettability or hydrophilicity (cos θ). For all seven test liquids, the wetting velocity reaches a peak value within the O$_2$ plasma etching times tested (Table 3). The disruption of the order indicates that, with 5 seconds to 900 seconds of O$_2$ plasma etching, the fluoro-paper surface prepared in accordance with certain variations of the present disclosure will not be turned into a fully wettable state. This point, which is consistent with the XPS results (FIG. 15J) and the proposed redeposition of fluorocarbon fragments on the O$_2$ plasma-etched surface, is the basis to realize all the four extreme wettabilities on the fluoro-paper surface.

Moreover, it should be noted that, for all the seven test liquids, the wetting velocity reaches a peak value within the O$_2$ plasma etching times tested (FIG. 10D, Table 3). The decline after peak value can be also attributed to the oil recovery effect on wettability discussed above. Due to the redeposition of fluorocarbon fragments, the non-polar liquids become non-wetting, and the polar liquids can still wet but need to take a longer time to complete the reconfiguration process at the solid-liquid interface. The similar peak trend is also reflected in maximum wetting length (FIG. 10B).

Theoretically, the wetting length of capillary flow is infinite if the liquid channel is fully wettable, connected to a non-limiting reservoir and evaporation is negligible. However, here, each channel is fed by 20 µL of test liquid (a limiting reservoir) to mimic practical application. For certain liquids, the maximum wetting length is found to be strongly influenced by the evaporation from the liquid front. For example, liquids with relatively low boiling point (b.p.), like acetone, chloroform and hexane, cannot reach a wetting length that fills the entire 50 mm channel in the case of each channel being fed only by 20 µL of test liquid, even at peak wetting velocities. In comparison, liquids, such as water, DMF and ethanol with relatively high b.p., can fill the entire 50 mm channel over a wide range of etching times (FIG. 10A, Table 2). During O$_2$ plasma etching, only the very surface of the sample paper can be influenced or etched, with the other parts remaining in the original omniphobicity. It offers a possibility to confine liquid to a certain depth from the paper surface rather than wet the entire thickness of the paper (FIGS. 16A, 10D-10E, and Table 4). This is greatly beneficial in lowering the sample retention (i.e. the unproductive sample consumption in reaching work or detection zones).

In summary, as etching time increases on the fluoroalkyl silanized coatings on porous materials, for polar liquids with relatively high surface tension, such as for water and DMF, the wetting length is gradually increased until the liquids fills the entire volume of the channel. For polar liquids with relatively low surface tension, like chloroform, acetone and ethanol, wetting length is first increased and then decreased, but remains wetting even on the final HL/OP stage. For nonpolar liquids like alkanes, wetting length is also firstly increased and then decreased, but finally on the HL/OP stage, the non-polar liquids are beaded-up. The maximal wetting velocity of each liquid comes with its largest wetting length (water 120 seconds, DMF 60 seconds, chloroform 120 seconds, acetone 120 seconds, ethanol 30 seconds, hexane 60 seconds, hexadecane 15 seconds). It should be mentioned that, with an increasing O$_2$ plasma etching and porous nature of the cellulose paper, there might be widening effect of the fluidic channels. From the experimental results, the widening effect on water and hexadecane is negligible (FIG. 10A, FIG. 16B). For the other low surface tension polar and nonpolar liquids, a considerable widening only occurs after the liquid reaches its maximal wetting velocity.

Accordingly, after studying how to control two dimensional (2D) lateral flow on fluoroalkyl silane-coated paper, several examples of novel paper-based fluidic devices formed in accordance with the principles of the present disclosure are prepared. For example, in a first microfluidic device design, a porous material comprising paper has a treated surface. The surface has a deep silanization treatment with a low surface energy fluoroalkyl silane to form a hydrophobic and oleophobic coating thereon that can define a first surface region. After masking portions of the silanized coating, the first stage of O$_2$ plasma etching is conducted for a first predetermined time (e.g., about 15 seconds) to form a second surface region distinct from the first surface region. The second surface region, thus treated, is hydrophobic and oleophilic. In this variation, water is nonwetting, but ethanol is wetting (see, e.g., FIG. 3A, Quadrant IV). This shows a surface-tension-dependency of wetting behavior, i.e., the lower the surface tension, the larger the wetting length. The surface tension of water-ethanol mixture is going down with an increased ethanol proportion (FIG. 17). This can be directly reflected on the paper alcoholmeter as an increase in wetting length from pure water to pure ethanol (FIG. 11A).

Such a microfluidic device can be free of any pumps and used as an analytical or detection device, such as a paper alcohol meter (FIG. 11A) in one embodiment. Thus, a set of hydrophobic and oleophilic (HP/OL) channels can be formed on a paper chip for use as a paper alcoholmeter. The second surface regions in this example define a series of HP/OL straight channels (50 mm long and 2 mm wide) that are prepared by masking the fluoroalkyl silanized coating and then O$_2$ plasma etching at 200 W/15 seconds. Notably, any of the dimensions described herein are merely exemplary. Each channel is filled with 10 μL of water-ethanol mixture in a series of volume concentration of ethanol (from left to right, 0% (or 100% pure water dyed in blue), 20%, 40%, 60%, 80% and 100% (pure ethanol dyed in red)) (FIG. 11A). The wetting length from each channel can be read out as 5.5 mm (0%), 5.8 mm (20%), 8.0 mm (40%), 15.2 mm (60%), 24.5 mm (80%) and 34.5 mm (100%), respectively.

In these HP/OL channels, pure water beads up, while pure ethanol wets. This result shows a surface-tension-dependency on maximum wetting length. The lower the surface tension, the larger the maximum wetting length. The surface tension of water-ethanol mixture decreases with an increasing ethanol percentage, and is quantitatively shown by the paper alcoholmeter as an increasing maximum wetting length from pure water to pure ethanol.

In another microfluidic device design, a porous material comprising paper has a coated surface. As discussed above, the present disclosure contemplates a porous surface having a surface exhibiting a plurality of distinct extreme wettabilities, including three or more distinct wettability characteristics. In this variation, the porous substrate has a first surface region exhibiting hydrophobic and oleophobic properties, a second surface region exhibiting hydrophobic and oleophilic properties, as well as a third distinct surface region exhibiting hydrophilic and oleophobic properties. Such an integrated fluidic pathway or channel can be designed as an operation unit for continuous surface oil-water separation (see apparatus set up in FIG. 11B). To create such a surface, the porous material surface is subjected to a deep silanization treatment with a low surface energy fluoroalkyl silane to form a hydrophobic and oleophobic (omniphobic) coating thereon that can define a first surface region.

In this variation, the porous substrate may be masked with a plurality of distinct masks or may be subjected to distinct masking processes. After masking portions of the silanized coating in a first masking step, the first stage of $O_2$ plasma etching is conducted for 15 seconds to form a second surface region distinct from the first surface region. In this variation, the second surface region exhibits hydrophobic and oleophilic (HP/OL) properties. Then, a second mask can be used, which covers the second treated surface region and portions of the first surface region. In the second stage of $O_2$ plasma etching, the unmasked portions of the surface are subjected to oxygen plasma for at least about 900 seconds to form a third surface region distinct from the first surface region. The third surface region exhibits hydrophilic and oleophobic (HL/OP) properties. In this manner, the second surface region defines a fluid pathway having hydrophobic and oleophilic (HP/OL) properties and the third surface region defines a second distinct fluid pathway having hydrophilic and oleophobic (HL/OP).

Thus, the fluidic device may include a first surface region, a second surface region, and a third surface, which each have distinct properties, such as distinct wettabilities. The first and second surface regions may together define a first fluidic pathway for receiving, transferring, and/or storing a first fluid. The second and third surface regions may together define a second fluidic pathway for receiving, transferring, and/or storing a second distinct fluid. In certain aspects, the first fluidic pathway and the second fluidic pathway intersect with one another at one or more points. In this manner, the fluidic device can be used to either separate the first fluid from the second fluid (if they are combined in a single stream) or alternatively to combine the first fluid and the second fluid together into a single stream. It should be noted that additional distinct surface regions, in addition to the first, second, and third surface regions having distinct wettabilities may be formed, thus forming a plurality of additional distinct fluidic pathways.

These integrated fluidic flow pathways or channels can thus be employed as an operation unit for continuous surface liquid-liquid extraction (e.g., oil-water separation) as shown in the exemplary device in FIG. 11B and FIG. 23A. FIG. 11B shows a photograph of a device for continuous surface oil-water separation with a paper-based microfluidic substrate. The substrate has a hydrophobic (HP)/oleophilic (OL) channel integrated and overlapping in a head-to-head design with a hydrophilic (HL)/oleophobic (OP) channel, which are used as an operation unit for oil and water separation on the surface of the substrate. The substrate with channels and device are fabricated as follows. A first HP/OL channel is fabricated and overlaps or is head-to-head with a HL/OP channel on fluoro-paper, as shown in FIG. 23A. A HP/OL channel (left side of FIG. 23A, treated by $O_2$ plasma etching for 15 seconds) is integrated with a HL/OP channel (right side of FIG. 23A, treated by $O_2$ plasma etching for 900 seconds). The HP/OL and HL/OP channels are thus head-to-head and may be used as an operation unit for oil-water separation on surface (FIG. 23B). This complex head-to-head channel is designed as an operation unit for continuous surface oil-water separation (FIG. 11B).

Heptane (oil)-water mixture is used for demonstration. Heptane is pre-mixed with water in a premixing head before channeled to the central reservoir. As shown in FIG. 11B, a heptane-water mixture is added into a central reservoir through a premixing head in a total flow rate of 100 μL/min, and pure heptane and water are collected at distinct ends of the separation substrate/unit. Two pieces of untreated filter paper are used as guiding strips to link each channel and liquid collector. In FIG. 11B, the heptane-water mixture is channeled to the fluidic device comprising a central reservoir via a premixing head. The heptane-water mixture is spontaneously separated and pure heptane and water are collected at each end of the separation substrate unit. By this, oil-water separation is realized on the surface of a piece of paper, based solely on the difference in surface wettabilities. Pure heptane and pure water are collected at each end of the channel. Accordingly, the heptane-water mixture can be spontaneously separated and pure heptane and water can be collected at each end of the unit. FIG. 11C shows a purity check after separation from the guiding strips. Heptane (red strip) and water (blue strip) from each liquid collector after separation are shown. The end marked "Up" is put upward in the liquid collector during separation. This demonstrates oil-water separation on a single piece of paper by using only the difference of surface wettabilities.

FIGS. 24B-24H show other paper-based microfluidic applications designed with integrated extreme wettabilities for oil-water separation according to certain aspects of the present disclosure. FIG. 24B shows a multiplexed oil-water separator configuration in accordance with yet other aspects of the present disclosure based on a similar principle to that described just above. The same $O_2$ plasma treatment methodology as described above is used here. Four HP/OL and four HL/OP channels are radially arranged from a central reservoir. The multiplexed oil-water separator can be used to separate and dispense a heptane-water mixture automatically and continuously. Automatic separation and dispensing of heptane-water mixture is achieved based on use of this separator unit.

Continuous surface liquid-liquid extraction is also accomplished in accordance with other aspects of the present disclosure with a HP/OL channel arranged side-by-side with a HL/OP channel on fluoro-paper as shown in FIG. 24C. A HP/OL channel is integrated with a HL/OP channel side-by-side and used as an operation unit for liquid-liquid extraction on the surface. FIGS. 24D-24F are magnified portions of FIG. 24C that show the details of the three zones in HP/OL channel and the dye ribbon in HL/OP channel.

The feed is mixture of octane and ethanol, which is dyed in blue, and the extractant of DI water. The flow rate of the feed and the extractant are controlled individually by syringe pump at rates of 50 µL/min for both streams. The HL/OP channel is first filled with DI water, which can be precisely confined in its lane or channel. Then, the oily feed is impregnated into the HP/OL channel to show a clear and stable oil-water interface. After the system reaches its stable stage, three zones in the HP/OL channel and a dye ribbon in the HL/OP channel can be clearly observed (FIGS. 24D-24F). This shows that most of the ethanol (and dye) is extracted from the oily phase to aqueous phase. This is also proved by a quantitative measure of the refractive index of the feed and the extractant before and after extraction (FIGS. 23C-23D). As a control experiment, a failure to form such a clear and stable oil-water interface from a design of two side-by-side omniphilic channels is also tested. Without the selectivity in wettability between oil and water, the oily liquid, due to its lower surface tension, will always cut and displace water and form an irregular and/or random oil-water interface in omniphilic open-channels. The lack in control of liquids from no-selectivity design impairs many open-channel microfluidic applications.

To date, open-channel paper-based fluidic chips are mainly designed and used for analysis or detection of analytes. Preparing open-channel paper-based fluidic chips would also be desirable. The fluidic design can enable joining or reaction of distinct streams, for example, emulsification and the like. In certain variations, an integrated fluidic device comprising a porous material with a surface comprising a first surface region and second surface region, where at least one of the surface regions has an extreme wettability, with typical flow focusing geometry is contemplated. For example, the surface of the paper substrate may comprise a first surface region exhibiting hydrophobic and oleophilic (HP/OL) properties and a second surface region exhibiting hydrophilic and oleophobic (HL/OP) properties, where the paper substrate is used as a fluidic unit with a typical flow focusing geometry is provided (FIGS. 11D, 18, and 19A-19C).

Microfluidic-channel emulsification can be realized with this design for the first time on an open surface (FIGS. 11D, 18, and 19A-19B). A water channel is HL/OP and prepared by $O_2$ plasma etching for a duration of 300 seconds at 200 W, while the precursor channel is HP/OL and prepared by $O_2$ plasma etching at 15 seconds again at 200 W.

External fluid (98% wt. water and 2% wt. SDS commercially available from Hoefer) is first pumped into to fill the water channel, followed by the impregnation of inner fluid in the precursor channel. The HP/OL inner fluidic channel is filled with an inner fluid having a crosslinkable precursor, 1,1,1-trimethylpropane triacrylate (TMPTA, purchased from Polysciences) and a 5% wt. initiator (2-hydroxy-2-methylpropiophenone, purchased from Sigma Aldrich). Hence, the outer fluidic channel is HL/OP and initially filled with an aqueous solution of sodium dodecyl sulfate (SDS). The SDS solution wets and flows only through the HL/OP outer fluidic channel, avoiding the HP/OL inner fluidic channel. Then, the HP/OL inner fluidic channel is filled with the cross-linkable precursor (TMPTA and + initiator). The HP/OL inner fluidic channel is integrated with a HL/OP channel for outer fluid in a flow-focusing geometry and used as an operation unit for surface emulsification. The device is thus used as a continuous operation unit for open-channel microfluidic emulsification, or namely surface emulsification.

The flow rate of external and inner fluids are precisely controlled by two independent syringe pumps and set as 1500 µL min$^{-1}$ and 5 µL min$^{-1}$, respectively and controlled by syringe pumps (kd Scientific KDS-230). See FIG. 18. Both the aqueous and organic phases remained within the outer and inner fluidic channels without any intermixing. This is crucial to keep the two-phase flow confined within the flow-focusing geometry from an open channel and to complete surface emulsification. After crosslinking, the prepared polymeric microparticles are found in hemispheres with a flat base diameter of around 500 µm (FIG. 3H).

At a downstream region, a UV lamp is used for crosslinking. Thus, a 350 nm UV lamp (UVP BLAK-RAY B-100SP, 140 watt/365 nm) is mounted above the collector to crosslink the precursor emulsion microdroplets (FIGS. 19A-19B). After crosslinking, the SEM image shows that the prepared polymeric microparticles are hemispheres with a diameter of pedestal circle around 500 µm (FIG. 11E). The surface emulsification process is very stable and the control on uniformity is good. Thousands of particles can be collected within 1 hour (FIG. 11E inset).

Two non-limiting benefits of this novel surface emulsification technique should be noted. First, it combines the advantages from open-channel microfluidics—e.g., easy to access, large liquid-vapor interface—and advantages from droplet microfluidics—e.g., discrete operation or analysis units, high throughput or screening ability. This is very useful for the design of novel devices used in both bio-analysis and preparation of biological reagents. Second, by applying a carrier liquid (inexpensive and easily obtained) as external fluid, the sample retention on the target liquid (inner fluid) can be greatly decreased to near zero.

Furthermore, the present disclosure contemplates three-dimensional (3D) flow of various kinds of liquids with open fluidic pathways or channels in a fluidic device design. For example, a porous paper material has a treated surface with at least one region of extreme wettability. Such a region may thus define a 3D fluidic pathway. In one variation, to make a 3D channel on fluoroalkyl silane coated-paper, a fluidic unit or "bridge" is formed via a pair of vertical perforations through the entire thickness of fluidic chip (FIG. 20A), to connect the liquids running on the two sides. After the fluidic channels are perforated with one or several bridges, a predetermined duration of $O_2$ plasma etching is conducted onto two distinct sides of the fluidic chip to make the channels wettable to the target liquids. Water, DMF, ethanol and heptane are used as testing liquids here.

In certain aspects, a fluidic device comprises a porous material comprising a surface comprising a first surface region that comprises a surface coating having a first wettability comprising a low surface energy fluoroalkyl silane and a second surface region on the surface having a second wettability that is distinct from said first wettability. In certain variations, the porous material comprises a cellulosic paper substrate. In other variations, the porous material may be a fabric or textile. The second surface region is capable of receiving, transferring, and/or storing a fluid and the first surface region and the second surface region together define at least one fluidic pathway for the fluid on the surface of the porous material. The porous material and low surface energy fluoroalkyl silane coated substrate may be any of those described above having extreme wettabilities. The fluid is selected from group consisting of: a polar liquid, a non-polar liquid, and combinations thereof. In certain variations, at least one fluidic pathway is an open channel. In certain other variations, at least one fluidic pathway may be on a microscale or nanoscale. In certain variations, at least one fluidic pathway is configured for two-dimensional flow of the fluid and in other variations, the at least one fluidic pathway is configured for three-dimensional flow of the fluid. Thus, at least one fluidic pathway optionally comprises a plurality of distinct fluidic pathways, where at least two distinct pathways (e.g., non-contiguous or disconnected) are connected to one another by a bridge structure.

As discussed above, in certain variations, the low surface energy fluoroalkyl silane has a surface tension of less than or equal to about 25 mN/m. The low surface energy fluoroalkyl silane may be selected from a group consisting of: heptadecafluoro-1,1,2,2-tetrahydrodecyl triethoxysilane, heptadecafluoro-1,1,2,2-tetrahydrodecyl trichlorosilane, heptadecafluoro-1,1,2,2-tetrahydrooctyl trichlorosilane, tri-decafluoro-1,1,2,2-tetrahydrooctyl triethoxysilane, and combinations thereof. The coating of the first surface region optionally comprises a low surface energy fluoroalkyl silane having a surface tension of less than or equal to about 10 mN/m. In certain aspects, the coating of the first surface region consists essentially of a low surface energy fluoroalkyl silane having a surface tension of less than or equal to about 25 mN/m. In certain aspects, the coating has a ratio of fluorine to oxygen of greater than or equal to about 2. In certain embodiments, greater than or equal to about 60% of the hydroxyl groups on the porous paper-based material are reacted with the low surface energy fluoroalkyl silane.

To extend beyond lateral flow, three dimensional (3D) flow-through channels on paper are formed for transport of all types of liquids. Such a design may be an array having two groups of four channels arranged orthogonally in the x and y directions on a piece of paper (FIG. 12A). As shown in FIG. 12A, a 3D microfluidic is shown. A porous substrate 52 may be formed of a paper or textile. A plurality of first channels 60 may be considered to be x-channels. The plurality of first channels 60 includes a plurality of upper channels 62 (along an upper surface 54 of substrate 52), a plurality of bridges 64, and a plurality of lower channels 66 (disposed within a body of the substrate 52 or along a lower side of substrate 52) that are all fluidically coupled to one another. As noted above, upper channels 62 may be formed by treating (e.g., etching) a first side of the porous substrate 52, while lower channels 66 can be formed by treating a second opposite side of the porous substrate 52. The first x channels 60 are 3D channels with bridges running y channels, at the x-y junctions. To allow the liquids in first x channels 60 to run under at the junctions, the bridges 64 are formed by a pair of vertical perforations (of diameter 500 µm) through the entire thickness of the paper, connecting the surface liquid flowing on opposite sides of the bridge (see, FIG. 20A). In certain variations, first x channels 60 have the dimensions of 50 mm (length)×3 mm (width) and each contains an upper channel 62 with four bridges 64 at each end for fluidic connection with the lower channel 66 therebetween. Notably, there are four distinct pluralities of first x channels 60 in substrate 52, which are labeled respectively 60A, 60B, 60C, and 60D. Water, DMF, heptane, and ethanol are loaded for purposes of demonstration. Channel 60A is for water, channel 60B is for DMF, channel 60C is for heptane, and channel 60D is for ethanol.

A second plurality of channels 70 are also formed in the upper surface 54 porous substrate 52 in the y-direction. These second channels 70 can thus be considered to be lateral y channels. Notably, there are four distinct pluralities of second y channels 70 in substrate 52, which are labeled respectively 70A, 70B, 70C, and 70D. For purposes of demonstration, channel 70A is for water, channel 70B is for DMF, channel 70C is for heptane, and channel 70D is for ethanol. In certain examples, the second y channels 70 have dimensions of 25 mm (length)×1.8 mm (width). Notably, the first and second channels 60, 70 are not limited to the numbers listed or placement shown and described, but are merely exemplary for purposes of illustration.

The first and second pluralities of 3D channels 60, 70 are selectively treated for different times by a high-power (350 W) $O_2$ plasma etching to get the optimal flow rate for different liquids (see e.g., FIG. 20A). A 4×4 bridge matrix is obtained.

In one variation, a paper chip with 3D microfluidic channels is formed, first by perforating the porous substrate to form one or several bridges (e.g., 64) and then followed by $O_2$ plasma etching onto both sides to make the channels wettable to the target liquids (FIG. 20A). First, a set of 3D channels with one bridge 64 each is prepared. The channels are in the dimensions of 18 mm (length)×2 mm (width). Each bridge is 7.5 mm in length with a pair of five, 500 µm diameter perforations. Water (blue), DMF (pink), ethanol (green), and heptane (maroon) are the four test liquids, which are added at one end of the channels and they smoothly transfer through the bridge, reaching the other side (FIGS. 20B-20D). It should be noted that, to make the liquids go through the bridge smoothly, the etching time is longer than what is used to obtain lateral flow in 2D channels, especially for high surface tension liquids like water. The $O_2$ plasma etching (200 W) times for each one-bridge, 3D channel are 900 seconds for water, 120 seconds for DMF and ethanol, and 15 seconds for heptane.

In another variation, a higher power of $O_2$ plasma (350 W) is used to treat and form 3D fluid channels with multiple bridges. A set of 3D channels with two bridges each are prepared (FIGS. 21A-21B). The channels are in the dimensions of 50 mm (length)×3 mm (width). Each bridge is around 10 mm in length and includes a pair of five, 500 µm diameter perforations. For the four test liquids, the wetting time for the entire 50 mm, two-bridge channel is investigated (FIG. 21C). With a similar trend of surface wettability as observed for 200 W etching, an etching window with a suitable time span, neither too short nor too long, is used to make the test liquids flow across the two bridges. For water, if the etching time is less than 60 seconds, it cannot wet the whole channel in 50 mm. For etching times ranging from 60 seconds to 300 seconds, water can fill the whole channel across two bridges and the wetting time is slightly increased from 300 seconds to 320 seconds. With DMF, the minimal wetting time of approximately 85 seconds is obtained from the 60 second-etched channel. If the etching time is less than 30 seconds or more than 120 seconds, the wetting time is greatly increased until it cannot fill the entire channel. For ethanol, the optimal etching time appears to be about 15 seconds to obtain a minimal wetting time of about 92 seconds. The narrowest etching window is for heptane. Heptane can only fill the 30 second-etched channel with two bridges in a wetting time of 74 seconds. This is caused by the same effect of oil recovery discussed above in the context of FIG. 3B.

Thus, based on the optimized high-power $O_2$ plasma treatment, a set of 3D channels with four bridges each are prepared in a device like that shown in FIGS. 12A-12C. The etching times are: 180 seconds for water channels, 60 seconds for DMF channels, 30 seconds for heptane channels, and 15 seconds for ethanol channels. The four test liquids are loaded for demonstration. Water can fill the entire 50 mm first x channel 60A by crossing the four bridges. DMF crosses the four bridges, but stops just before reaching the first x channel's 60B end. Ethanol and heptane, due to evaporation, only cross the first two bridges out of four in first channels 60C and 60D, respectively. Therefore, second portions of ethanol and heptane are applied from the other ends of the first x channels 60C and 60D, allowing the wetted halves to meet in the center.

Based on parameters that are believed to be optimized, two groups of fluidic channels (first and second pluralities of channels 60 and 70) are arranged orthogonally in x and y directions, which are prepared on the double sides of a fluoro-paper (FIG. 12A). As noted above, each first x channel 60 is of four bridges. Water, DMF, ethanol and heptane, the four testing liquids are loaded on the same piece of 3D fluoroalkyl silane coated-paper chip prepared in accordance with certain aspects of the present teachings. Water can fill the whole x channel in 50 mm by crossing the four bridges. DMF can cross the four bridges, but stops at a position close to the end of channel. For ethanol and heptane, they can only cross the first two out of four bridges along the x channel. Then, a second run of ethanol and heptane is needed from the other end of the x channel to meet the wetted halves in the center. A 4×4 bridge matrix can be obtained (matrix designations being labeled "a-d" in the x-direction and "1-4" in the y-direction) after the 3D fluidic chip was filled with the four testing liquids (see Table 5).

TABLE 5

| a1 | a2 | a3 | a4 | Water/Water | Water/DMF | Water/Heptane | Water/Ethanol |
|----|----|----|----|-------------|-----------|---------------|---------------|
| b1 | b2 | b3 | b4 | DMF/Water | DMF/DMF | DMF/Heptane | DMF/Ethanol |
| c1 | c2 | c3 | c4 | Heptane/Water | Heptane/DMF | Heptane/Heptane | Heptane/Ethanol |
| d1 | d2 | d3 | d4 | Ethanol/Water | Ethanol/DMF | Ethanol/Heptane | Ethanol/Ethanol |

From the entire matrix, no mixing from any pair of testing liquids is observed as shown in FIGS. 12B and 12C. FIG. 12B shows the front side (+z-direction) and FIG. 12B shows the back side (−z-direction). Thus, no mixing between any of first plurality of x channels 60 and second plurality of y channels 70 occurs, demonstrating the ability to form 3D microfluidic channels in addition to surface lateral channels.

These experimental results show that with a porous material thickness of 390 μm, the orthogonal 3D channels for various different kinds of liquids can be successfully integrated into a single piece of porous material, like paper, prepared in accordance with certain aspects of the present teachings. Thus, a porous material reacted with a low surface energy fluoroalkyl silane to form a coated fluorosilanized, omniphobic surface, further treated by $O_2$ plasma etching on the coated surface, is provided by the present teachings. Such a porous material having a coated surface is capable of realizing all of the extreme wettabilities, Moreover, such extreme wettabilities can all be provided on a single piece of substrate, like cellulose paper. This novel platform can be used for analysis, detection, synthesis and preparation, and open-channel fluidic devices, designed for both 2D lateral flow and 3D fluidic operations. It is capable of meeting increasing demands in fluid control on paper-based devices. Moreover, from the material aspect, cellulose is the most naturally abundant polymer on earth, which makes the methods described in the present disclosure especially well-suited for low-cost and high-performance technologies.

A printing technique is also contemplated to enhance flexibility on patterning and design options for forming the surface with extreme wettabilities. The fluoro-paper used for printing is prepared by deep fluorosilanization of copy paper as a substrate (Biose X-9 Multiuse OX9001 commercially available from OfficeMax) in accordance with certain aspects of the present disclosure previously discussed. In such a method, deep fluorosilanization of cellulose paper by vapor phase deposition occurs by deposition of a fluoroalkyl silane precursor comprising heptadecafluoro-1,1,2,2-tetrahydrodecyl)trichlorosilane (SIH5841.0) onto the surface of the cellulose paper, as previously discussed above. See FIG. 22.

The dynamic contact angles of water ($H_2O$) and hexadecane (HD) on the developed fluoro-paper here are measured as $\theta^*_{adv}$ $H_2O$ is 153.0, $\theta^*_{rec}$ $H_2O$ is 0, $\theta^*_{adv}$ HD is 112.6, $\theta^*_{rec}$ HD is 0, respectively. Compared with the fluoro-paper (type-A) made out of fluorinated cellulose paper (FIG. 13), the nearly zero receding contact angles from both water and oil provide very good contact and adhesion between the ink and the surface of fluoro-paper. Further, the high advancing contact angles prevent the ink from further wicking or spreading after it hits the surface of fluoro-paper.

A custom model ink is thus used to selectively cover the target fluoro-paper surface to form liquid-wettable channels thereon. A polyvinyl acetate (Aleene's Fabric Fusion permanent fabric adhesive) is the main component of the model ink. The ink is formed by dissolving the fabric adhesive in ethanol to make a solution with a concentration of 500 mg/mL. Then, the adhesive solution is diluted by an SDS aqueous solution (20 mg/mL) in the volume ratio of 1:3. The final solution is probe sonicated (Heat Systems Ultrasonic Processor Sonicator) for 2 minutes and filtered by a 0.2 μm syringe filter for use as ink.

The setup for printing provides for precise positioning via a motorized XYZ motion stage (Shapeoko 2). The motion of each axis is programmable and controlled from a laptop. The printing head is a tapered plastic dispensing nozzle (24 gauge, purchased from McMaster-Carr) connected to a syringe pump (KD Scientific Model 200) via silicone rubber tubing (1/16 inch inner diameter, purchased from McMaster-Carr). The syringe pump is connected to the XYZ stage electronics to enable computer-controlled ink deposition. A typical flow rate of the ink used for printing is 1 mL/h. The fluoro-paper substrates are glued onto glass plates to minimize wrinkling. Then, the glass plates are mounted on a hotplate, which is carefully leveled. The temperature of the substrate (set as about 45° C.) is monitored with a thermocouple. A backlight is used in the background to improve the visibility of the printed channels.

Patterns for the XYZ platform are generated by drawing them in vector graphics software (INKSCAPE™). They are converted to the standard G-code machine control language with a plug-in. The files are further post-processed with a PYTHON™ script to accommodate limitations of the machine controller and to insert the pump control commands. The model pattern uses outlines extracted from a picture of Lurie Bell Tower at the University of Michigan.

FIG. 12D shows a printed pattern of the Lurie Bell Tower design on fluoro-paper in an area of 5.3 cm×4.4 cm. The inset shows the original pattern designed on the computer, along with a U.S. penny for scale. The overall size is 5.3 cm×4.4 cm. A complete run of printing this pattern takes about 6 minutes. The ink layers are barely visible, it can be only pictured with a certain angle against the backlight.

Dyed silicone oil (in red with Oil Red 0, purchased from Sigma Aldrich) is used for the impregnation test of the printed channels. The four round terminal reservoirs are filled each by 20-25 µL of the dyed silicone oil liquid. Driven by capillary force the whole pattern is completely filled, as can be seen in FIG. 15D. SEM images FIGS. 15E-15J are taken at points designated e-j in FIG. 15D within the printed channels. By applying the custom ink on the fluoro-paper surface and printing, the low surface energy channels or features can be fully covered (FIGS. 12E-12G). The resolution of printed line and interstice between two lines can reach 700 µm and 400 µm with a tapered printing tip (diameter, 510.6 µm), respectively (FIGS. 12H-12J). The channels have been filled by feeding the four liquid reservoirs (circular terminal regions) each with 20 µL with silicone oil (dyed in red).

In yet another aspect, the inventive porous materials having a coated surface with extreme wettability may be used for various chemical, biochemical, or biotechnology applications, such as bio-assays. Such a fluidic or microfluidic device may process or interact with a biological material or fluid (which may be derived from or related to a biological organism or source). Thus, the present disclosure contemplates porous materials having a coated surface comprising a low surface energy silane that exhibits extreme wettability with at least one feature on the surface for interacting with a biological fluid, material, or target. Such biological fluids, materials, or targets may include bodily fluids (e.g., blood, serum, plasma, saliva, cerebrospinal fluid, urine, and the like), cells, tissues, proteins, and other biological materials (e.g., nucleic acids, carbohydrates, lipids, proteins, polypeptides, amino acids, hormones, prostaglandins), by way of non-limiting example.

In this example, biocompatibility of the prepared channels on fluoro-paper prepared in accordance with certain aspects of the present disclosure is demonstrated. Mammalian cells, mouse blood, or bacteria are plated directly on both omniphobic fluoro-papers and omniphilic channels formed in accordance with certain aspects of the present disclosure. Human ovarian SKOV3 cells are maintained in RPMI 1640 medium containing 10% fetal bovine serum and 100 U/ml penicillin-100 µg/ml streptomycin. Blood is obtained from C57Bl/6 mice at the termination point of other experiments and kept in a heparinized tube at 4° C. Mouse intestinal bacteria are grown in a rich medium (170 mM NaCl, 1.5% BSA, 10% sucrose) for two days at room temperature until the culture is turbid. Blood is dripped directly onto coated paper. Coated paper is also completely submersed in the bacterial culture. Blood, bacteria, or bacterial medium, are left on the paper for three days to one week.

Coated paper is UV-irradiated for 30 minutes for sterilization. Soaking the paper in 70% ethanol also sterilizes the substrate, but disturbs the coatings (data not shown). Irradiated, coated paper is adhered to the surface of a standard tissue culture dish using surgical glue (Factor II; Lakeside, Ariz.). SKOV3 cells are trypsinized and plated directly on top of paper with minimal medium for 30 minutes, medium is added to cover the paper, and the cells are allowed to grow for three days to one week.

Staining is done in various ways after the paper is washed twice in 1×PBS. (1) Paper that is incubated with mammalian cells, blood, or bacteria is submersed in Ponceau S stain (0.1% in 5% acetic acid; both from Sigma Aldrich) for 10 minutes at room temperature, then washed in dH2O. After staining with Ponceau S, any proteins bound to the paper may be detected. (2) Paper incubated with mammalian cells is incubated with 500 µg/ml p-iodonitrotetrazolium violet (Sigma-Aldrich) in cell medium overnight at 37° C. Colorimetric stains are visualized using a Nikon AZ100 upright microscope. All experiments are repeated at least three times.

FIG. 25A shows microscopic images of omniphobic and omniphilic paper after Ponceau S staining of mammalian cells (SKOV3 cells), mouse blood, and bacteria plated following one week of growth on the omniphobic coated and omniphilic coated (control) papers. FIG. 25B shows microscopic images of omniphobic and omniphilic paper before any cells are added. Cells, blood and bacteria only adhered to the omniphilic surfaces of the fluoro-papers even after a full week of incubation.

Microscopic views of the paper show that proteins only adhere to the omniphilic surface; although a slight blush of stain did occur on the omniphobic fluoro-paper incubated with the bacteria. To determine if this light staining is due to bacteria or the rich medium in which the bacteria is cultured, omniphobic fluoro-paper is incubated for one week with just bacterial medium. FIG. 25C shows microscopic images of Ponceau S stained paper after incubation with the bacterial medium. The paper picked up slight staining indicating that the colorization on the omniphobic fluoro-paper appears to be due to components present in the bacterial medium that bind to the paper.

To better show the selective bond of bio-media, omniphilic channels (3 mm wide) are made in omniphobic fluoro-paper and mammalian cells are plated on top of the patterned paper. See FIGS. 26A-26C. Cells are stained for viability with ρ-iodonitrotetrazolium violet after one week of growth. A clear delineation between the cells growing on the omniphilic channel (dark regions) compared to not growing on the omniphobic background (light regions) is demonstrated microscopically (FIGS. 26A-26C). The omniphobic coating did not inhibit cell growth on the omniphilic surface as cells can be seen growing adjacent to the omniphobic base (FIG. 26C). Taken together, these data imply that the omniphobic base is not cytotoxic; however, it is not conducive to cell growth.

As noted above, on deep-fluorosilanized, omniphobic cellulose paper prepared in accordance with the certain aspects of the present disclosure, all four extreme wettabilities can be selectively integrated onto a single piece of paper for a wide range of liquids with different surface tension and polarity. This design is fully compatible with both 2D lateral flow and 3D flow through, and furthermore can be implemented with printing techniques. This breakthrough greatly expands the design complexity and scope of application for paper-based or textile-based fluidic and microfluidic devices, both in analysis and chemical/particle preparation, and in bio-related systems, among others.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A coated porous material comprising:
   a porous substrate having a surface comprising hydroxyl groups thereon; and a coating disposed on the surface of the porous substrate together defining a coated surface that is both superhydrophilic, having a first apparent advancing dynamic contact angle of less than or equal to about 5° for water and oleophobic, having a second apparent advancing dynamic contact angle of greater than or equal to about 90° for a preselected oil, wherein the coating consists of a low surface energy fluoroalkyl silane having a surface tension of less than or equal to about 35 mN/m reacted with hydroxyl groups on the surface of the porous substrate and an optional solvent that does not modify the first apparent advancing dynamic contact angle and the second apparent advancing dynamic contact angle, wherein the low surface energy fluoroalkyl silane is selected from a group consisting of: heptadecafluoro-1,1,2,2-tetrahydrodecyl triethoxysilane, heptadecafluoro-1,1,2,2-tetrahydrodecyl trichlorosilane, heptadecafluoro-1,1,2,2-tetrahydrooctyl trichlorosilane, tridecafluoro-1,1,2,2-tetrahydrooctyl triethoxysilane, nonafluorohexyl triethoxysilane, and combinations thereof.

2. The coated porous material of claim 1, wherein the coated surface is superoleophobic, having the second apparent advancing dynamic contact angle of greater than or equal to about 150° for the preselected oil.

3. The coated porous material of claim 1, wherein the coated surface has a ratio of fluorine to oxygen of greater than or equal to about 0.5.

4. The coated porous material of claim 1, wherein greater than or equal to about 30% of the hydroxyl groups on the porous substrate are reacted with the low surface energy fluoroalkyl silane.

5. The coated porous material of claim 1, wherein the porous substrate comprises a cellulosic paper.

6. A separator device for separating a liquid-liquid mixture comprising:
a porous separator membrane comprising the coated porous material of claim 1, wherein at least one component is capable of passing through at least one surface region of the coated porous material and is separated from the liquid-liquid mixture.

7. The separator device of claim 6, wherein the at least one surface region is superoleophobic, having the second apparent advancing dynamic contact angle of greater than or equal to about 150° for the preselected oil.

8. The separator device of claim 6, wherein the at least one surface region has a ratio of fluorine to oxygen of greater than or equal to about 0.5.

9. The separator device of claim 6, wherein greater than or equal to about 30% of the hydroxyl groups on the coated porous material are reacted with the low surface energy fluoroalkyl silane.

10. The separator device of claim 6, wherein at least one surface region is at least one first surface region and a surface of the porous separator membrane further comprises at least one second surface region that is superhydrophobic, having a third apparent advancing dynamic contact angle of greater than or equal to about 150° for water and oleophilic, having a fourth apparent advancing dynamic contact angle of less than or equal to about 90° for a preselected oil.

11. The separator device of claim 10, wherein the at least one second surface region is superoleophilic, having the fourth apparent advancing dynamic contact angle of less than or equal to about 5° for a preselected oil.

* * * * *